United States Patent
Miyabayashi et al.

(10) Patent No.: US 8,990,339 B2
(45) Date of Patent: Mar. 24, 2015

(54) INFORMATION PROCESSING APPARATUS AND METHOD, AND PROGRAM

(75) Inventors: Naoki Miyabayashi, Tokyo (JP); Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 13/223,383

(22) Filed: Sep. 1, 2011

(65) Prior Publication Data

US 2012/0066341 A1 Mar. 15, 2012

(30) Foreign Application Priority Data

Sep. 6, 2010 (JP) ................ P2010-198847

(51) Int. Cl.
| | | |
|---|---|---|
| G06F 15/16 | (2006.01) | |
| H04L 29/06 | (2006.01) | |
| G06Q 30/02 | (2012.01) | |
| H04W 4/00 | (2009.01) | |
| H04W 8/26 | (2009.01) | |
| H04W 92/18 | (2009.01) | |

(52) U.S. Cl.
CPC ............. H04L 63/18 (2013.01); H04L 63/08 (2013.01); G06Q 30/0282 (2013.01); *H04L 63/06* (2013.01); *H04W 4/001* (2013.01); *H04W 8/26* (2013.01); *H04W 92/18* (2013.01)
USPC ............ 709/217; 709/227; 709/219; 709/224

(58) Field of Classification Search
CPC . G06Q 20/32; G06Q 30/0603; G06Q 10/087; G06Q 20/02; G06Q 20/045; G06Q 20/20; G06Q 20/3224; G06Q 20/3226; G06Q 20/352; G06Q 20/3674; G06Q 20/38; G06Q 20/382; G06Q 20/40

USPC .................................................. 709/217–229
See application file for complete search history.

(56) References Cited

U.S. PATENT DOCUMENTS

| | | | | |
|---|---|---|---|---|
| 7,287,270 | B2 * | 10/2007 | Kai ................................... | 726/2 |
| 7,457,848 | B2 * | 11/2008 | Kon .............................. | 709/217 |
| 8,180,278 | B2 * | 5/2012 | Soma et al. ....................... | 455/7 |

(Continued)

FOREIGN PATENT DOCUMENTS

| | | |
|---|---|---|
| WO | 2009035223 A2 | 3/2009 |
| WO | 2009045899 A2 | 4/2009 |

OTHER PUBLICATIONS

Office Action from European Search Report EP 11178988, dated Jan. 2, 2012.

*Primary Examiner* — Douglas W Owens
*Assistant Examiner* — Monica C King
(74) *Attorney, Agent, or Firm* — Hazuki International, LLC

(57) ABSTRACT

An information processing apparatus includes a notification reception unit that receives information from a first terminal device when the first communication is performed between the first terminal device related to a provider of a product or a service and a second terminal device related to an evaluator, a sorting specification unit that specifies at least one of reliability sorting, security sorting of the first terminal device, and security sorting of the second terminal device, a link authentication unit that specifies a link authentication method of confirming a state of a second communication performed between the first terminal device and the second terminal device based on the specified result, and performs a process related to the link authentication using the specified method, and an evaluation information reception unit that receives evaluation information from the first terminal device.

20 Claims, 35 Drawing Sheets

(56) References Cited

U.S. PATENT DOCUMENTS

| | | | |
|---|---|---|---|
| 8,296,568 B2* | 10/2012 | Gupta et al. | 713/171 |
| 2002/0034302 A1* | 3/2002 | Moriai et al. | 380/270 |
| 2003/0191695 A1 | 10/2003 | Kondo et al. | |
| 2007/0094384 A1* | 4/2007 | Matsumura et al. | 709/224 |
| 2008/0233984 A1* | 9/2008 | Franklin | 455/466 |
| 2009/0163186 A1* | 6/2009 | Gupta et al. | 455/414.2 |
| 2011/0183614 A1* | 7/2011 | Tamura | 455/41.2 |
| 2012/0151030 A1* | 6/2012 | Guttman et al. | 709/223 |

\* cited by examiner

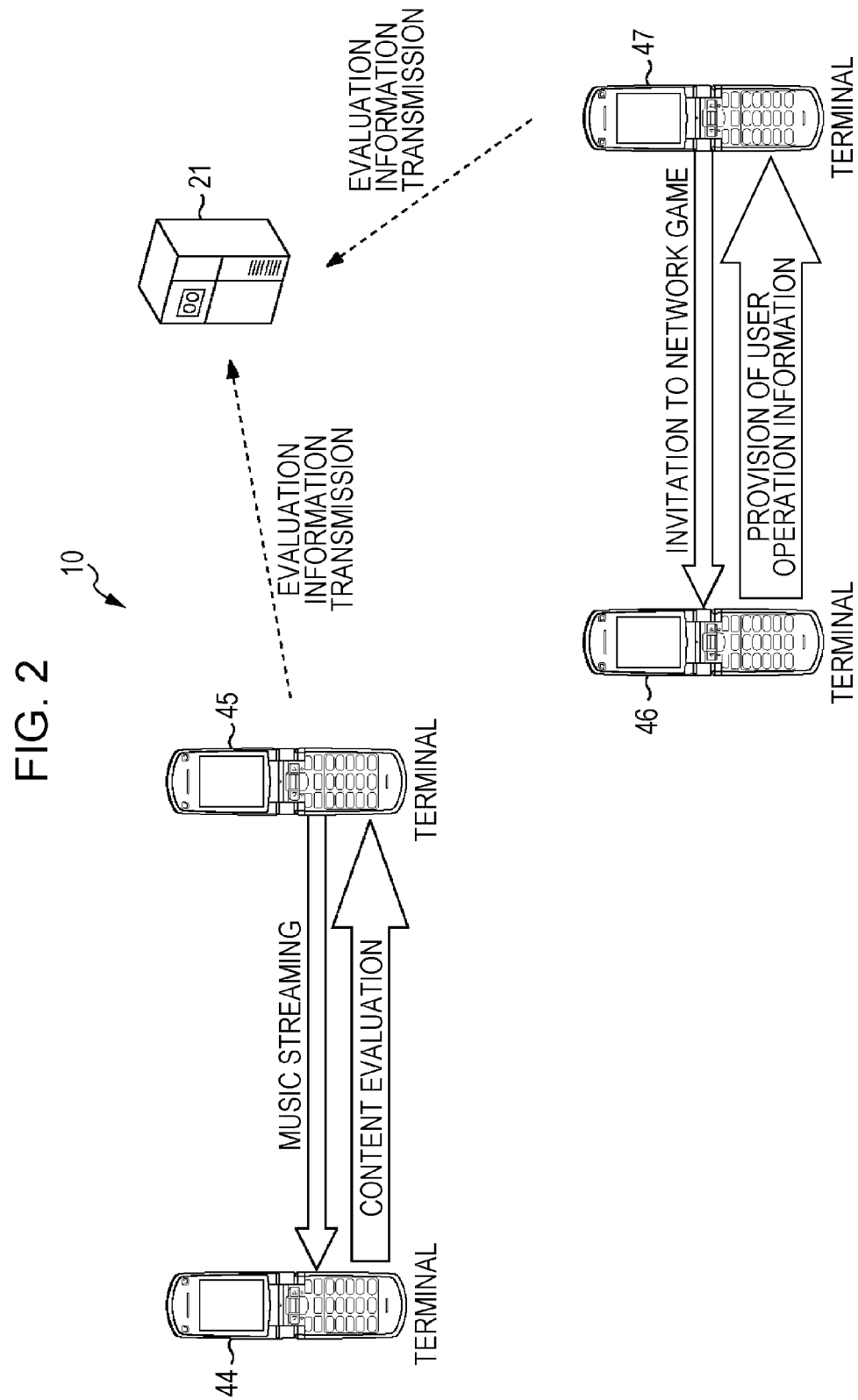

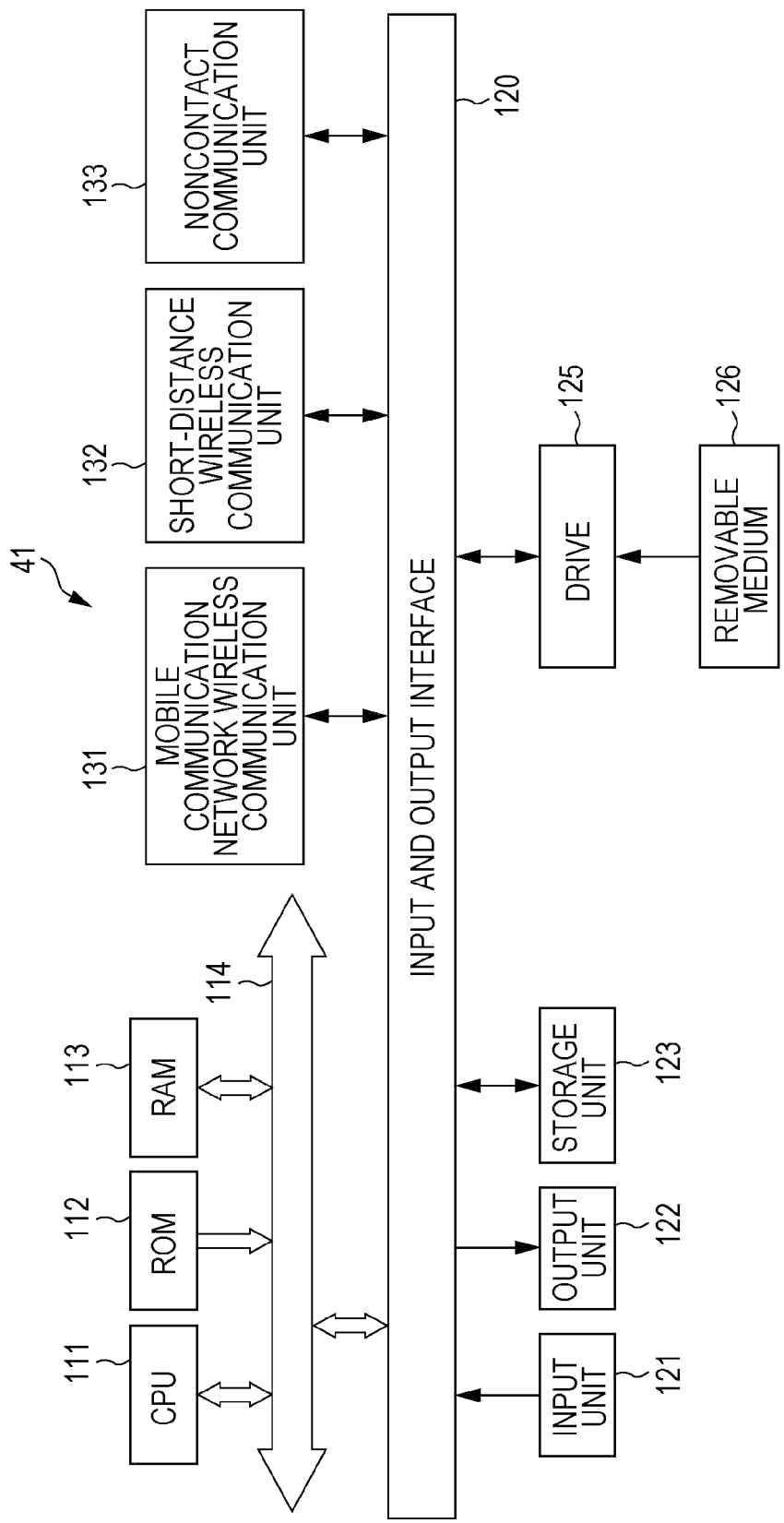

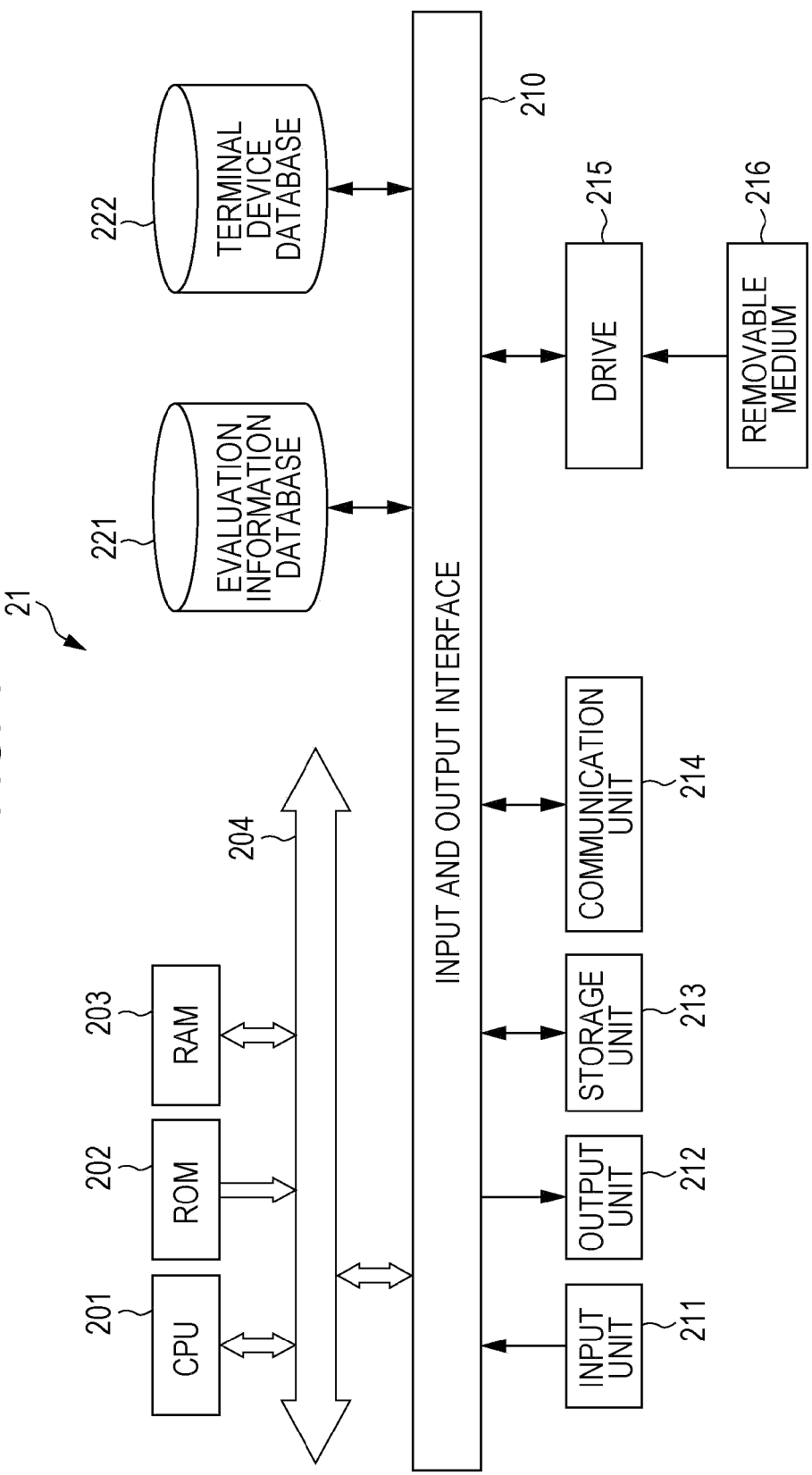

FIG. 5

| ITEM | EXPLANATION |
|---|---|
| WIDE AREA COMMUNICATION TYPE | COMMUNICATION TYPES SUCH AS 3G OR Wimax |
| WIDE AREA COMMUNICATION ADDRESS | ADDRESS |
| SHORT-DISTANCE WIRELESS COMMUNICATION TYPE | COMMUNICATION TYPE SUCH Blooth OR Wi-Fi |
| SHORT-DISTANCE WIRELESS COMMUNICATION ADDRESS | ADDRESS |
| NONCONTACT COMMUNICATION METHOD | DATA RESPONSE ONLY, DATA OBTAINING ONLY, DATA TRANSMISSION AND RECEPTION ENABLE |
| UNIQUE KEY | SECRET KEY ALLOCATED TO EACH TERMINAL DEVICE (IF THERE IS SECURITY MODULE, INFORMATION NECESSARY FOR ACCESS TO MODULE) |
| PROVIDER SORTING | WHETHER OR NOT THERE IS PROVIDER |

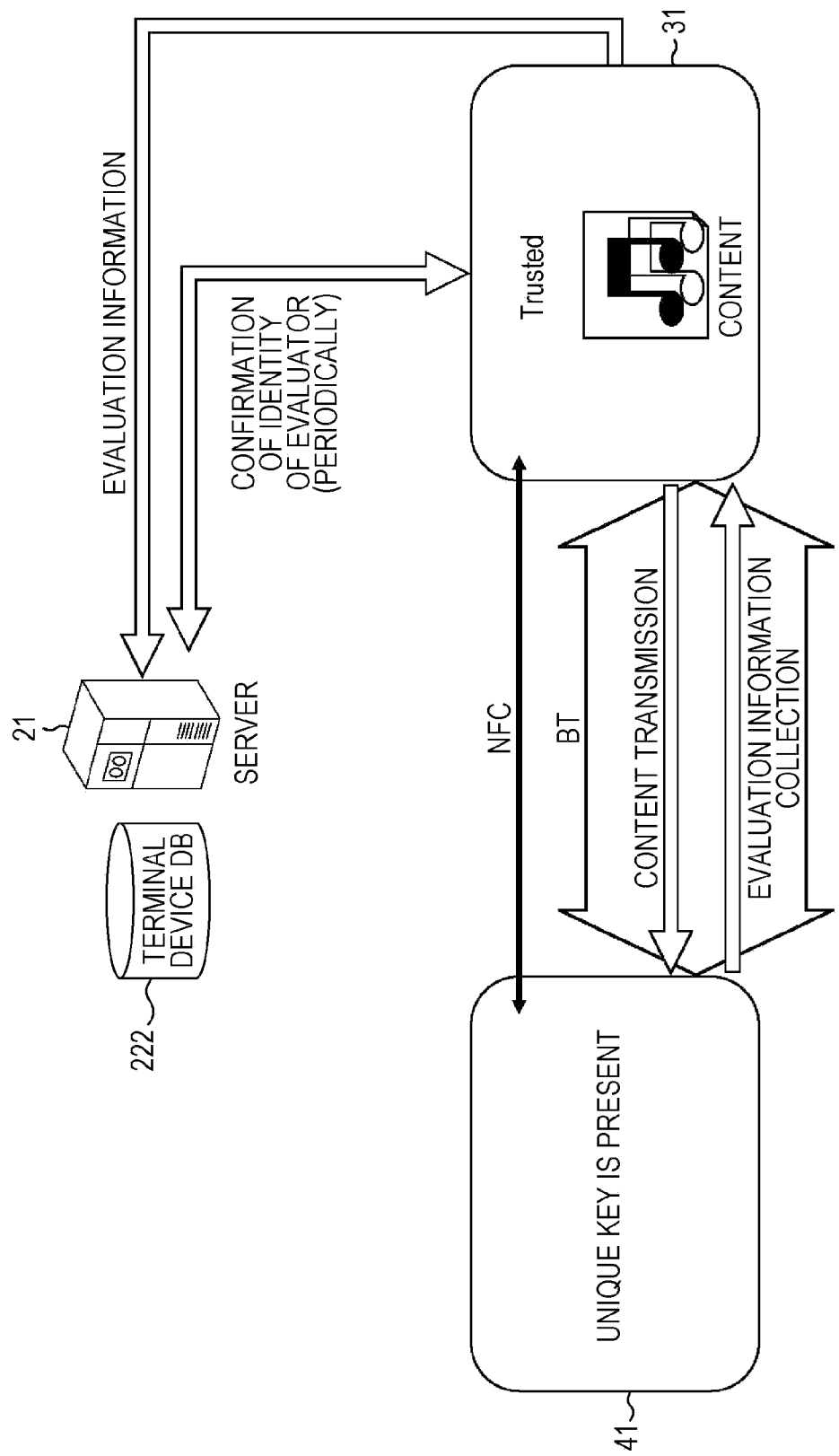

FIG. 15

| EVALUATOR SIDE \ PROVIDER SIDE | Trusted | | No Trusted | |
|---|---|---|---|---|
| | UNIQUE KEY | TEMPORARY KEY | UNIQUE KEY | TEMPORARY KEY |
| UNIQUE KEY | CASE 1 | CASE 1 | CASE 3 | CASE 4 |
| TEMPORARY KEY | CASE 2 | CASE 2 | CASE 4 | CASE 5 |

INFORMATION PROCESSING APPARATUS AND METHOD, AND PROGRAM

CROSS-REFERENCE TO RELATED APPLICATION

The present application claims priority from Japanese Patent Application No. JP 2010-198847 filed in the Japanese Patent Office on Sep. 6, 2010, the entire content of which is incorporated herein by reference.

BACKGROUND

The present disclosure relates to an information processing apparatus, an information processing method, and a program, and more particularly to an information processing apparatus, an information processing method, and a program capable of easily collecting useful evaluation information having high reliability.

In recent years, information called word-of-mouth information has been utilized on Internet bulletin boards. Word-of-mouth information is evaluation information regarding, for example, services of a shop, quality of a product, how fun content is, and the like.

Word-of-mouth information is an authentic view of a person who has actually visited a shop, a person who has bought a product, a person who has viewed content, or the like, and is useful and is used as a reference in purchasing a product or a service in many cases, unlike evaluation information given by magazine reporters or specialists.

In addition, a technique has also been proposed in which attributes of viewers (user information) are collected from wireless terminals of the viewers and a viewing effect is measured (for example, refer to Japanese Unexamined Patent Application Publication No. 2010-41194). It is possible to more easily collect evaluation information using the techniques.

SUMMARY

However, the word-of-mouth information or the like has a problem in that it shows large variations in evaluation accuracy as compared with evaluation information published in magazines or the like. For example, it is hard to say that reliability for an Internet bulletin board is high, that is, there are cases where extremely good evaluation and extremely bad evaluation are mixed and thus the evaluation information is not greatly useful as a reference.

In addition, since even a person who does not purchase (does not experience) a product or a service posts on the bulletin board, there is no guarantee that actual experiences of users are posted, and there is a case where a user hesitates to make a purchase with an evaluation as a reference.

In addition, evaluation information in the related art is biased to a user comment type on the bulletin board such as word-of-mouth information, and thus, for example, the chance to access evaluation information such as purchase results of users regarding each product or viewing results of users regarding each piece of content has been rare.

For example, according to the technique disclosed in Japanese Unexamined Patent Application Publication No. 2010-41194, viewing records of users regarding content can be obtained; however, for example, it is difficult to handle obtaining of viewing results on a P2P network where a content provider and an evaluator change dynamically. In addition, a device relating to viewer identification through face data identification for verifying that an evaluator (a person experiencing viewing) is actually present is disclosed; however, a dedicated device such as a camera is necessary, thus leading to an inconvenient system.

Further, there is a problem in that evaluation information in the related art may not provide timely evaluation information since time is taken after a product or a content item which is evaluated is presented until evaluation information is collected.

It is desirable to easily collect useful evaluation information having high reliability.

According to an embodiment of the present disclosure, there is provided an information processing apparatus including a notification reception unit that receives information transmitted and received using a first communication from a first terminal device when the first communication is performed between the first terminal device related to a provider of a product or a service and a second terminal device related to an evaluator of the product or the service; a sorting specification unit that specifies at least one of reliability sorting indicating the reliability of the provider of the product or the service, security sorting of the first terminal device, and security sorting of the second terminal device, based on identification information for the first terminal device and identification information for the second terminal device included in the information transmitted and received using the first communication; a link authentication unit that specifies a link authentication method of confirming a state of a second communication performed between the first terminal device and the second terminal device based on the specified result, and performs a process related to the link authentication using the specified method; and an evaluation information reception unit that receives evaluation information regarding the product or the service which is transmitted and received using the second communication having undergone the link authentication, from the first terminal device.

The information processing apparatus may further include a terminal device information database where identification numbers of the terminal devices are correlated with the security sorting of the plurality of terminal devices, and the sorting specification unit may specify the security sorting by searching the terminal device information database.

The link authentication unit may specify a method of link authentication for confirming that the second communication performed between the first terminal device and the second terminal device is continuously performed based on the specified result, and performs a process related to the link authentication by the method. The evaluation information reception unit may receive evaluation information, which is transmitted from the second terminal device to the first terminal device using the second communication, regarding the product or the service transmitted to the evaluator related to the second terminal device from the first terminal device using the second communication, from the first terminal device using a third communication.

The link authentication unit periodically may perform, according to the specified result, an evaluator identity confirmation process for confirming the identity of the second terminal device, by receiving information indicating whether or not information transmitted to the second terminal device using the third communication is transmitted to the first terminal device using the second communication, from the first terminal device using the third communication; and a provider identity confirmation process for confirming the identity of the first terminal device, by receiving information indicating whether or not information transmitted to the first terminal device using the third communication is transmitted to the second terminal device using the second communication, from the second terminal device using the third communication, respectively.

The link authentication unit specifies the link authentication method by determining whether or not the provider identity confirmation process is performed based on the reliability sorting.

The link authentication unit specifies the link authentication method by determining whether to use a unique key which the first terminal device or the second terminal device stores in advance, or a temporary key which the first terminal device or the second terminal device does not store in advance, based on the security sorting, in the evaluator identity confirmation process or the provider identity confirmation process.

According to another embodiment of the present disclosure, there is provided an information processing method including causing a notification reception unit to receive information transmitted and received using a first communication from a first terminal device when the first communication is performed between the first terminal device related to a provider of a product or a service and a second terminal device related to an evaluator of the product or the service; causing a sorting specification unit to specify at least one of reliability sorting indicating the reliability of the provider of the product or the service, security sorting of the first terminal device, and security sorting of the second terminal device, based on identification information for the first terminal device and identification information for the second terminal device included in the information transmitted and received using the first communication; causing a link authentication unit to specify a link authentication method of confirming a state of the second communication performed between the first terminal device and the second terminal device based on the specified result, and perform a process related to the link authentication using the specified method; and causing an evaluation information reception unit to receive evaluation information regarding the product or the service, which is transmitted and received using the second communication having undergone the link authentication, from the first terminal device.

According to still another embodiment of the present disclosure, there is provided a program enabling a computer to function as a notification reception unit that receives information transmitted and received using a first communication from a first terminal device when the first communication is performed between the first terminal device related to a provider of a product or a service and a second terminal device related to an evaluator of the product or the service; a sorting specification unit that specifies at least one of reliability sorting indicating the reliability of the provider of the product or the service, security sorting of the first terminal device, and security sorting of the second terminal device, based on identification information for the first terminal device and identification information for the second terminal device included in the information transmitted and received using the first communication; a link authentication unit that specifies a link authentication method of confirming a state of the second communication performed between the first terminal device and the second terminal device based on the specified result, and performs a process related to the link authentication using the specified method; and an evaluation information reception unit that receives evaluation information regarding the product or the service which is transmitted and received using the second communication having undergone the link authentication, from the first terminal device.

According to the embodiments of the present disclosure, information transmitted and received using the first communication is received from the first terminal device when the first communication is performed between the first terminal device related to a provider of a product or a service and a second terminal device related to an evaluator of the product or the service; at least one of reliability sorting indicating the reliability of the provider of the product or the service, security sorting of the first terminal device, and security sorting of the second terminal device is specified based on identification information for the first terminal device and identification information for the second terminal device included in the information transmitted and received using the first communication; a link authentication method of confirming a state of the second communication performed between the first terminal device and the second terminal device is specified based on the specified result, and a process related to the link authentication using the specified method is performed; and evaluation information regarding the product or the service which is transmitted and received using the second communication having undergone the link authentication, is received from the first terminal device.

According to still another embodiment of the present disclosure, there is provided an information processing apparatus including a device information reception unit that receives, using a first communication with a terminal device related to an evaluator of a product or a service provided by a self device, information including identification information for the terminal device and an address of a second communication; a device information transmission unit that transmits information including identification information for the self device to a server along with the identification information for the terminal device received using the first communication, using a third communication; a first confirmation request transmission unit that transmits a first confirmation request to the terminal device using the second communication when the first confirmation request which is set in advance is received from the server using the third communication; a first confirmation response transmission unit that transmits a first confirmation response, which is a confirmation response received using the second communication and is transmitted by the terminal device as a response to the first confirmation request, to a server using the third communication; and an evaluation information transmission unit that transmits evaluation information which is received from the terminal device using the second communication and indicates an evaluation of the product or the service provided by the self device, to the server using the third communication.

The information processing apparatus may further include a second confirmation response transmission unit that transmits a second confirmation response which is information generated by a preset process to the terminal device when a second confirmation request which is set in advance is received using the second communication.

The second confirmation response may include information which is obtained by decoding encrypted information included in the second confirmation request using a unique key which is stored in advance.

The information processing apparatus may further include a temporary key storage unit that receives a temporary key from the server using the third communication and stores the temporary key, and the second confirmation response may include the temporary key.

According to still another embodiment of the present disclosure, there is provided a program enabling a computer to function as a device information reception unit that receives, using a first communication with a terminal device related to an evaluator of a product or a service provided by a self device, information including identification information for the terminal device and an address of a second communication; a device information transmission unit that transmits information including identification information for the self device to a server along with the identification information for the terminal device received using the first communication, using a third communication; a first confirmation request transmission unit that transmits a first confirmation request to the terminal device using the second communication when the first confirmation request which is set in advance is received from the server using the third communication; a first confirmation response transmission unit that transmits a first confirmation response, which is a confirmation response received using the second communication and is transmitted by the terminal device as a response to the first confirmation request, to a server using the third communication; and an evaluation information transmission unit that transmits evaluation information which is received from the terminal device using the second communication and indicates an evaluation of the product or the service provided by the self device, to the server using the third communication.

According to the embodiments of the present disclosure, using a first communication with a terminal device related to an evaluator of a product or a service provided by a self device, information including identification information for the terminal device and an address of a second communication is received; information including identification information for the self device is transmitted to a server along with the identification information for the terminal device received using the first communication, using a third communication; a first confirmation request is transmitted to the terminal device using the second communication when the first confirmation request which is set in advance is received from the server using the third communication; a first confirmation response, which is a confirmation response received using the second communication and is transmitted by the terminal device as a response to the first confirmation request, is transmitted to a server using the third communication; and evaluation information which is received from the terminal device using the second communication and indicates an evaluation of the product or the service provided by the self device, is transmitted to the server using the third communication.

According to still another embodiment of the present disclosure, there is provided an information processing apparatus including a device information transmission unit that transmits, using a first communication with a terminal device related to a provider of a product or a service, information including identification information for a self device and an address of a second communication; a first confirmation request transmission unit that transmits a first confirmation request to the terminal device using the second communication when the first confirmation request which is set in advance is received from the server using the third communication; a first confirmation response transmission unit that transmits a first confirmation response, which is a confirmation response received using the second communication and is transmitted by the terminal device as a response to the first confirmation request, to a server using the third communication; and an evaluation information transmission unit that transmits evaluation information regarding information related to the product or the service which is received from the terminal device using the second communication, to the terminal device using the second communication.

The information processing apparatus may further include a second confirmation response transmission unit that transmits a second confirmation response which is information generated by a preset process to the terminal device when a second confirmation request which is set in advance is received using the second communication.

The second confirmation response may include information which is obtained by decoding encrypted information included in the second confirmation request using a unique key which is stored in advance.

The information processing apparatus may further include a temporary key storage unit that receives a temporary key from the server using the third communication and stores the temporary key, and the second confirmation response may include the temporary key.

According to still another embodiment of the present disclosure, there is provided a program enabling a computer to function as a device information transmission unit that transmits, using a first communication with a terminal device related to a provider of a product or a service, information including identification information for a self device and an address of a second communication; a first confirmation request transmission unit that transmits a first confirmation request to the terminal device using the second communication when the first confirmation request which is set in advance is received from the server using the third communication; a first confirmation response transmission unit that transmits a first confirmation response, which is a confirmation response received using the second communication and is transmitted by the terminal device as a response to the first confirmation request, to a server using the third communication; and an evaluation information transmission unit that transmits evaluation information regarding information related to the product or the service, which is received from the terminal device using the second communication, to the terminal device using the second communication.

According to the embodiments of the present disclosure, using a first communication with a terminal device related to a provider of a product or a service, information including identification information for a self device and an address of a second communication is transmitted; a first confirmation request is transmitted to the terminal device using the second communication when the first confirmation request which is set in advance is received from the server using the third communication; a first confirmation response, which is a confirmation response received using the second communication and is transmitted by the terminal device as a response to the first confirmation request, is transmitted to a server using the third communication; and evaluation information regarding information related to the product or the service which is received from the terminal device using the second communication, is transmitted to the terminal device using the second communication.

According to the embodiments of the present disclosure, it is possible to easily collect useful evaluation information having high reliability.

BRIEF DESCRIPTION OF THE DRAWINGS

FIG. 2 is a diagram illustrating another configuration example of the evaluation information collecting system according to an embodiment of the present disclosure.

FIG. 3 is a block diagram illustrating a configuration example of a portable terminal.

FIG. 4 is a block diagram illustrating a configuration example of a server.

FIG. 5 is a diagram illustrating an example of terminal device information.

FIG. 6 is a diagram illustrating an example of a method of collecting evaluation information by performing link authentication.

FIG. 15 is a diagram illustrating information for specifying a link authentication method.

DETAILED DESCRIPTION OF EMBODIMENTS

Hereinafter, embodiments of the present disclosure will be described with reference to the drawings.

According to an embodiment of the present disclosure, for example, evaluation information is collected using the handover function of a portable terminal.

For example, there is a case where a portable terminal constituted by a mobile phone has a short-distance wireless communication unit such as Bluetooth (registered trademark) or Wi-Fi (registered trademark). In this case, mobile phones can directly (locally) communicate with each other. Further, if the mobile phones have noncontact communication (NFC (Near Field Communication)) devices, a user brings the mobile phones close to (or contact) each other, and connection authentication is performed using the noncontact communication devices, thereby enabling the short-distance wireless communication. As such, the function of enabling the short-distance wireless communication through the connection authentication using the noncontact communication device is called a handover.

By using the handover function, a user can receive provision of a service or purchase a product by merely making the mobile phones touch each other. For example, when a content item is purchased as a product, the user only makes the mobile phones touch each other, and thereby data for the content can be downloaded to the portable terminal using the short-distance wireless communication.

Figure 1:
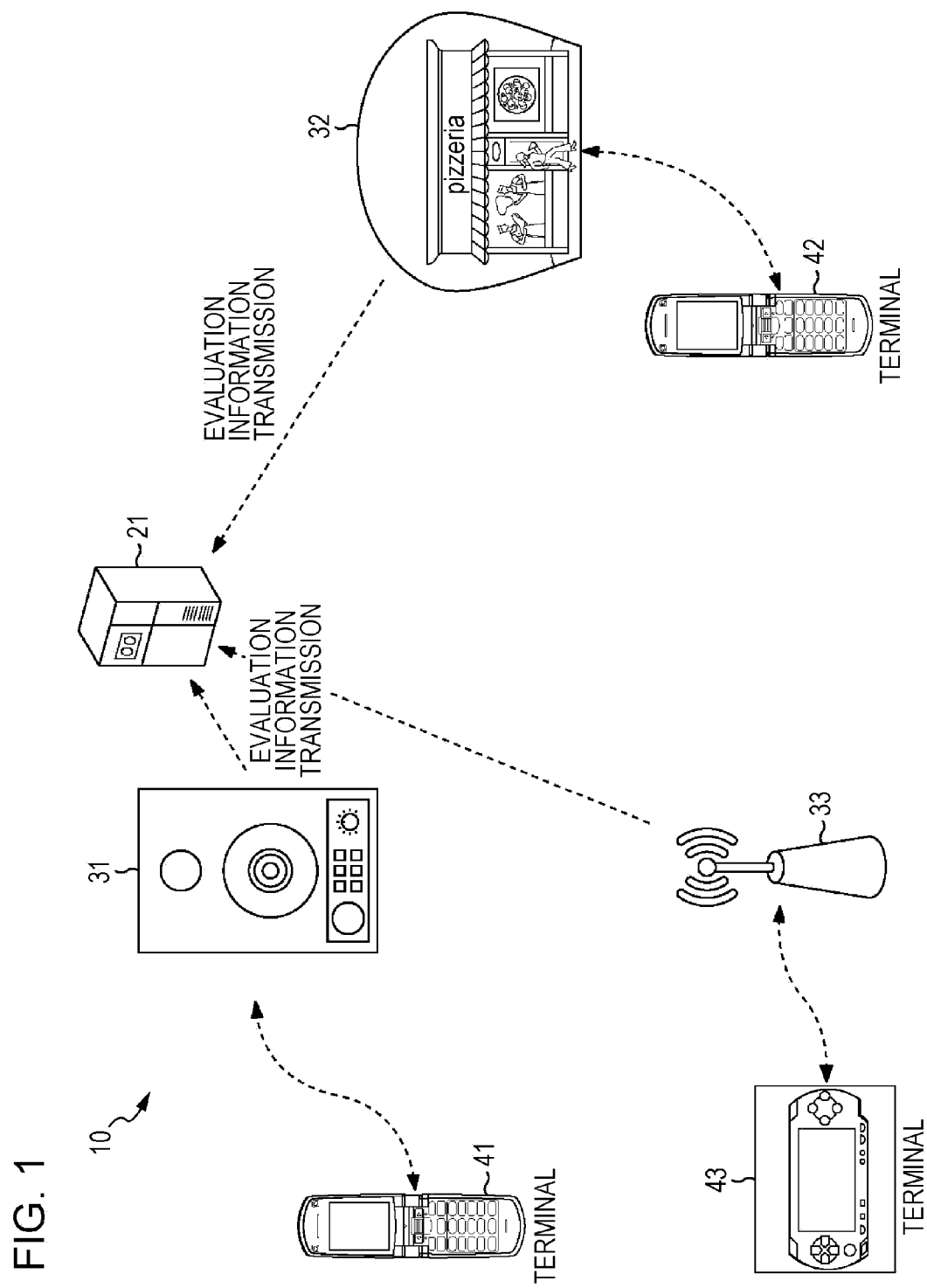
FIG. 1 is a diagram illustrating a configuration example of an evaluation information collecting system according to an embodiment of the present disclosure.

FIG. 1 is a diagram illustrating a configuration example of an evaluation information collecting system according to an embodiment of the present disclosure. In the example shown in the same figure, an evaluation information collecting system 10 includes a server 21, information collecting terminals 31 to 33, and portable terminals 41 to 43.

The server 21 is installed in, for example, a data center of an evaluation information collector, obtains evaluation information transmitted from the information collecting terminals 31 to 33, and preserves, processes, or the like the obtained evaluation information. The server 21 classifies the obtained evaluation information for each kind of product or service which is an evaluation target, provides the classified evaluation information to users who have access thereto via a network.

The information collecting terminals 31 to 33 are respectively regarded as terminals which perform communication using the handover function of the portable terminals 41 to 43, and are regarded as having a short-distance wireless communication unit and a noncontact communication device.

For example, the information collecting terminal 31 is a device which provides a trial listening service of music content. For example, when a user makes the portable terminal 41 touch a predetermined region, the information collecting terminal 31 transmits a portion of the content data using the short-distance wireless communication after the noncontact communication, and allows the portable terminal 41 to reproduce the content by streaming. Thereby, the user wears headphones or the like connected to the portable terminal 41 and can listen to the content by trial.

In addition, the information collecting terminal 32 is a device such as a POS terminal used in, for example, a restaurant. For example, when a user makes the portable terminal 42 touch a predetermined region, the information collecting terminal 32 transmits GUI data or the like of a menu or an order format using the short-distance wireless communication after the noncontact communication such that the portable terminal 42 displays the information. Thereby, the user can order a desired menu from the portable terminal 42, or can obtain complimentary points by responding to a questionnaire.

The information collecting terminal 33 is a device such as a wireless communication hub installed in a predetermined area such as, for example, a shopping mall or a theme park. When a user makes the portable terminal 43 touch a predetermined region, the information collecting terminal 33 transmits game content using the short-distance wireless communication after the noncontact communication. Thereby, the user can enjoy the game from the portable terminal 43.

Each of the information collecting terminals 31 to 33 has a wide area communication unit for communicating with the server 21 independently from the short-distance wireless communication unit and the noncontact communication device. The wide area communication unit includes a wireless communication device which performs communication via a mobile communication network by performing wireless communication with the nearest wireless base station. Alternatively, there may be a configuration in which the information collecting terminals are connected to the server 21 using a dedicated line.

The portable terminals 41 and 42 include, for example, mobile phones, and the portable terminal 43 includes, for example, a game console. The portable terminals 41 to 43 are respectively regarded as terminals which perform communication using the handover function, and are regarded as having a short-distance wireless communication unit and a noncontact communication device. In addition, independently therefrom, the portable terminals have a wireless communication device which performs communication via a mobile communication network by performing wireless communication with the nearest wireless base station.

In the example shown in FIG. 1, the number of reproduction commands of each piece of content, attribute information for a user of the portable terminal 41 obtained through the noncontact communication, and the like, which are information accumulated in, for example, the information collecting terminal 31, are transmitted to the server 21 as evaluation information.

In addition, the number of orders for each menu, responses to a questionnaire, and the like, which are information accumulated in, for example, the information collecting terminal 32, are transmitted to the server 21 as evaluation information.

Further, operation information for a game and the like, which are information accumulated in, for example, the information collecting terminal 33, are transmitted to the sever 21 as evaluation information.

As described above, the transmission of the evaluation information from the information collecting terminals 31 to 33 to the server 21 is performed using the wide area communication unit.

FIG. 2 is a diagram illustrating another configuration example of the evaluation information collecting system according to an embodiment of the present disclosure. In the example shown in the same figure, the evaluation information collecting system 10 includes the server 21, and the portable terminals 44 to 47.

The portable terminals 44 to 47 are respectively constituted by mobile phones in a manner similar to the portable terminals 41 and 42 in FIG. 1. In the example shown in FIG. 2, a user of the portable terminal 45 and a user of the portable terminal 47 respectively become providers of content, and a user of the portable terminal 44 and a user of the portable terminal 46 respectively become evaluators.

In the example shown in FIG. 2, the server 21 is installed in a data center of an evaluation information collector, obtains evaluation information transmitted from the portable terminals 45 to 47, and preserves, processes, or the like, the obtained evaluation information.

For example, it is assumed that the user of the portable terminal 45 downloads data for music content which the user wishes to recommend to the user's friend, to the portable terminal 45. In a case where the portable terminal touches the portable terminal 45, the content data is transmitted from the portable terminal 45 using the short-distance wireless communication after the noncontact communication, and the portable terminal 44 reproduces the content by streaming. Thereby, a user of the portable terminal 44 wears headphones or the like and can listen to the content by trial. In addition, the user of the portable terminal 44 transmits evaluation of the music (for example, a brief comment) to the portable terminal 45 using the short-distance wireless communication.

In addition, for example, it is assumed that the user of the portable terminal 47 plays a network game, and intends the user of the portable terminal 46 who is a friend of the user to participate in the network game. In a case where the portable terminal 46 touches the portable terminal 47, data for the game is transmitted from the portable terminal 47, and the portable terminal 46 displays the game on the screen.

Thereby, the user of the portable terminal 46 can participate in the network game which the user of the portable terminal 47 plays. In addition, profile information and the like of the user, game operation information, and the like are transmitted from the portable terminal 46 to the portable terminal 45 using the short-distance wireless communication.

In the example shown in FIG. 2, for example, a comment on the music and the like, which are information accumulated in the portable terminal 45, are transmitted to the server 21 as evaluation information.

Further, for example, the game operation information and the like, which are information accumulated in the portable terminal 47, are transmitted to the server 21 as evaluation information.

The wide area communication unit is used to transmit the evaluation information from the portable terminals 45 and 47 to the server 21.

As such, in the evaluation information collecting system 10 according to the embodiment of the present disclosure, the collected evaluation information is not biased to the user comment type, and, for example, viewing records of users regarding each piece of content can also be collected as the evaluation information.

FIG. 3 is a block diagram illustrating a configuration example of the portable terminal shown in FIG. 1 or 2. FIG. 3 shows a configuration of the portable terminal 41; however, the configuration shown in FIG. 3 is applicable to the portable terminals 42 to 47.

In FIG. 3, a CPU (Central Processing Unit) 111 of the portable terminal 41 performs various kinds of processes according to a program stored in a ROM (Read Only Program) 112 or a program loaded from a storage unit 123 on a RAM (Random Access Memory) 113. The RAM 113 appropriately stores data which is necessary for the CPU 111 to perform various kinds of processes.

The CPU 111, the ROM 112, and the RAM 113 are connected to each other via a bus 114. The bus 114 is also connected to an input and output interface 120.

The input and output interface 120 is connected to an input unit 121 including a keyboard, a mouse, and the like, a display including an LCD (Liquid Crystal Display), and the like, an output unit 122 including a speaker and the like, and the storage unit 123 including a hard disk, a flash memory, or the like.

The input and output interface 120 is connected to a drive 125 as necessary, where a removable medium 126 such as a magnetic disk, an optical disc, a magneto-optical disc, or a semiconductor memory is appropriately mounted, and a computer program read therefrom is installed in the storage unit 123 as necessary.

In addition, the input and output interface 120 is connected to a mobile communication network wireless communication unit 131, a short-distance wireless communication unit 132, and a noncontact communication unit 133.

The mobile communication network wireless communication unit 131 is a wireless communication device which performs wireless communication with a wireless base station (not shown) and performs communication via a mobile communication network. For example, the mobile communication network wireless communication unit 131 is used for various kinds of communication applications such as an Internet connection using data communication of a maximum of 2 Mbps as well as a call application using a frequency band of 2 GHz. For example, the wireless communication by the mobile communication network wireless communication unit 131 is used for downloading content data, communicating with the server 21, and the like. In addition, the mobile communication network wireless communication unit 131 is assumed to include a device or the like which can perform communication using, for example, a communication scheme of a so-called third generation mobile phone.

The short-distance wireless communication unit 132 is a short-distance wireless communication device such as, for example, Bluetooth (registered trademark, also referred to as BT), IEEE (Institute of Electrical and Electronic Engineers) 802.11x, or the like. Here, the short-distance wireless communication indicates local (short range) wireless communication of which the maximum communicable distance is several meters to several tens of meters. Communication standards thereof are arbitrary. For example, the short-distance wireless communication unit 132 performs communication of the maximum communication rate 3 Mbit/sec (version 2.0+EDR thereafter) at 2.4 GHz via an antenna.

The noncontact communication unit 133 is an NFC (Near Field Communication) device. Here, the noncontact communication indicates local (short range) wireless communication of which the maximum communicable distance is about several tens of centimeters. Communication standards thereof are arbitrary. For example, the noncontact communication unit 133 performs communication at a communication rate of a maximum of 424 Kbit/sec at a very short distance of about 10 cm using a frequency of 13.56 MHz via an antenna.

The noncontact communication by the noncontact communication unit 133 is used to send and receive information necessary to establish short-distance wireless communication connection by the short-distance wireless communication unit 132, a list of content which can be transmitted, or the like to and from a portable terminal which the casing touches or is located at a short distance.

The respective units of the portable terminal 41 are controlled by the CPU 111. Binary codes for executing a control program are stored in the ROM 112 or the storage unit 123, and stacks and heap regions for various kinds of calculations are developed on the RAM 113.

In addition, the information collecting terminals 31 to 33 have the same configuration as in the example shown in FIG. 3, and thus detailed description thereof will be omitted.

FIG. 4 is a block diagram illustrating a configuration example of the server in FIG. 1 or FIG. 2.

As shown in FIG. 4, the server 21 has a CPU 201, a ROM 202, and a RAM 203 which are connected to each other via a bus 204 in a manner similar to the portable terminal 41. The bus 204 is connected to an input and output interface 210.

The input and output interface 210 is connected to an input unit 211, an output unit 212, a storage unit 213, and a drive 215 for a removable medium 216, in a manner similar to the portable terminal 41.

The CPU 201, the ROM 202, the RAM 203, the bus 204, the input and output interface 210, the input unit 211, the output unit 212, the storage unit 213, the drive 215, and the removable medium 216 in FIG. 4 respectively correspond to the CPU 111, the ROM 112, the RAM 113, the bus 114, the input and output interface 120, the input unit 121, the output unit 122, the storage unit 123, the drive 125, and the removable medium 126 in FIG. 3.

The server 21 further has a communication unit 214 connected to the input and output interface 210. The communication unit 214 is a communication device communicating with other devices via a network. For example, the communication unit 214 is connected to a mobile communication network via a wired network and is used to communicate with the portable terminals or the information collecting terminals.

Further, the input and output interface 210 is connected to an evaluation information database 221 and a terminal device database 222.

The evaluation information database 221 stores evaluation information transmitted from the portable terminal or the information collecting terminal. The evaluation information database 221 classifies the evaluation information, for example, for each product or service which is an evaluation target, and generates a database of the evaluation information so as to search for the evaluation information using identification information for a product or the like, identification information for an evaluator, the evaluation date, and the like, as keywords.

The terminal device database 222 stores information related to a communication function of the portable terminal or the information collecting terminal (appropriately referred to as a terminal device) for each terminal.

FIG. 5 is a diagram illustrating an example of information stored in the terminal device database 222. FIG. 5 shows an example of terminal device information for a portable terminal having, for example, a predetermined identification number.

The "wide area communication type" shown in FIG. 5 is regarded as information for specifying the type of wide area communication unit of the corresponding portable terminal, and describes, for example, 3G (IMT-2000) information, WiMAX (Worldwide Interoperability for Microwave Access) information, or the like.

The "wide area communication address" describes information for specifying an address when communication is performed using the above-described wide area communication unit.

The "short-distance wireless communication type" is regarded as information for specifying the type of a short-distance wireless communication unit of the corresponding portable terminal and describes, for example, Bluetooth (registered trademark) information, Wi-Fi information, or the like.

The "short-distance wireless communication address" describes information for specifying an address when communication is performed using the above-described short-distance wireless communication unit.

The "noncontact communication type" is information for specifying a communication type which can be performed by the noncontact communication of the corresponding portable terminal, and describes, for example, "data response only", "data obtaining only", and "data transmission and reception enabled".

The "unique key" is regarded as information indicating a secret key stored in a corresponding portable terminal in advance. In addition, if the corresponding portable terminal has a security module, information for a key necessary to access the security module is described.

The "provider sorting" is regarded as information for specifying whether or not a corresponding portable terminal is a portable terminal of a provider of a product or a service, or information for specifying the type of a product or a service provided, and describes information indicating the information.

As such, the terminal device database 222 of the server 21 stores the terminal device information for the information collecting terminal 31, the terminal device information for the information collecting terminal 32, ..., the terminal device information for the portable terminal 41, and the terminal device information for the portable terminal 42, .... In other words, the terminal device database 222 stores the terminal device information for the terminal devices which can participate in the evaluation information collecting system 10, so as to be correlated with the respective pieces of identification information.

As such, the evaluation information collecting system 10 of the embodiment of the present disclosure collects evaluation information using the handover function of the portable terminal. The evaluation information collected using the handover function is evaluation information obtained when a provider and an evaluator of a product or a service come close to each other. This is because the handover function performs the short-distance wireless communication through connection authentication by the noncontact communication device of the close portable terminal.

The evaluation information collected in this way is useful because it is an authentic voice of a user who has actually received the provision of a product or a service, and may be referenced when purchasing the product or the service. For example, the reason is that the evaluation information collected using the handover function is directly evaluated by a user who has actually received provision of a product or a service unlike an introduction article of the product or the service published in a magazine. In addition, the reason is that the evaluation information collected using the handover function is not collected from a person who does not actually receive provision of the product or the service unlike information posted on an Internet bulletin board.

However, in a case of collecting evaluation information using the handover function, it is difficult to prove whether or not the evaluation information has really been collected using the handover function. In other words, as described above, since the evaluation information is collected immediately after a product or a service is provided using the short-distance wireless communication, the evaluation information collected using the handover function is interpreted as being useful. For example, in a case where the server 21 collects evaluation information from the portable terminal or the information collecting terminal by a batch method, it is difficult to dispel doubt that a provider of a product or a service transmits only evaluation information suitable for the provider, or fakes evaluation information.

Of course, an evaluation information collector is considered to make an effort to fairly collect information; however, for example, if an evaluation of a specific product is very high as compared to other products, a person referencing the evaluation information suspects that some impropriety has been performed. Further, even if a provider of a product or a service bears no malice, in a case where evaluation information fails to be transmitted due to trouble or the like of software, or evaluation information which has been transmitted is repeatedly transmitted, resultantly biased evaluation is created. Due to the occurrence of the situation, reliability of evaluation information provided by the server 21 and related evaluation may be considerably lowered thereafter.

Therefore, in the embodiment of the present disclosure, when the server 21 collects evaluation information, it is confirmed that the short-distance wireless communication between the portable terminal or the information collecting terminal of a provider and the portable terminal of an evaluator is continuously performed. This proves that the evaluation information is collected immediately after a product or a service is provided.

Although details are described later, in the embodiment of the present disclosure, a notification of a handover between the portable terminal or the information collecting terminal of the provider and the portable terminal of the evaluator is instantly sent to the server 21. In addition, the server 21 accesses, for example, the portable terminal or the information collecting terminal of the provider using the wide area communication unit, and confirms that the short-distance wireless communication with the portable terminal of the same evaluator is continuously performed.

The confirmation of continuous short-distance wireless communication with the same evaluator may be performed, for example, as follows. If there is a notification of the handover, the server 21 transmits predetermined authentication information to the portable terminal of the evaluator, and confirms that the authentication information is transmitted from the portable terminal of the evaluator using the short-distance wireless communication after the handover. In addition, the confirmation that the short-distance wireless communication with the portable terminal of the same evaluator is continuously performed is hereinafter referred to as link authentication.

FIG. 6 is a diagram illustrating an example of a method of collecting evaluation information through the link authentication in the evaluation information collecting system 10. FIG. 6 shows an example where a portion of content data is transmitted using the short-distance wireless communication (BT) after the noncontact communication (NFC communication) through the handover between the information collecting terminal 31 and the portable terminal 41, and is reproduced by streaming.

In the example shown in FIG. 6, the information collecting terminal 31 notifies the server 21 of the handover between the information collecting terminal 31 and the portable terminal 41 using the wide area communication. At this time, an identification number of the information collecting terminal 31 and an identification number of the portable terminal 41 are also transmitted to the server 21. Thereafter, the server 21 generates a random number and encrypts the random number using the unique key of the portable terminal 41. In addition, the unique key of the portable terminal 41 can be obtained by searching the terminal device database 222 using the identification number of the portable terminal 41.

The server 21 transmits the random number which has been encrypted (referred to as an encrypted random number) to a wide area communication address of the information collecting terminal 31. In addition, the wide area communication address of the information collecting terminal 31 can be obtained by searching the terminal device database 222 using the identification number of the information collecting terminal 31.

The information collecting terminal 31 transmits the encrypted random number transmitted from the server 21 to the portable terminal 41 using the short-distance wireless communication.

The portable terminal 41 obtains the random number by decoding the encrypted random number with the unique key of the portable terminal 41. The portable terminal 41 transmits the random number to the information collecting terminal 31 using the short-distance wireless communication.

The information collecting terminal 31 transmits the random number transmitted from the portable terminal 41 to the server 21 using the wide area communication.

The server 21 compares the random number transmitted from the information collecting terminal 31 with the random number generated by the server 21, and if both match the other, confirms that the short-distance wireless communication with the evaluator at the time of the handover is performed. That is to say, it is possible to confirm the identity of the evaluator.

Thereafter, the information collecting terminal 31 transmits a portion of the content data using the short-distance wireless communication, and the portable terminal 41 reproduces the content by streaming. At this time, the portable terminal 41 transmits evaluation information to the information collecting terminal 31.

As such, while the transmission of the content data and the transmission of the evaluation information using the short-distance wireless communication are performed between the information collecting terminal 31 and the portable terminal 41, the server 21 continuously (periodically) confirms the identity of the evaluator as described above, for example, at constant cycles.

In addition, the evaluation information accumulated in the information collecting terminal 31 is transmitted to the server 21 using the wide area communication.

In this way, the link authentication is performed and the evaluation information is collected in the evaluation information collecting system 10.

Figure 7:
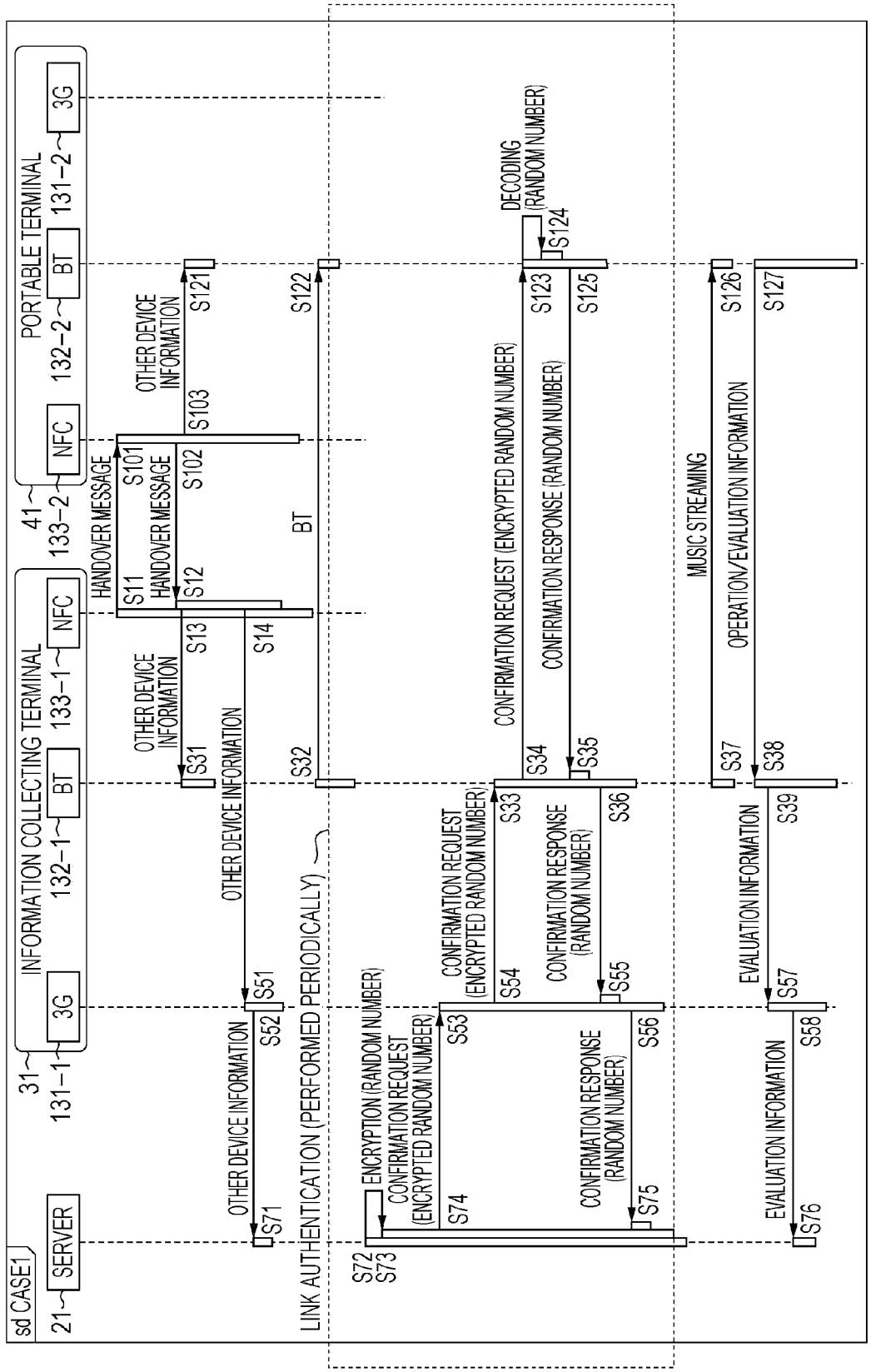
FIG. 7 is an arrow chart illustrating the flow of processes in the method in FIG. 6.

FIG. 7 is an arrow chart illustrating the flow of processes of collecting the evaluation information through the link authentication described with reference to FIG. 6.

In FIG. 7, the mobile communication network wireless communication unit 131 of the information collecting terminal 31 is denoted by 3G 131-1, and the mobile communication network wireless communication unit 131 of the portable terminal 41 is denoted by 3G 131-2. In addition, the short-distance wireless communication unit 132 of the information collecting terminal 31 is denoted by BT 132-1, and the short-distance wireless communication unit 132 of the portable terminal 41 is denoted by BT 132-2. Further, the noncontact communication unit 133 of the information collecting terminal 31 is denoted by NFC 133-1, and the noncontact communication unit 133 of the portable terminal 41 is denoted by NFC 133-2.

Here, 3G is a communication scheme of a digital mobile phone such as W-CDMA or CDMA2000, and indicates a so-called third generation mobile phone (3G).

In step S11, the NFC 133-1 of the information collecting terminal 31 transmits a handover message, and, in step S101, the NFC 133-2 of the portable terminal 41 receives the handover message.

In step S102, the NFC 133-2 transmits the handover message, and, in step S12, the NFC 133-1 receives the handover message.

By the process hitherto, the information collecting terminal 31 and the portable terminal 41 exchange other device information. In addition, the other device information is information such as an identification number of a device of the other party of the handover and a short-distance wireless communication address.

In step S13, the NFC 133-1 notifies the BT 132-1 of the other device information, which is obtained by the BT 132-1 in step S31. In addition, in step S103, the NFC 133-2 notifies the BT 132-2 of the other device information, which is obtained by the BT 132-2 in step S121. Further, in practice, a notification of the other device information, and other pieces of information are sent via the CPU 111. This is also true for the following.

In step S14, the NFC 133-1 notifies the 3G 131-1 of the other device information, which is obtained by the 3G 131-1 in step S51.

In step S52, the 3G 131-1 sends a notification of the handover by transmitting information including the other device information to the server 21, and in step S71, the server 21 obtains it. In addition, in order to notify the server 21 of the handover, the other device information for itself (in this case, the information collecting terminal 31) as well as the other device information for the other party of the handover is transmitted.

A connection request is transmitted from the BT 132-1 to the BT 132-2 in step S32, and is received in step S122.

The server 21 generates a random number in step S72, which is encrypted in step S73. In step S74, the server 21 transmits the encrypted random number obtained by the process in step S73 as a confirmation request, and the 3G 131-1 receives the encrypted random number in step S53.

In step S54, the 3G 131-1 notifies the BT 132-1 of the confirmation request received in step S53, which is obtained in step S33.

In step S34, the BT 132-1 transmits the confirmation request obtained in step S33, and the BT 132-2 obtains the confirmation request in step S123.

In step S124, the BT 132-2 decodes the encrypted random number of the confirmation request received in step S123 and obtains the random number. In addition, the decoding of the random number is in practice performed by the CPU 111.

In step S125, the BT 132-2 transmits the random number obtained by the process in step S124 as a confirmation response, and in step S35, the BT 132-1 receives the confirmation response.

In step S36, the BT 132-1 notifies the 3G 131-1 of the confirmation response received in step S35, which is obtained in step S55.

In step S56, the 3G 131-1 transmits the confirmation response obtained in step S55, and the server 21 receives the confirmation response in step S75.

In steps S37 and S126, content data is transmitted and received, and in steps S127 and S38, operation information as the evaluation information is transmitted and received.

In step S39, the BT 132-1 notifies the 3G 131-1 of the evaluation information, which is obtained in step S57.

In step S58, the 3G 131-1 transmits the evaluation information obtained in step S57, and the server 21 receives the evaluation information in step S76.

In addition, the processes in the part surrounded by the dotted line in the figure are processes for confirming the identity of the evaluator and are performed periodically.

In this way, a process of collecting the evaluation information is performed through the link authentication.

As appropriately denoted in the description of FIG. 7, the subjects performing the respective steps in the arrow chart are denoted by 3G 131-1, BT 132-1, . . . , and the like in this example, but these are for convenience. In other words, since three kinds of communication types, that is, the noncontact communication, the short-distance wireless communication, and the wide area communication are used in the embodiment of the present disclosure, the denotation is made such that it can be easily recognized which communication type the information transmitted and received in each step is using. Therefore, in practice, the process related to each step is performed by the CPU 111 or the like. This is also true for the following arrow charts.

However, although an example of the case where the portable terminal 41 holds the unique key has been described in the example described with reference to FIG. 6, there is a case where the portable terminal 41 does not hold a unique key. In this case, for example, it is possible to confirm the identity of an evaluator as shown in FIG. 8.

Figure 8:
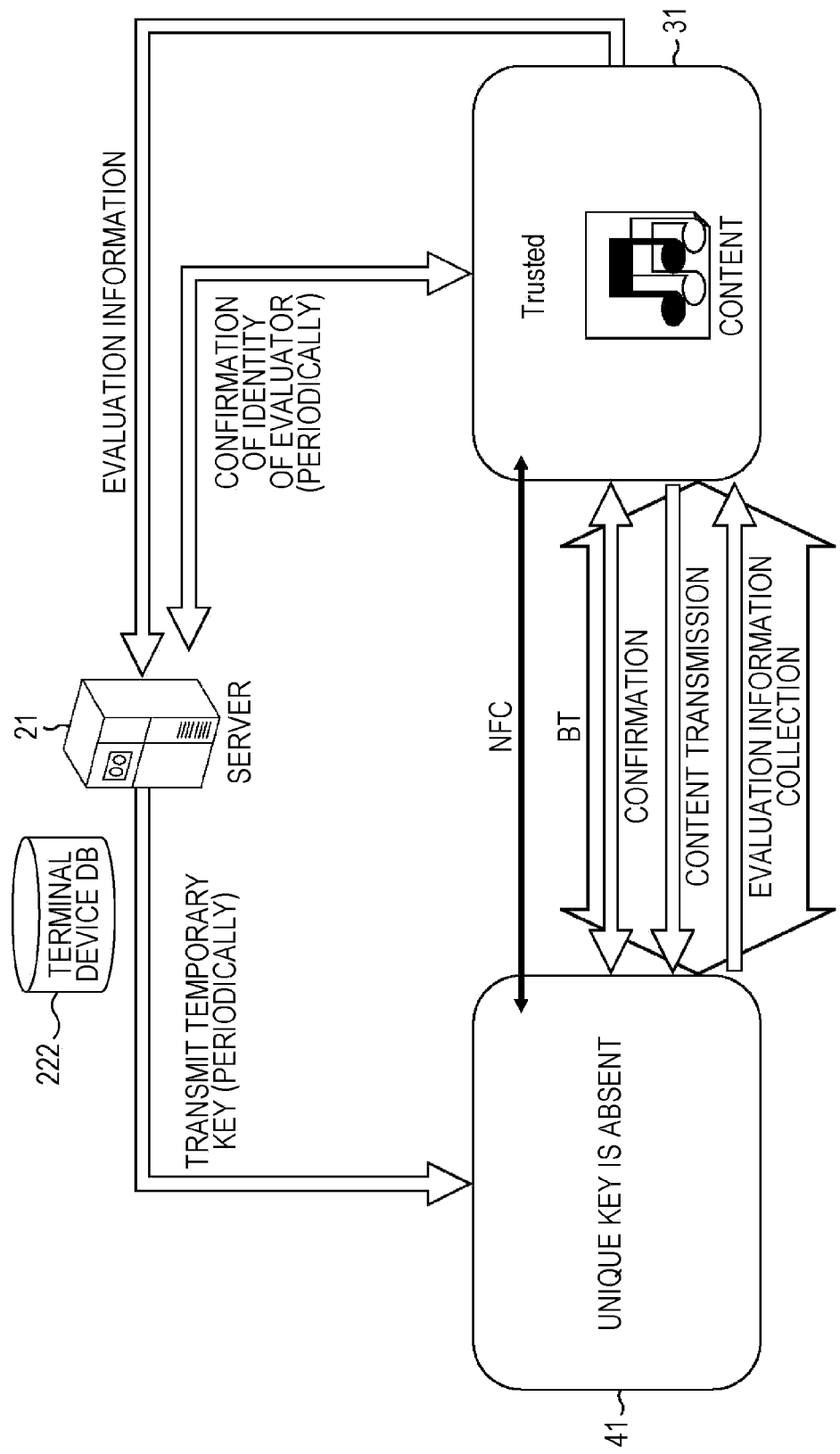
FIG. 8 is a diagram illustrating another example of a method of collecting evaluation information by performing link authentication.

FIG. 8 is a diagram illustrating another example of a method of collecting evaluation information through the link authentication in the evaluation information collecting system 10. FIG. 8 shows an example where a portion of content data is transmitted using the short-distance wireless communication (BT) after the noncontact communication (NFC communication) through the handover between the information collecting terminal 31 and the portable terminal 41, and is reproduced by streaming. In the case of the example shown in FIG. 8, the portable terminal 41 does not hold a unique key unlike the case in FIG. 6.

In the example shown in FIG. 8, the server 21 is notified of the handover between the information collecting terminal 31 and the portable terminal 41 using the wide area communication. At this time, an identification number of the information collecting terminal 31 and an identification number of the portable terminal 41 are also transmitted to the server 21. Thereafter, the server 21 generates a random number, but confirms that the portable terminal 41 does not hold a unique key. In addition, the fact that the portable terminal 41 does not hold a unique key can be confirmed by searching the terminal device database 222 using the identification number of the portable terminal 41.

The server 21 transmits the random number to a wide area communication address of the portable terminal 41 as a temporary key. In addition, the wide area communication address of the portable terminal 41 can be obtained by searching the terminal device database 222 using the identification number of the portable terminal 41.

The server 21 transmits a confirmation request to the wide area communication address of the information collecting terminal 31, and the confirmation request is transmitted from the information collecting terminal 31 to the portable terminal 41 using the short-distance wireless communication.

The portable terminal 41 transmits the temporary key to the information collecting terminal 31 using the short-distance wireless communication as a response to the confirmation request, and the information collecting terminal 31 transmits the response to the server 21 using the wide area communication.

The server 21 compares the temporary key transmitted from the information collecting terminal 31 with the random number generated by the server 21, and if both match the other, confirms that the short-distance wireless communication with the evaluator at the time of the handover is performed. That is to say, it is possible to confirm the identity of the evaluator.

Thereafter, the information collecting terminal 31 transmits a portion of the content data using the short-distance wireless communication, and the portable terminal 41 reproduces the content by streaming. At this time, the portable terminal 41 transmits evaluation information to the information collecting terminal 31.

As such, while the transmission of the content data using the short-distance wireless communication and the transmission of the evaluation information are performed between the information collecting terminal 31 and the portable terminal 41, the server 21 continuously (periodically) confirms the identity of the evaluator as described above, for example, at constant cycles.

In addition, the evaluation information accumulated in the information collecting terminal 31 is transmitted to the server 21 using the wide area communication.

In this way, the link authentication is performed and the evaluation information is collected in the evaluation information collecting system 10 even if the portable terminal 41 does not have a unique key.

Figure 9:
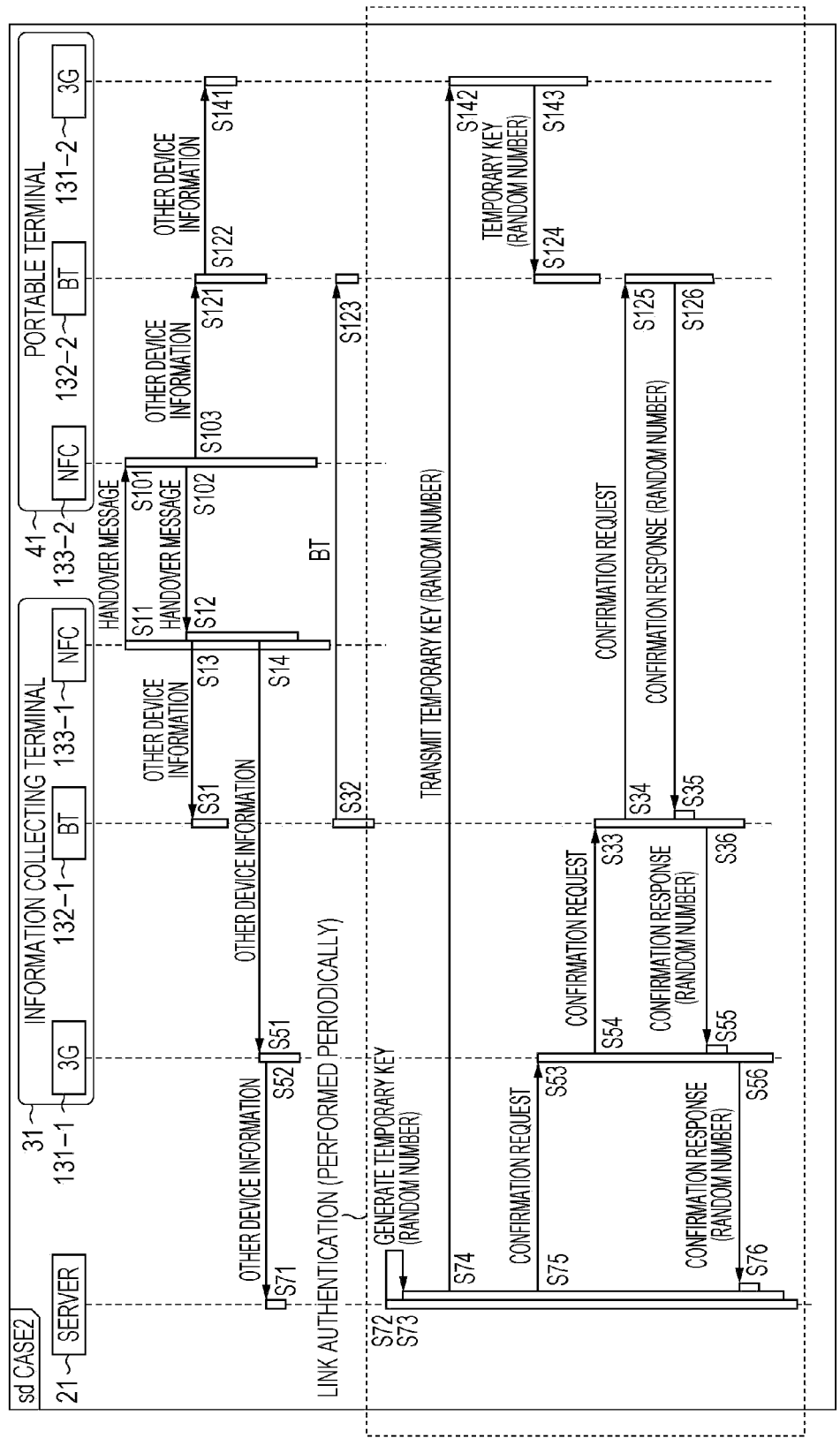
FIG. 9 is an arrow chart illustrating the flow of processes in the method in FIG. 8.

FIG. 9 is an arrow chart illustrating the flow of processes of collecting the evaluation information through the link authentication described with reference to FIG. 8.

In step S11, the NFC 133-1 of the information collecting terminal 31 transmits a handover message, and, in step S101, the NFC 133-2 of the portable terminal 41 receives the handover message.

In step S102, the NFC 133-2 transmits the handover message, and, in step S12, the NFC 133-1 receives the handover message.

By the process hitherto, the information collecting terminal 31 and the portable terminal 41 exchange other device information. In addition, the other device information is regarded as information such as an identification number of a device of the other party of the handover and a short-distance wireless communication address. Further, the other device information is assumed to include a wide area communication address of the server 21 as necessary.

In step S13, the NFC 133-1 notifies the BT 132-1 of the other device information, which is obtained by the BT 132-1 in step S31. In addition, in step S103, the NFC 133-2 notifies the BT 132-2 of the other device information, which is obtained by the BT 132-2 in step S121.

In step S122, the BT 132-2 notifies the 3G 131-2 of the other device information obtained in step S121, which is obtained in step S141. In addition, the processes in step S122 and step S141 may be omitted.

In step S14, the NFC 133-1 notifies the 3G 131-1 of the other device information, which is obtained by the 3G 131-1 in step S51.

In step S52, the 3G 131-1 sends a notification of the handover by transmitting information including the other device information to the server 21, and in step S71, the server 21 obtains the information. In addition, in order to notify the server 21 of the handover, the other device information for itself (in this case, the information collecting terminal 31) as well as the other device information for the other party of the handover to be transmitted.

A connection request is transmitted from the BT 132-1 to the BT 132-2 in step S32, and is received in step S123.

In steps S72 and S73, the server 21 generates a random number, which is set to a temporary key. In step S74, the server 21 transmits the temporary key obtained by the process in step S73, and the 3G 131-2 receives the temporary key in step S142.

In step S143, the 3G 131-2 notifies the BT 132-2 of the temporary key received in step S142, which is obtained in step S124.

The server 21 transmits a confirmation request in step S75, which is received by 3G 131-1 in step S53.

In step S54, the 3G 131-1 notifies the BT 132-1 of the confirmation request received in step S53, which is obtained in step S33.

In step S34, the BT 132-1 transmits the confirmation request obtained in step S33, which is received by the BT 132-2 in step S125.

In step S126, the BT 132-2 transmits the temporary key obtained in step S124 as a response to the confirmation request received in step S125, and the BT 132-1 receives the confirmation response in step S35.

In step S36, the BT 132-1 notifies the 3G 131-1 of the confirmation response received in step S35, which is obtained in step S55.

In step S56, the 3G 131-1 transmits the confirmation response obtained in step S55, which is received by the server 21 in step S76.

Thereafter, transmission and reception of content data and transmission and reception of operation information as evaluation information are performed; however, such processes are similar to the case described with reference to FIG. 7, and thus detailed description thereof will be omitted.

In addition, the processes in the part surrounded by the dotted line in the figure are processes for confirming the identity of the evaluator that are performed periodically.

In this way, the process of collecting the evaluation information is performed through the link authentication.

In the example described with reference to FIG. 6 and in the example described with reference to FIG. 8, the link authentication is performed based on the information obtained only from the information collecting terminal 31. However, in some cases, this method may not function efficiently in a case where there is not a sufficient trusting relationship between an evaluation information collector or the like who operates the server 21 and a content provider which operates the information collecting terminal 31. In order to indicate that the content provider operating the information collecting terminal 31 is reliable, "Trusted" is written in the information collecting terminal 31 in FIGS. 6 and 8.

For example, if a provider of content is not reliable, it is not certain that the random number obtained through the decoding in the portable terminal 41 and the temporary key received by the portable terminal 41 using the wide area communication are transmitted to the server 21 as they are. In other words, it is difficult to deny the possibility that the confirmation response transmitted in step S56 in FIG. 7 and in step S56 in FIG. 9 is fake.

For this reason, in a case where there is not a sufficient trusting relationship between the evaluation information collector or the like and the content provider, it is not sufficient to confirm the identity of an evaluator based on information transmitted from the provider, and it is further necessary to confirm the identity of the provider based on information transmitted from the evaluator. That is to say, for example, since it is difficult to deny the possibility that a provider pretends to be an evaluator, it is necessary for the provider side and the evaluator side to respectively confirm that the provider and the evaluator at the time of the handover continuously perform the short-distance wireless communication.

Figure 10:
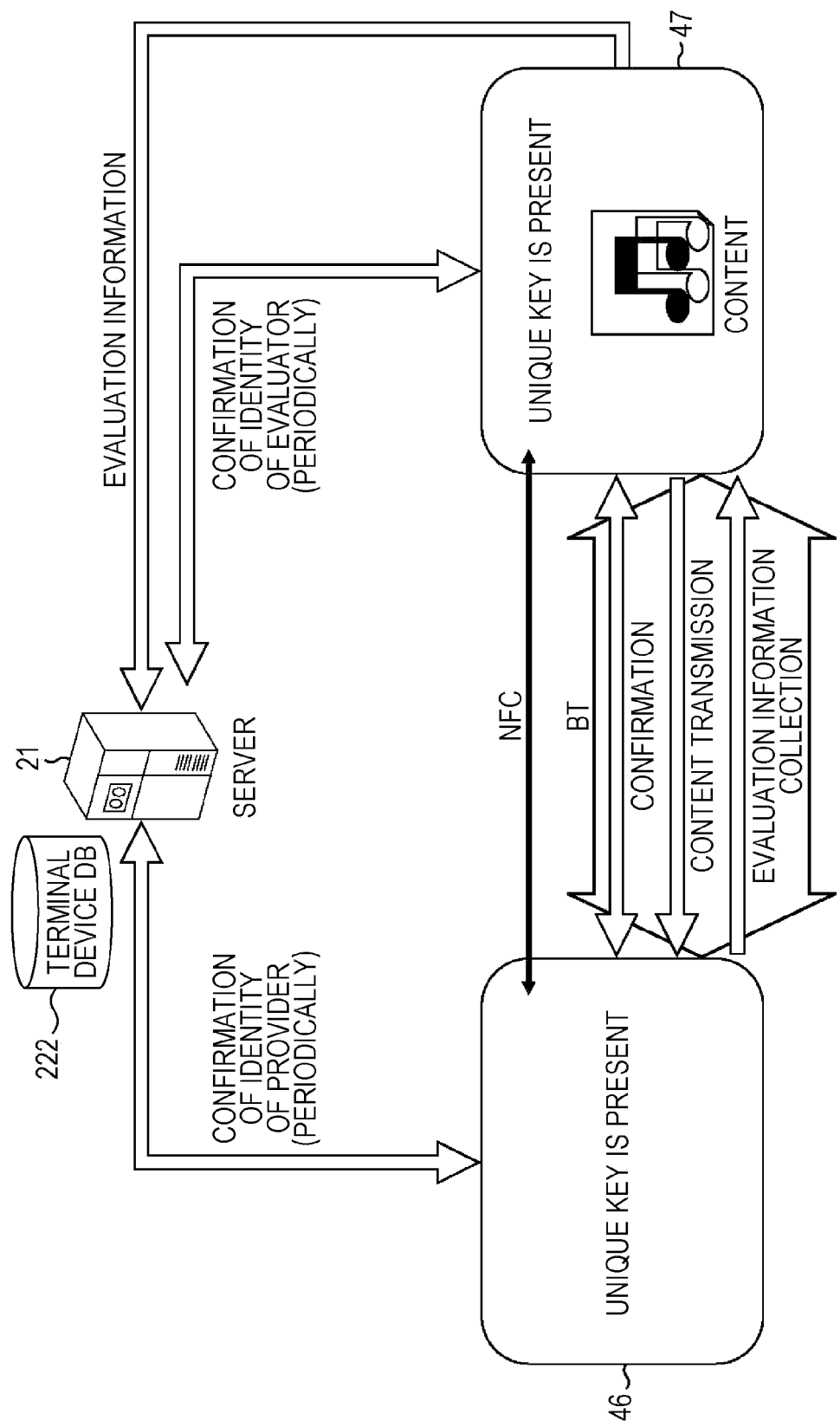
FIG. 10 is a diagram illustrating still another example of a method of collecting evaluation information by performing link authentication.

FIG. 10 is a diagram illustrating still another example of a method of collecting evaluation information through the link authentication in the evaluation information collecting system 10. FIG. 10 shows an example where a portion of data for content (for example, a game) is transmitted using the short-distance wireless communication (BT) after the noncontact communication (NFC communication) through the handover between the portable terminal 47 and the portable terminal 46.

In a case of the example shown in FIG. 10, "Trusted" is not recorded in the portable terminal 47 which is a content provider, unlike the case in FIG. 6 or FIG. 8. In other words, in a case of the example shown in FIG. 10, there is not a sufficient trusting relationship between the evaluation information collector or the like and the content provider. In addition, in the example shown in FIG. 10, it is assumed that both the portable terminal 46 and the portable terminal 47 hold a unique key.

In the example shown in FIG. 10, the portable terminal 47 notifies the server 21 of the handover between the portable terminal 47 and the portable terminal 46 using the wide area communication. At this time, an identification number of the portable terminal 47 and an identification number of the portable terminal 46 are also transmitted to the server 21. Thereafter, the server 21 generates a random number and encrypts the random number using the unique key of the portable terminal 46. In addition, the unique key of the portable terminal 46 can be obtained by searching the terminal device database 222 using the identification number of the portable terminal 46.

The server 21 transmits the random number which has been encrypted (referred to as an encrypted random number) to a wide area communication address of the portable terminal 47. In addition, the wide area communication address of the portable terminal 47 can be obtained by searching the terminal device database 222 using the identification number of the portable terminal 47.

The portable terminal 47 transmits the encrypted random number transmitted from the server 21 to the portable terminal 46 using the short-distance wireless communication.

The portable terminal 46 obtains the random number by decoding the encrypted random number with the unique key of the portable terminal 46. The portable terminal 46 transmits the random number to the portable terminal 47 using the short-distance wireless communication.

The portable terminal 47 transmits the random number transmitted from the portable terminal 46 to the server 21 using the wide area communication.

The server 21 compares the random number transmitted from the portable terminal 47 with the random number generated by the server 21, and if both match the other, confirms that the short-distance wireless communication with the evaluator at the time of the handover is performed. That is to say, it is possible to confirm the identity of the evaluator based on the information transmitted from the provider side.

Further, the server 21 generates another random number and encrypts the random number using the unique key of the portable terminal 47. In addition, the unique key of the portable terminal 47 can be obtained by searching the terminal device database 222 using the identification number of the portable terminal 47.

The server 21 transmits the random number which has been encrypted (referred to as an encrypted random number) to a wide area communication address of the portable terminal 46. In addition, the wide area communication address of the portable terminal 46 can be obtained by searching the terminal device database 222 using the identification number of the portable terminal 46.

The portable terminal 46 transmits the encrypted random number transmitted from the server 21 to the portable terminal 47 using the short-distance wireless communication.

The portable terminal 47 obtains the random number by decoding the encrypted random number with the unique key of the portable terminal 47. The portable terminal 47 transmits the random number to the portable terminal 46 using the short-distance wireless communication.

The portable terminal 46 transmits the random number transmitted from the portable terminal 47 to the server 21 using the wide area communication.

The server 21 compares the random number transmitted from the portable terminal 46 with the random number generated by the server 21, and if both match the other, confirms that the short-distance wireless communication with the provider at the time of the handover is performed. That is to say, it is possible to confirm the identity of the provider based on the information transmitted from the evaluator side.

Thereafter, the content data is transmitted from the portable terminal 47 using the short-distance wireless communication, and a screen of the game is displayed by the portable terminal 46. At this time, the portable terminal 46 transmits evaluation information to the portable terminal 47.

As such, while the transmission of the content data and the transmission of the evaluation information using the short-distance wireless communication are performed between the portable terminal 47 and the portable terminal 46, the server 21 continuously (periodically) confirms the identity of the evaluator and the identity of the provider as described above, for example, at constant cycles.

In addition, the evaluation information accumulated in the portable terminal 47 is transmitted to the server 21 using the wide area communication.

In this way, the link authentication is performed and the evaluation information is collected in the evaluation information collecting system 10 even in a case where there is not a sufficient trusting relationship between the evaluation information collector or the like and the content provider.

Figure 11:
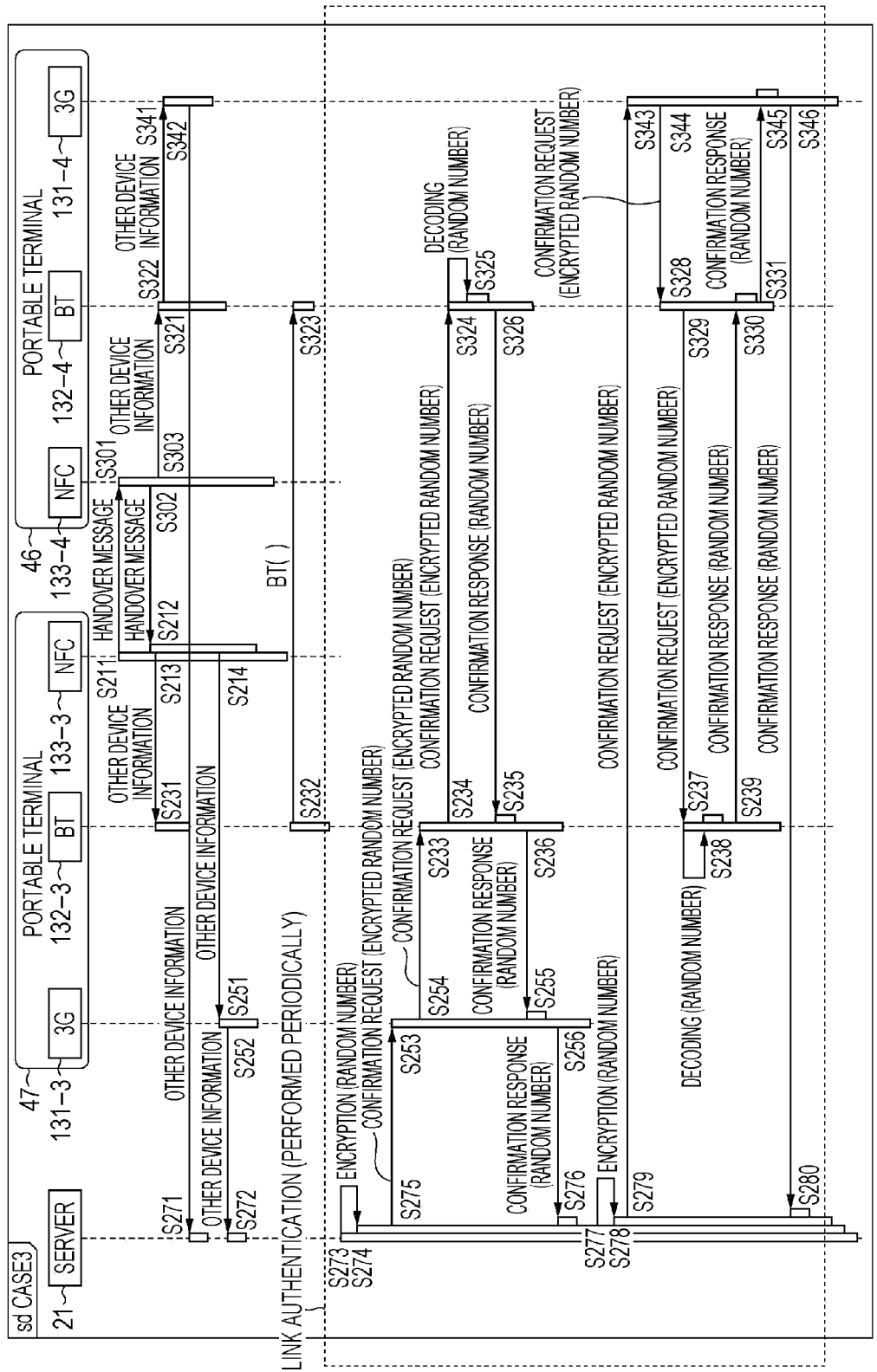
FIG. 11 is an arrow chart illustrating the flow of processes in the method in FIG. 10.

FIG. 11 is an arrow chart illustrating the flow of processes of collecting the evaluation information through the link authentication described with reference to FIG. 10.

In FIG. 11, the mobile communication network wireless communication unit 131 of the portable terminal 47 is denoted by 3G 131-3, and the mobile communication network wireless communication unit 131 of the portable terminal 46 is denoted by 3G 131-4. In addition, the short-distance wireless communication unit 132 of the portable terminal 47 is denoted by BT 132-3, and the short-distance wireless communication unit 132 of the portable terminal 46 is denoted by BT 132-4. Further, the noncontact communication unit 133 of the portable terminal 47 is denoted by NFC 133-3, and the noncontact communication unit 133 of the portable terminal 46 is denoted by NFC 133-4.

In step S211, the NFC 133-3 of the portable terminal 47 transmits a handover message, and, in step S301, the NFC 133-4 of the portable terminal 46 receives the handover message.

In step S302, the NFC 133-4 transmits the handover message, and, in step S212, the NFC 133-3 receives the handover message.

By the process hitherto, the portable terminal 47 and the portable terminal 46 exchange other device information. In addition, the other device information is regarded as information such as an identification number of a device of the other party of the handover and a short-distance wireless communication address. Further, the other device information is assumed to include a wide area communication address of the server 21 as necessary.

In step S213, the NFC 133-3 notifies the BT 132-3 of the other device information, which is obtained by the BT 132-3 in step S231. In addition, in step S303, the NFC 133-4 notifies the BT 132-4 of the other device information, which is obtained by the BT 132-4 in step S321. In step S322, the BT 132-4 notifies the 3G 131-4 of the other device information obtained in step S321, which is obtained in step S341. Further, in practice, a notification of the other device information, and other pieces of information are sent via the CPU 111. This is also true of the following.

In step S342, the 3G 131-4 sends a notification of the handover by transmitting information including the other device information to the server 21, and in step S272, the server 21 obtains the information. In addition, the processes in steps S321, S341, and S342 may be omitted.

In step S214, the NFC 133-3 notifies the 3G 131-3 of the other device information, which is obtained by the 3G 131-3 in step S251.

In step S252, the 3G 131-3 sends a notification of the handover by transmitting information including the other device information to the server 21, and in step S271, the server 21 obtains the information. In addition, in order to notify the server 21 of the handover, the other device information for itself (in this case, the portable terminal 47) as well as the other device information for the other party of the handover is transmitted.

A connection request is transmitted from the BT 132-3 to the BT 132-4 in step S232, and is received in step S323.

The server 21 generates a random number in step S273, which is encrypted in step S274. In step S275, the server 21 transmits the encrypted random number obtained by the process in step S274 as a confirmation request, and the 3G 131-3 receives the confirmation response in step S253.

In step S254, the 3G 131-3 notifies the BT 132-3 of the confirmation request received in step S253, which is obtained in step S233.

In step S234, the BT 132-3 transmits the confirmation request obtained in step S233, and the BT 132-4 obtains the confirmation request in step S324.

In step S325, the BT 132-4 decodes the encrypted random number of the confirmation request received in step S324 and obtains the random number. In addition, the decoding of the random number is in practice performed by the CPU 111.

In step S326, the BT 132-4 transmits the random number obtained by the process in step S325 as a confirmation response, and in step S235, the BT 132-3 receives the confirmation response.

In step S236, the BT 132-3 notifies the 3G 131-3 of the confirmation response received in step S235, which is obtained in step S255.

In step S256, the 3G 131-3 transmits the confirmation response obtained in step S255, and the server 21 receives the confirmation response in step S276.

The server 21 generates another random number in step S277, which is encrypted in step S278. In step S279, the server 21 transmits the encrypted random number obtained by the process in step S278 as a confirmation request, and the 3G 131-4 receives the encrypted random number in step S343.

In step S344, the 3G 131-4 notifies the BT 132-4 of the confirmation request received in step S343, which is obtained in step S328.

In step S329, the BT 132-4 transmits the obtained confirmation request obtained in step S328, and the BT 132-3 obtains the confirmation request in step S237.

In step S238, the BT 132-3 decodes the encrypted random number of the confirmation request received in step S237 and obtains the random number.

In step S239, the BT 132-3 transmits the random number obtained by the process in step S238 as a confirmation response, and in step S330, the BT 132-4 receives the confirmation response.

In step S331, the BT 132-4 notifies the 3G 131-3 of the confirmation response received in step S330, which is obtained in step S345.

In step S346, the 3G 131-4 transmits the confirmation response obtained in step S345, and the server 21 receives the confirmation response in step S280.

Thereafter, transmission and reception of content data and transmission and reception of operation information as evaluation information are performed; however, these processes are similar to the case described with reference to FIG. 7, and thus detailed description thereof will be omitted.

In addition, the processes in the part surrounded by the dotted line in the figure are processes for confirming the identity of the evaluator and the identity of the provider, and are performed periodically.

In this way, a process of collecting the evaluation information is performed through the link authentication.

However, although an example of the case where the portable terminal 46 holds the unique key has been described in the example described with reference to FIG. 10, there is a case where the portable terminal 46 does not hold a unique key. In this case, for example, it is possible to confirm the identity of an evaluator and the identity of a provider side as shown in FIG. 12.

Figure 12:
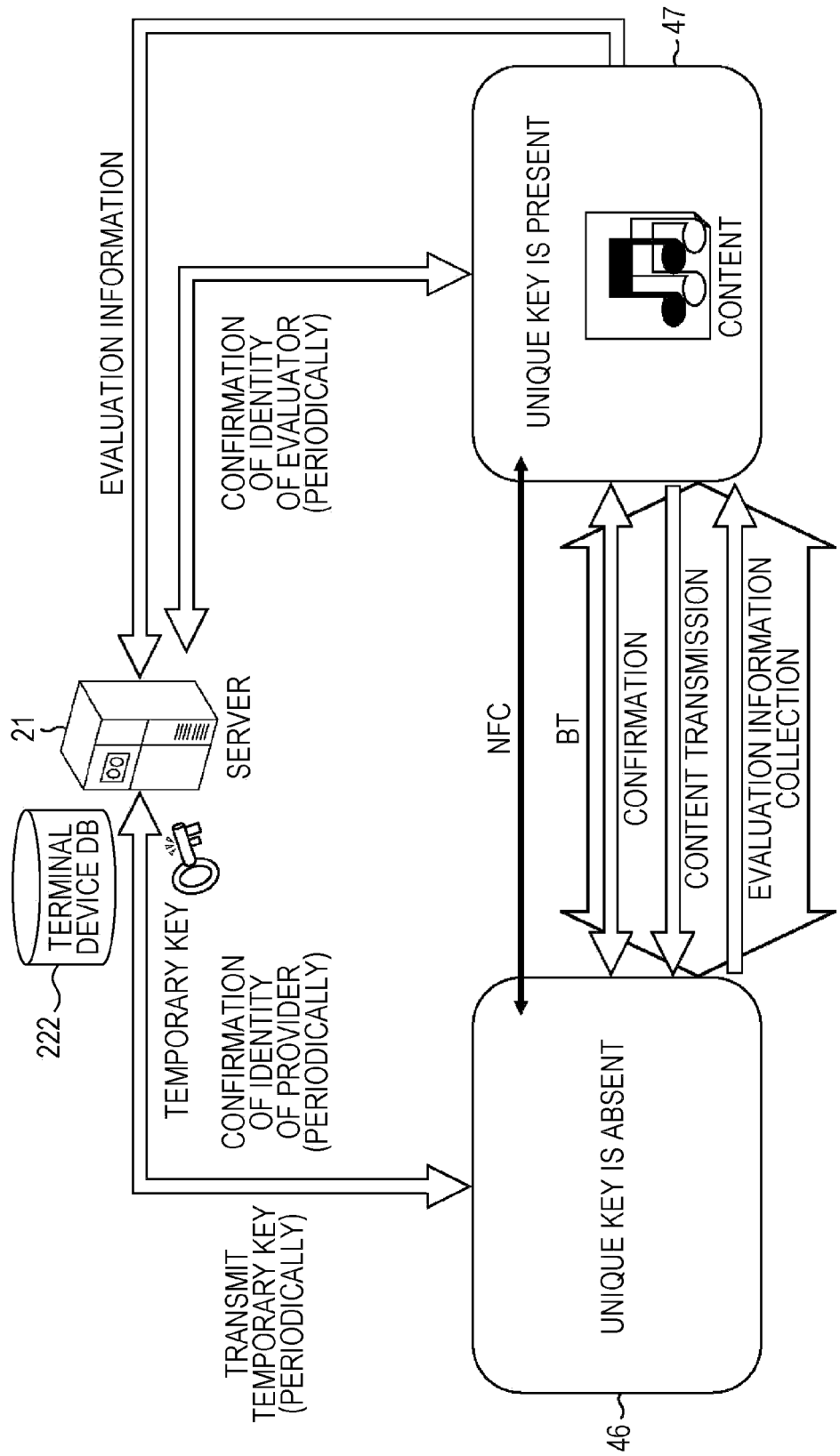
FIG. 12 is a diagram illustrating still another example of a method of collecting evaluation information by performing link authentication.

FIG. 12 is a diagram illustrating still another example of a method of collecting evaluation information through the link authentication in the evaluation information collecting system 10. FIG. 12 shows an example where a portion of data for content (for example, a game) is transmitted using the short-distance wireless communication (BT) after the noncontact communication (NFC communication) through the handover between the portable terminal 47 and the portable terminal 46.

In a case of the example shown in FIG. 12, in a manner similar to the case shown in FIG. 10, "Trusted" is not recorded in the portable terminal 47 which is a content provider, and there is not a sufficient trusting relationship between an evaluation information collector or the like and a content provider. In the example shown in FIG. 12, unlike the case shown in FIG. 10, it is assumed that the portable terminal 47 holds a unique key but the portable terminal 46 does not hold a unique key.

In FIG. 12, the portable terminal 47 notifies the server 21 of the handover between the portable terminal 47 and the portable terminal 46 using the wide area communication. At this time, an identification number of the portable terminal 47 and an identification number of the portable terminal 46 are also transmitted to the server 21. Thereafter, the server 21 generates a random number, but confirms that the portable terminal 46 does not hold a unique key. In addition, the fact that the portable terminal 46 does not hold a unique key can be confirmed by searching the terminal device database 222 using the identification number of the portable terminal 46.

The server 21 transmits the random number to a wide area communication address of the portable terminal 46 as a temporary key. In addition, the wide area communication address of the portable terminal 46 can be obtained by searching the terminal device database 222 using the identification number of the portable terminal 46.

The server 21 transmits a confirmation request to the wide area communication address of the portable terminal 47, and the confirmation request is transmitted from the portable terminal 47 to the portable terminal 46 using the short-distance wireless communication. In addition, the wide area communication address of the portable terminal 47 can be obtained by searching the terminal device database 222 using the identification number of the portable terminal 47.

The portable terminal 46 transmits the temporary key to the portable terminal 47 using the short-distance wireless communication as a response to the confirmation request, and the portable terminal 47 transmits the response to the server 21 using the wide area communication.

The server 21 compares the temporary key transmitted from the portable terminal 47 with the random number generated by the server 21, and if both match the other, confirms that the short-distance wireless communication with the evaluator at the time of the handover is performed. That is to say, it is possible to confirm the identity of the evaluator based on the information transmitted from the provider side.

Further, the server 21 generates another random number and encrypts the random number using the unique key of the portable terminal 47. In addition, the unique key of the portable terminal 47 can be obtained by searching the terminal device database 222 using the identification number of the portable terminal 47.

The server 21 transmits the random number which has been encrypted (referred to as an encrypted random number) to a wide area communication address of the portable terminal 46. In addition, the wide area communication address of the portable terminal 46 can be obtained by searching the terminal device database 222 using the identification number of the portable terminal 46.

The portable terminal 46 transmits the encrypted random number transmitted from the server 21 to the portable terminal 47 using the short-distance wireless communication.

The portable terminal 47 obtains the random number by decoding the encrypted random number with the unique key of the portable terminal 47. The portable terminal 47 transmits the random number to the portable terminal 46 using the short-distance wireless communication.

The portable terminal 46 transmits the random number transmitted from the portable terminal 47 to the server 21 using the wide area communication.

The server 21 compares the random number transmitted from the portable terminal 46 with the random number generated by the server 21, and if both match the other, confirms that the short-distance wireless communication with the provider at the time of the handover is performed. That is to say, it is possible to confirm the identity of the provider based on the information transmitted from the evaluator side.

Thereafter, the content data is transmitted from the portable terminal 47 using the short-distance wireless communication, and a screen of the game is displayed by the portable terminal 46. At this time, the portable terminal 46 transmits evaluation information to the portable terminal 47.

As such, while the transmission of the content data and the transmission of the evaluation information using the short-distance wireless communication are performed between the portable terminal 47 and the portable terminal 46, the server 21 continuously (periodically) confirms the identity of the evaluator and the identity of the provider as described above, for example, at constant cycles.

In addition, the evaluation information accumulated in the portable terminal 47 is transmitted to the server 21 using the wide area communication.

In this way, the link authentication is performed and the evaluation information is collected in the evaluation information collecting system 10 even in a case where there is not a sufficient trusting relationship between the evaluation information collector or the like and the content provider, and the evaluator side does not hold the unique key.

The processes described with reference to FIG. 12 are obtained by combining the processes described with reference to FIG. 10 and the processes described with reference to FIG. 8, and thus detailed description thereof using an arrow chart will be omitted.

In addition, there is a case where neither the portable terminal 46 nor the portable terminal 47 holds a unique key. In this case, it is possible to confirm the identity of an evaluator and the identity of a provider, for example, as shown in FIG. 13.

Figure 13:
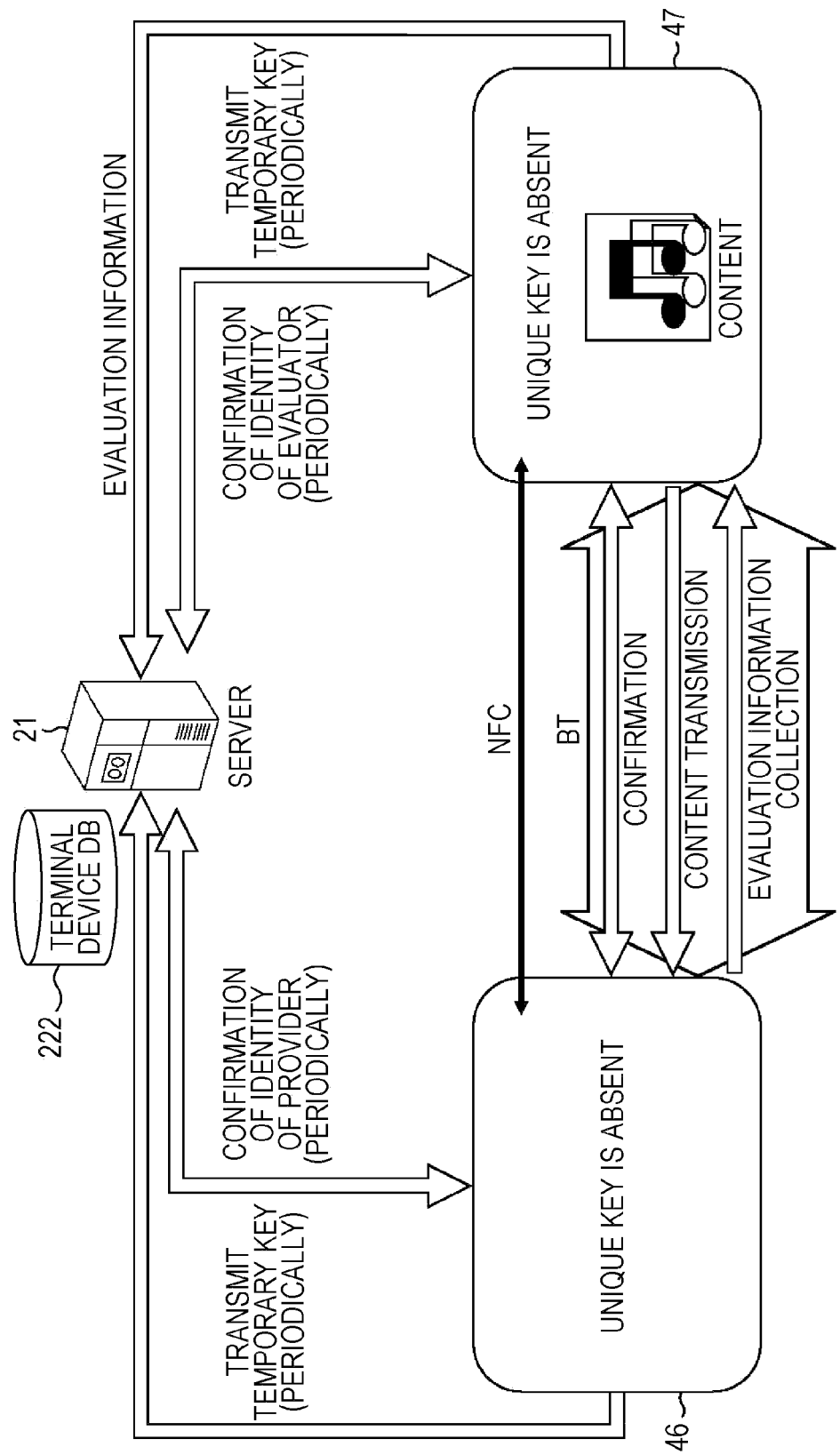
FIG. 13 is a diagram illustrating still another example of a method of collecting evaluation information by performing link authentication.

FIG. 13 is a diagram illustrating still another example of a method of collecting evaluation information through the link authentication in the evaluation information collecting system 10. FIG. 13 shows an example where a portion of data for content (for example, a game) is transmitted using the short-distance wireless communication (BT) after the noncontact communication (NFC communication) through the handover between the portable terminal 47 and the portable terminal 46.

In a case of the example shown in FIG. 13, in a manner similar to the case shown in FIG. 10, "Trusted" is not recorded in the portable terminal 47 which is a content provider, and there is not a sufficient trusting relationship between an evaluation information collector or the like and a content provider. In the example shown in FIG. 13, unlike the case shown in FIG. 12, it is assumed that neither the portable terminal 47 nor the portable terminal 46 holds a unique key.

In FIG. 13, the portable terminal 47 notifies the server 21 of the handover between the portable terminal 47 and the portable terminal 46 using the wide area communication. At this time, an identification number of the portable terminal 47 and an identification number of the portable terminal 46 are also transmitted to the server 21. Thereafter, the server 21 generates a random number, but confirms that the portable terminal 46 does not have a unique key. In addition, the fact that the portable terminal 46 does not have a unique key can be confirmed by searching the terminal device database 222 using the identification number of the portable terminal 46.

The server 21 transmits the random number to a wide area communication address of the portable terminal 46 as a temporary key. In addition, the wide area communication address of the portable terminal 46 can be obtained by searching the terminal device database 222 using the identification number of the portable terminal 46.

The server 21 transmits a confirmation request to the wide area communication address of the portable terminal 47, and the confirmation request is transmitted from the portable terminal 47 to the portable terminal 46 using the short-distance wireless communication. In addition, the wide area communication address of the portable terminal 47 can be obtained by searching the terminal device database 222 using the identification number of the portable terminal 47.

The portable terminal 46 transmits the temporary key to the portable terminal 47 using the short-distance wireless communication as a response to the confirmation request, and the portable terminal 47 transmits the response to the server 21 using the wide area communication.

The server 21 compares the temporary key transmitted from the portable terminal 47 with the random number generated by the server 21, and if both match the other, confirms that the short-distance wireless communication with the evaluator at the time of the handover is performed. That is to say, it is possible to confirm the identity of the evaluator based on the information transmitted from the provider side.

In addition, the server 21 generates another random number, but confirms that the portable terminal 47 does not hold a unique key. In addition, the fact that the portable terminal 47 does not hold a unique key can be confirmed by searching the terminal device database 222 using the identification number of the portable terminal 47.

The server 21 transmits the random number to a wide area communication address of the portable terminal 47 as a temporary key.

The server 21 transmits a confirmation request to the wide area communication address of the portable terminal 46, and the confirmation request is transmitted from the portable terminal 46 to the portable terminal 47 using the short-distance wireless communication.

The portable terminal 47 transmits the temporary key to the portable terminal 46 using the short-distance wireless communication as a response to the confirmation request, and the portable terminal 46 transmits the response to the server 21 using the wide area communication.

The server 21 compares the temporary key transmitted from the portable terminal 46 with the random number generated by the server 21, and if both match the other, confirms that the short-distance wireless communication with the provider at the time of the handover is performed. That is to say, it is possible to confirm the identity of the provider based on the information transmitted from the evaluator side.

Thereafter, the content data is transmitted from the portable terminal 47 using the short-distance wireless communication, and a screen of the game is displayed by the portable terminal 46. At this time, the portable terminal 46 transmits evaluation information to the portable terminal 47.

As such, while the transmission of the content data and the transmission of the evaluation information using the short-distance wireless communication are performed between the portable terminal 47 and the portable terminal 46, the server 21 continuously (periodically) confirms the identity of the evaluator and the identity of the provider as described above, for example, at constant cycles.

In addition, the evaluation information accumulated in the portable terminal 47 is transmitted to the server 21 using the wide area communication.

In this way, the link authentication is performed and the evaluation information is collected in the evaluation information collecting system 10 even in a case where there is not a sufficient trusting relationship between the evaluation information collector or the like and the content provider, and neither the evaluator side nor the provider side holds the unique key.

The processes described with reference to FIG. 13 are obtained by combining the processes described above and thus detailed description thereof using an arrow chart will be omitted.

As described above, according to the embodiment of the present disclosure, since evaluation information can be collected through the link authentication, at this time, for example, it is possible to handle obtaining of evaluation information on the P2P network where a content provider and an evaluator are dynamically changed.

Further, according to the embodiment of the present disclosure, since a time after a product or a content item which is an evaluation target is presented until evaluation information is collected can be reduced as compared with that in the related art, it is possible to also provide timely evaluation information.

Moreover, for example, it is not necessary to install a dedicated device such as a camera for confirming the actual presence of an evaluator, and it is possible to realize an evaluation information collecting system having high reliability with a simple configuration.

When the examples described with reference to FIGS. 6 to 13 are summarized, the following two matters may be considered in a case where evaluation information is collected by performing the link authentication in the evaluation information collecting system 10. The first matter is whether or not there is a sufficient trusting relationship between an evaluation information collector or the like and the a content provider, and the second matter is whether or not an evaluator side and a provider side hold a unique key.

In other words, if there is a sufficient trusting relationship between the evaluation information collector or the like and the content provider, the link authentication can be realized by periodically confirming the identity of the evaluator based on information transmitted from the provider side. On the other hand, if there is not a sufficient trusting relationship between the evaluation information collector or the like and the content provider, the link authentication can be realized by periodically confirming the identity of the evaluator based on information transmitted from the provider side and further confirming the identity of the provider based on information transmitted from the evaluator side.

In addition, if a portable terminal of an evaluator holds a unique key, it is possible to confirm the identity of the evaluator based on information transmitted from a provider side by transmitting a random number encrypted using a random number to a portable terminal of the provider side. On the other hand, if the portable terminal of the evaluator does not hold a unique key, it is possible to confirm the identity of the evaluator based on information transmitted from the provider side by transmitting a temporary key to the portable terminal of the evaluator side and then transmitting a confirmation request to the portable terminal or the like of the provider.

In a similar manner, if the portable terminal or the like of the provider holds a unique key, it is possible to confirm the identity of the provider based on information transmitted from the evaluator side by transmitting a random number encrypted using the unique key to the portable terminal of the evaluator side. On the other hand, if the portable terminal or the like of the provider does not hold a unique key, it is possible to confirm the identity of the provider based on information transmitted from the evaluator side by transmitting a temporary key to the portable terminal of the provider side and then transmitting a confirmation request to the portable terminal or the like of the evaluator.

In this way, the collection of evaluation information is realized by performing the link authentication using a total of five methods.

According to the embodiment of the present disclosure, it is possible to collect evaluation information regardless of whether or not there is a trusting relationship between an evaluation information collector or the like and a content provider and whether or not an evaluator side and a provider side hold a unique key. For this reason, the following information is included in the handover message.

Figure 14:
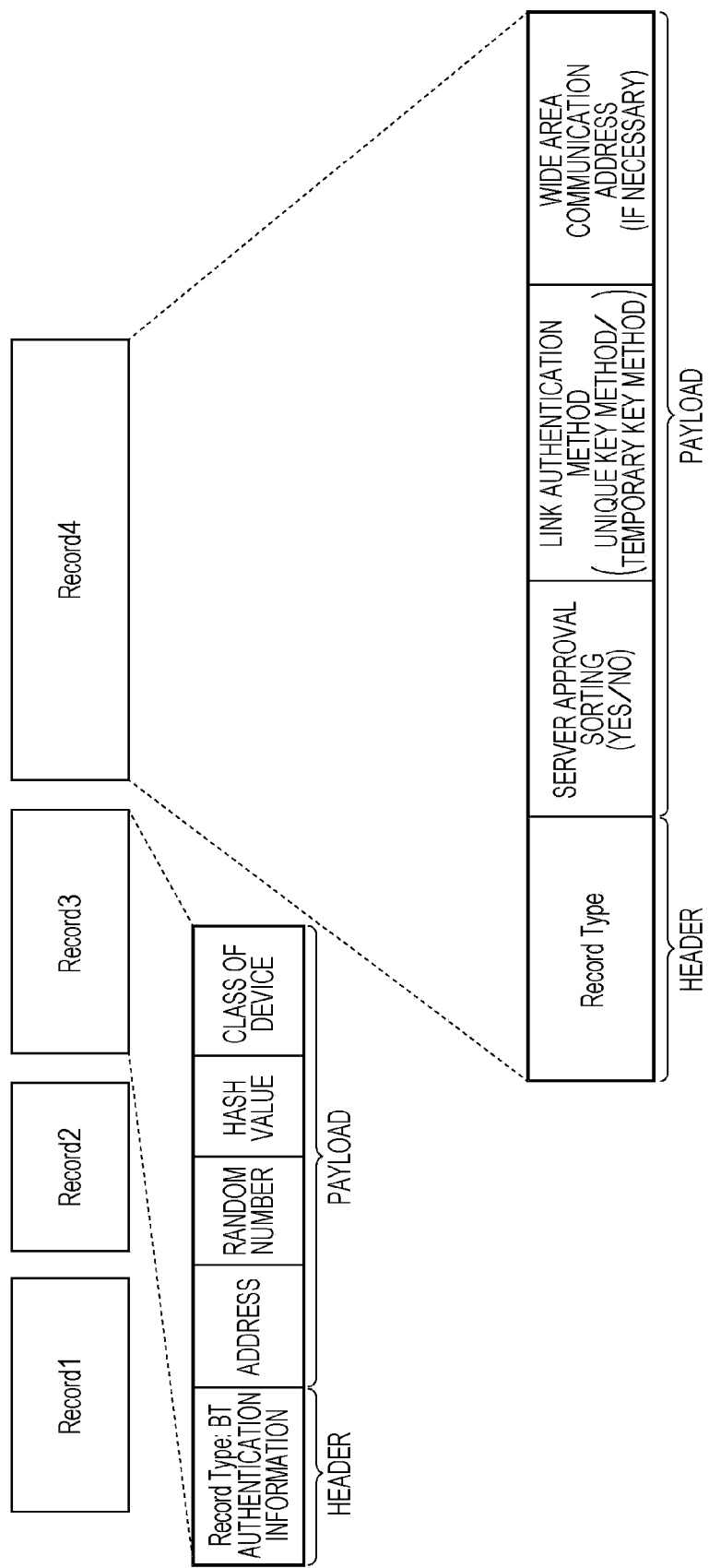
FIG. 14 is a diagram illustrating a handover message.

FIG. 14 is a diagram illustrating a format of the handover message. The handover message is regarded as information transmitted and received, for example, when the portable terminal or the information collecting terminal performs the noncontact communication (NFC communication). A format of the handover message is standardized by the NFC Forum, and the shown format is prescribed by the specification of the NFC Forum.

As shown in the same figure, the handover message is divided into a plurality of records (in this example, four records).

"Record 1" is regarded as a record storing information such as handover request and select. "Record 2" is a record storing a second carrier candidate, in which "ac (Alternative Carrier)" is stored in a Record Type of a header part, and a pointer (identifier of Record 3) of each second carrier is stored in a payload part.

"Record 3" is regarded as a record storing information concerning a short-distance wireless communication unit. As shown in the same figure, in "Record 3", the storage of the packet including a header and a payload is prescribed by the specification of Bluetooth SIG. In addition, the packet shown as a packet of "Record 3" corresponds to a case where the short-distance wireless communication unit performs Bluetooth communication.

"Record 4" is regarded as a record storing information defined by a manufacturer of a portable terminal or the like. In the embodiment of the present disclosure, packet information as shown in the figure is defined as information included in "Record 4".

As shown in the same figure, "Record 4" stores a packet including a header and a payload.

"Record Type" information is described in the header, and in this case, information indicating that Record 4 is a record storing information used to collect evaluation information is described.

The payload includes "server approval sorting", "link authentication method", and "wide area communication address".

The "server approval sorting" describes information indicating whether or not a corresponding portable terminal is a portable terminal approved by the server 21 (for example, Yes/No). If the corresponding portable terminal is a portable terminal approved by the server 21, it indicates that there is a sufficient trusting relationship with an evaluation information collector or the like.

The "link authentication method" describes information indicating the above-described method for performing confirmation of the identity of an evaluator or the identity of a provider. Specifically, for example, information indicating whether a method is the method of encrypting a random number using a unique key or the method of transmitting a temporary key from the server 21 in advance is described.

The "wide area communication address" describes a wide area communication address of a corresponding device and a wide area communication address of the server 21 as necessary.

In the evaluation information collecting system 10 according to the embodiment of the present disclosure, the handover message shown in FIG. 14 is transmitted and received at the time of a handover. The information shown in FIG. 14 is also transmitted to the server 21 as other device information along with a notification of the handover.

When the server 21 receives the notification of the handover from the information collecting terminal or the portable terminal, the server 21 analyzes the information included in "Record 4" in FIG. 14 and performs link authentication. As described above, in the evaluation information collecting system 10 according to the embodiment of the present disclosure, evaluation information is collected by performing the link authentication by a total of five methods.

The first method corresponds to a case where, as described with reference to FIG. 6, there is a sufficient trusting relationship between an evaluation information collector or the like and a provider, and a portable terminal of an evaluator holds a unique key. This is referred to as Case 1.

The second method corresponds to a case where, as described with reference to FIG. 8, there is a sufficient trusting relationship between the evaluation information collector or the like and the provider, and the portable terminal of the evaluator does not hold a unique key. This is referred to as Case 2.

The third method corresponds to a case where, as described with reference to FIG. 10, there is not a sufficient trusting relationship between the evaluation information collector or the like and the provider, and both the portable terminal of the evaluator and the portable terminal of the provider hold a unique key. This is referred to as Case 3.

The fourth method corresponds to a case where, as described with reference to FIG. 12, there is not a sufficient trusting relationship between the evaluation information collector or the like and the provider, the portable terminal of the evaluator does not hold a unique key, and the portable terminal of the provider holds a unique key. This is referred to as Case 4.

The fifth method corresponds to a case where, as described with reference to FIG. 13, there is not a sufficient trusting relationship between the evaluation information collector or the like and the provider, and neither of the portable terminals of the evaluator holds a unique key. This is referred to as Case 5.

When receiving the notification of the handover from the information collecting terminal or the portable terminal, the server 21 analyzes the information included in "Record 4" in FIG. 14, specifies an attribute of the provider side and an attribute of the evaluator side, and thereby specifies a link authentication method as shown in FIG. 15.

That is to say, as shown in FIG. 15, it is determined whether or not there is a sufficient trusting relationship with the evaluation information collector or the like based on the "server approval sorting" of the handover message from the provider side and the evaluator side. In this example, if there is a sufficient trusting relationship with the evaluation information collector or the like ("server approval sorting" is Yes), "Trusted" is recorded, and if there is not a sufficient trusting relationship ("server approval sorting" is No), "No Trusted" is recorded.

In addition, a method for performing confirmation of the identity of the evaluator or the identity of the provider is specified based on the "server approval sorting" of the handover message from the provider side and the evaluator side. In this example, in the method of encrypting a random number using a unique key, "unique key" is recorded, and in the method of transmitting from the server 21 in advance, "temporary key" is recorded.

In this way, the server 21 specifies a link authentication method, and performs the link authentication when collecting evaluation information.

Figure 16:
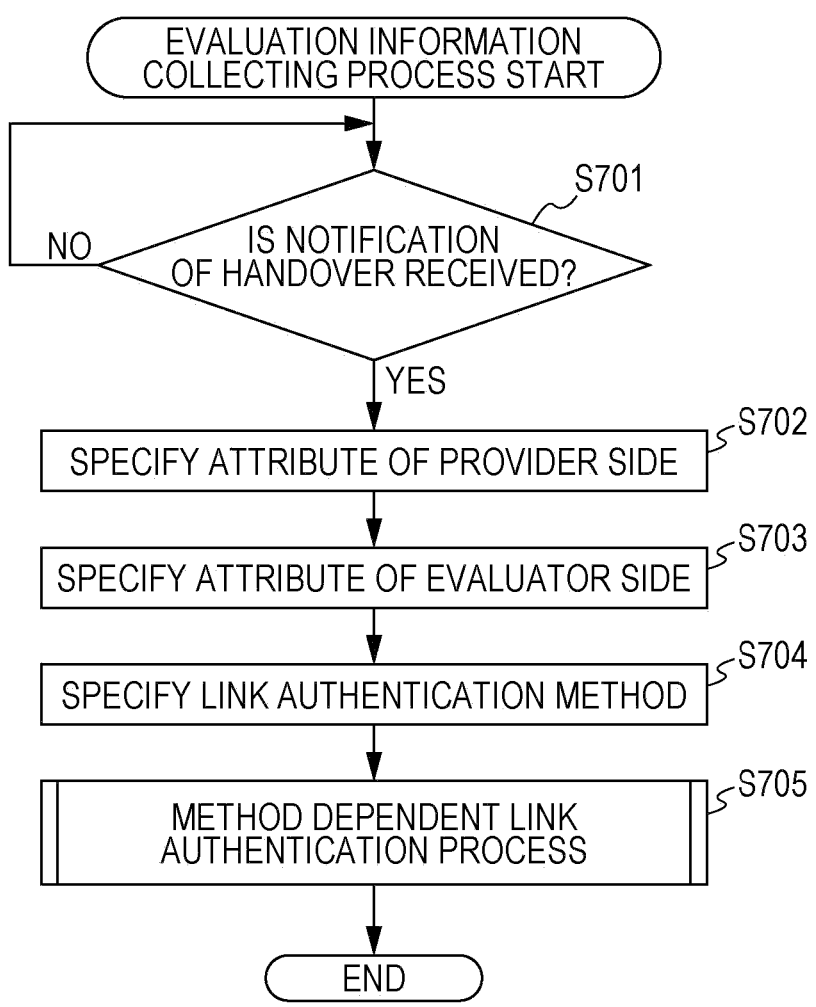
FIG. 16 is a flowchart illustrating an example of an evaluation information collecting process.

Next, an example of the evaluation information process performed by the server 21 will be described with reference to the flowchart in FIG. 16.

In step S701, the CPU 201 of the server 21 determines whether or not to receive a notification of the handover from the information collecting terminal or the portable terminal, and stands by until it is determined that the notification of the handover is received.

If it is determined that the notification of the handover is received in step S701, the flow goes to step S702.

In step S702, the CPU 201 obtains and analyzes device information for the provider side transmitted along with the notification of the handover, and specifies an attribute of the provider side. At this time, for example, the information included in "Record 4" of FIG. 14 is analyzed, and the attribute of the provider side (for example, the information collecting terminal 31, the portable terminal 47, or the like) is specified. In other words, whether or not there is a sufficient trusting relationship with the evaluation information collector or the like, and whether a method is the method of encrypting a random number using a unique key or the method of transmitting a temporary key from the server 21 in advance are specified.

In step S703, the CPU 201 obtains and analyzes device information for the evaluator side transmitted along with the notification of the handover and specifies an attribute of the evaluator side, in a manner similar to the process in step S702.

In step S704, the CPU 201 specifies a link authentication method based on the attributes specified in steps S702 and S703. That is to say, as described with reference to FIG. 15, the methods of Case 1 to Case 5 are specified.

In step S705, the CPU 201 performs a method-dependent link authentication process based on the link authentication method specified in step S704. Thereby, a link authentication corresponding to each of Case 1 to Case 5 is performed.

Figure 17:
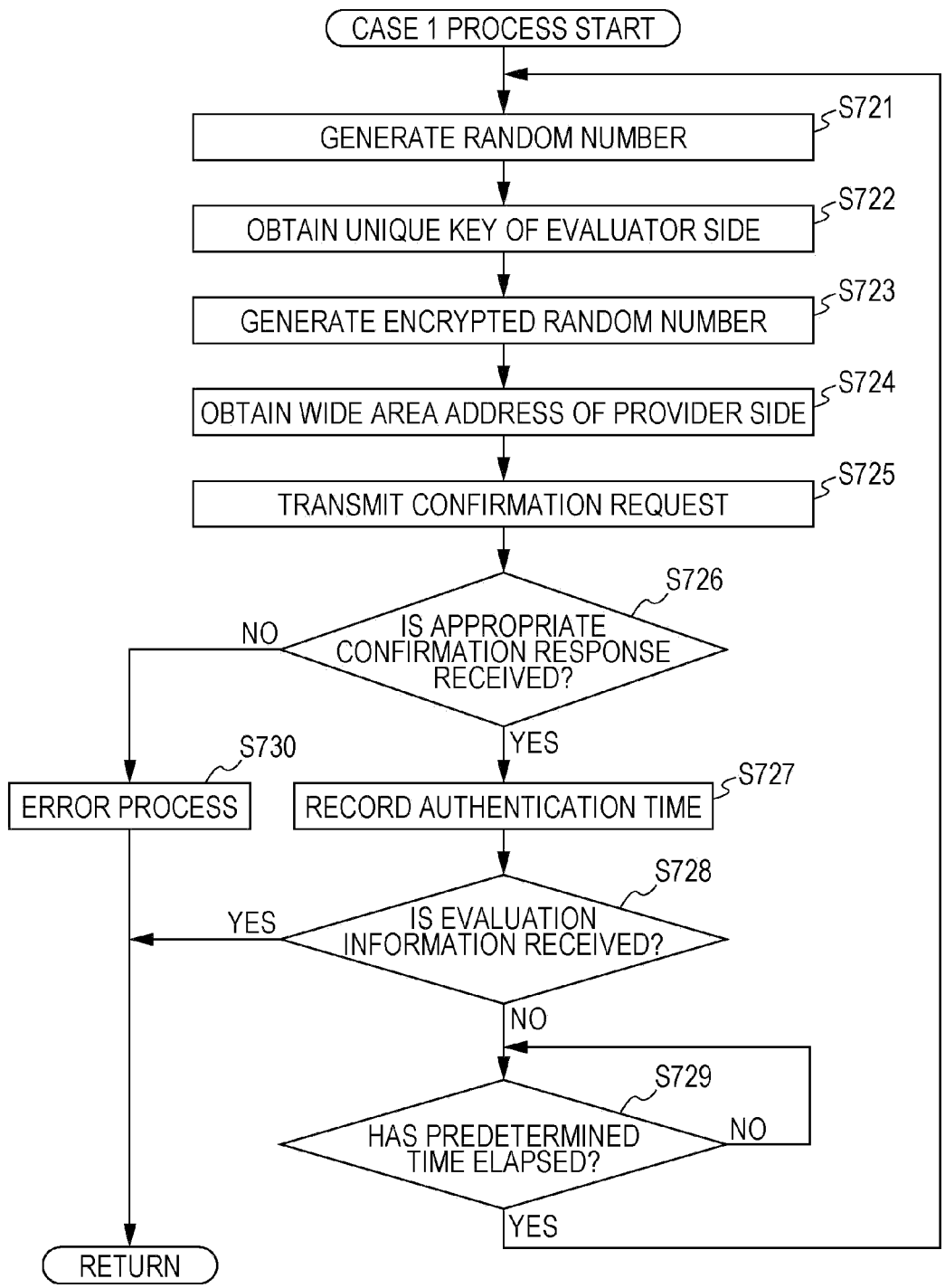
FIG. 17 is a flowchart illustrating an example of a Case 1 process.

FIG. 17 is a flowchart illustrating an example of the Case 1 process performed as the process in step S705 in a case where the link authentication method is specified as Case 1 in step S704.

In step S721, the CPU 201 generates a random number.

In step S722, the CPU 201 obtains a unique key of an evaluator side by searching the terminal device database 222 using an identification number of the evaluator side (for example, the portable terminal 41).

In step S723, the CPU 201 encrypts the random number generated in step S721 using the unique key obtained in step S722.

In step S724, the CPU 201 obtains a wide area communication address of the provider side by searching the terminal device database 222 using an identification number of the provider side (for example, the information collecting terminal 31).

In step S725, the CPU 201 transmits the encrypted random number generated in step S723 to the wide area communication address obtained in step S724 as a confirmation request.

In step S726, the CPU 201 determines whether or not to receive an appropriate confirmation response which is a response to the confirmation request transmitted in step S725. At this time, it is determined whether or not the random number generated in step S721 is included in the confirmation response, and if the random number is included, it is determined that an appropriate confirmation response is received.

In step S726, if it is determined that the appropriate confirmation response is received, the flow goes to step S727. On the other hand, if it is determined that the appropriate confirmation response is not received, the flow goes to step S730 where an error process is performed.

In step S727, the CPU 201 records a time point when the appropriate confirmation response is received as an authentication time point of the link authentication.

In step S728, the CPU 201 determines whether or not evaluation information is transmitted from the provider side, and if it is determined that the evaluation information is not transmitted, the flow goes to step S729.

In step S729, the CPU 201 determines whether or not a predetermined time has elapsed after the authentication time point is recorded in step S727, and stands by until it is determined that the predetermined amount of time has elapsed. If it is determined that the predetermined amount of time has elapsed in step S729, the flow returns to step S721. In this way, the identity of the evaluator is continuously (periodically) confirmed at constant cycles.

On the other hand, if it is determined that evaluation information is transmitted from the provider side in step S728, the Case 1 process finishes.

In this way, the method-dependent link authentication process for Case 1 is performed.

Figure 18:
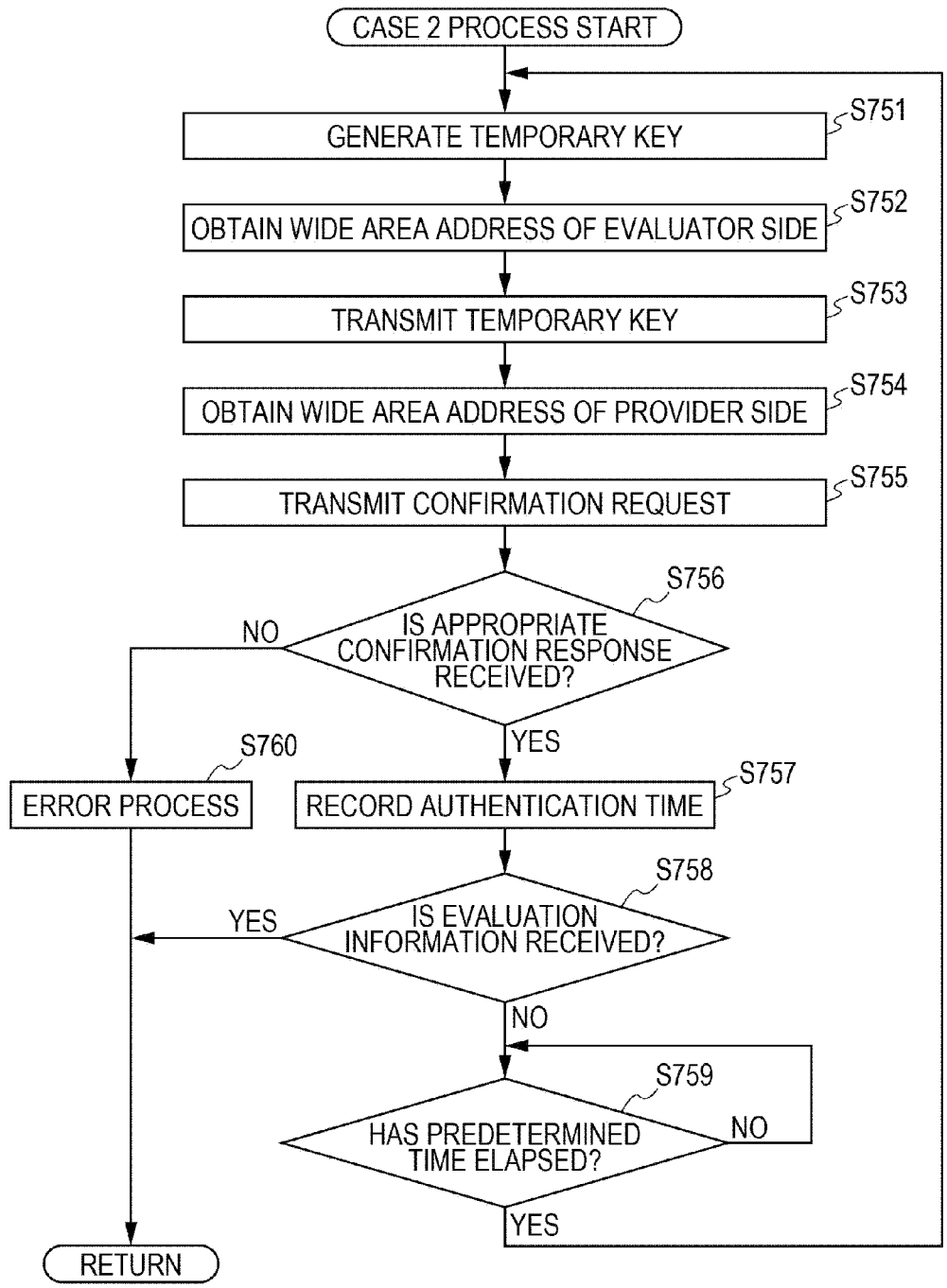
FIG. 18 is a flowchart illustrating an example of a Case 2 process.

FIG. 18 is a flowchart illustrating an example of the Case 2 process performed as the process in step S705 in a case where the link authentication method is specified as Case 2 in step S704.

In step S751, the CPU 201 generates a temporary key.

In step S752, the CPU 201 obtains a wide area communication address of an evaluator side by searching the terminal device database 222 using an identification number of the evaluator side (for example, the portable terminal 41).

In step S753, the CPU 201 transmits the temporary key generated in step S751 to the wide area communication address obtained in step S752.

In step S754, the CPU 201 obtains a wide area communication address of a provider side by searching the terminal device database 222 using an identification number of the provider side (for example, the information collecting terminal 31).

In step S755, the CPU 201 transmits a confirmation request to the wide area communication address obtained in step S754.

In step S756, the CPU 201 determines whether or not to receive an appropriate confirmation response which is a response to the confirmation request transmitted in step S755. At this time, it is determined whether or not the temporary key generated in step S751 is included in the confirmation response, and if the temporary key is included, it is determined that an appropriate confirmation response is received.

In step S756, if it is determined that the appropriate confirmation response is received, the flow goes to step S757. On the other hand, if it is determined that the appropriate confirmation response is not received, the flow goes to step S760 where an error process is performed.

In step S757, the CPU 201 records a time point when the appropriate confirmation response is received as an authentication time point of the link authentication.

In step S758, the CPU 201 determines whether or not evaluation information is transmitted from the provider side, and if it is determined that the evaluation information is not transmitted, the flow goes to step S759.

In step S759, the CPU 201 determines whether or not a predetermined amount of time has elapsed after the authentication time point is recorded in step S757, and stands by until it is determined that the predetermined amount of time has elapsed. If it is determined that the predetermined amount of time has elapsed in step S759, the flow returns to step S751. In this way, the identity of the evaluator is continuously (periodically) confirmed at constant cycles.

On the other hand, if it is determined that evaluation information is transmitted from the provider side in step S758, the Case 2 process finishes.

In this way, the method-dependent link authentication process for Case 2 is performed.

Figure 19:
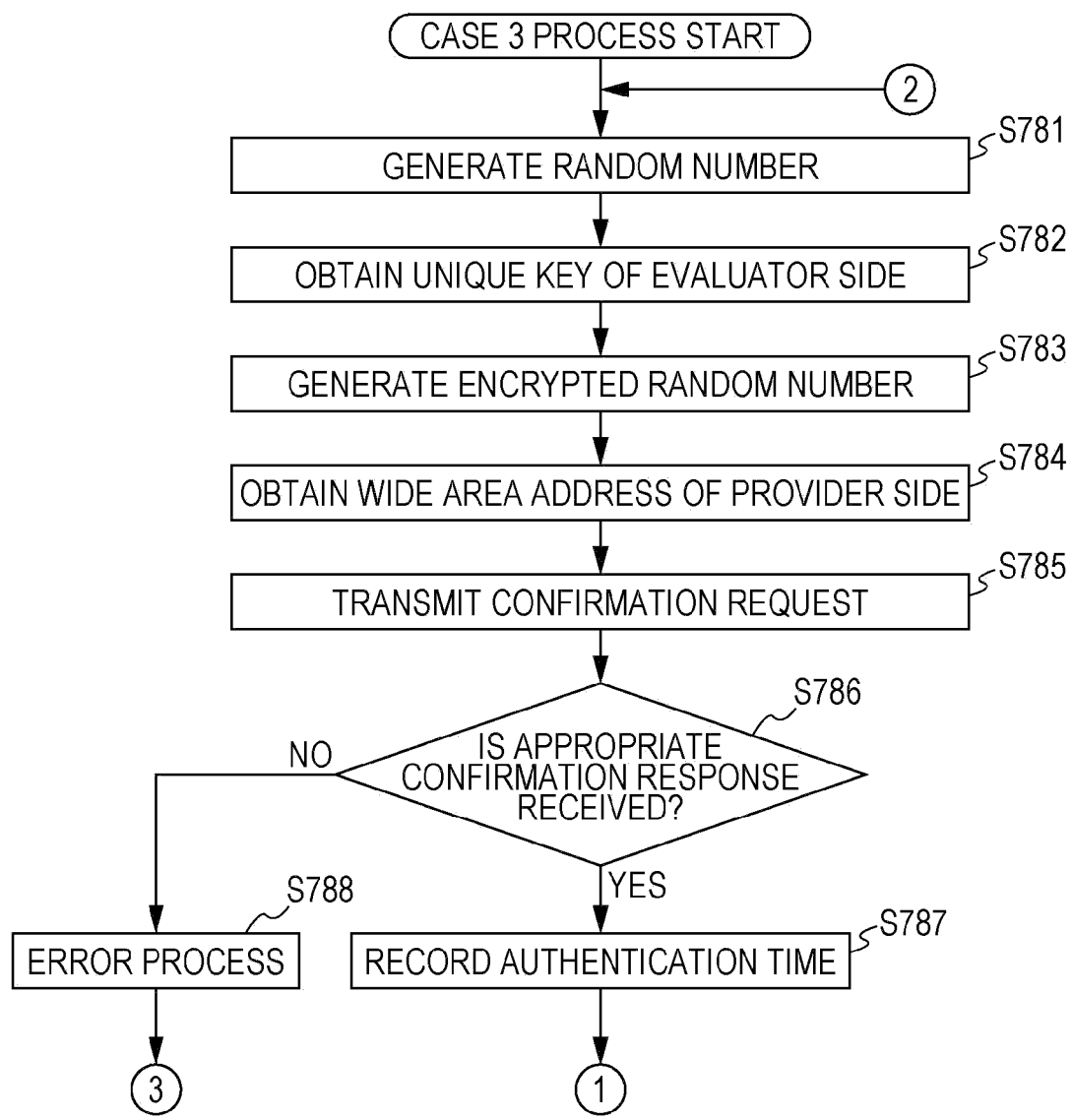
FIG. 19 is a flowchart illustrating an example of a Case 3 process.
Figure 20:
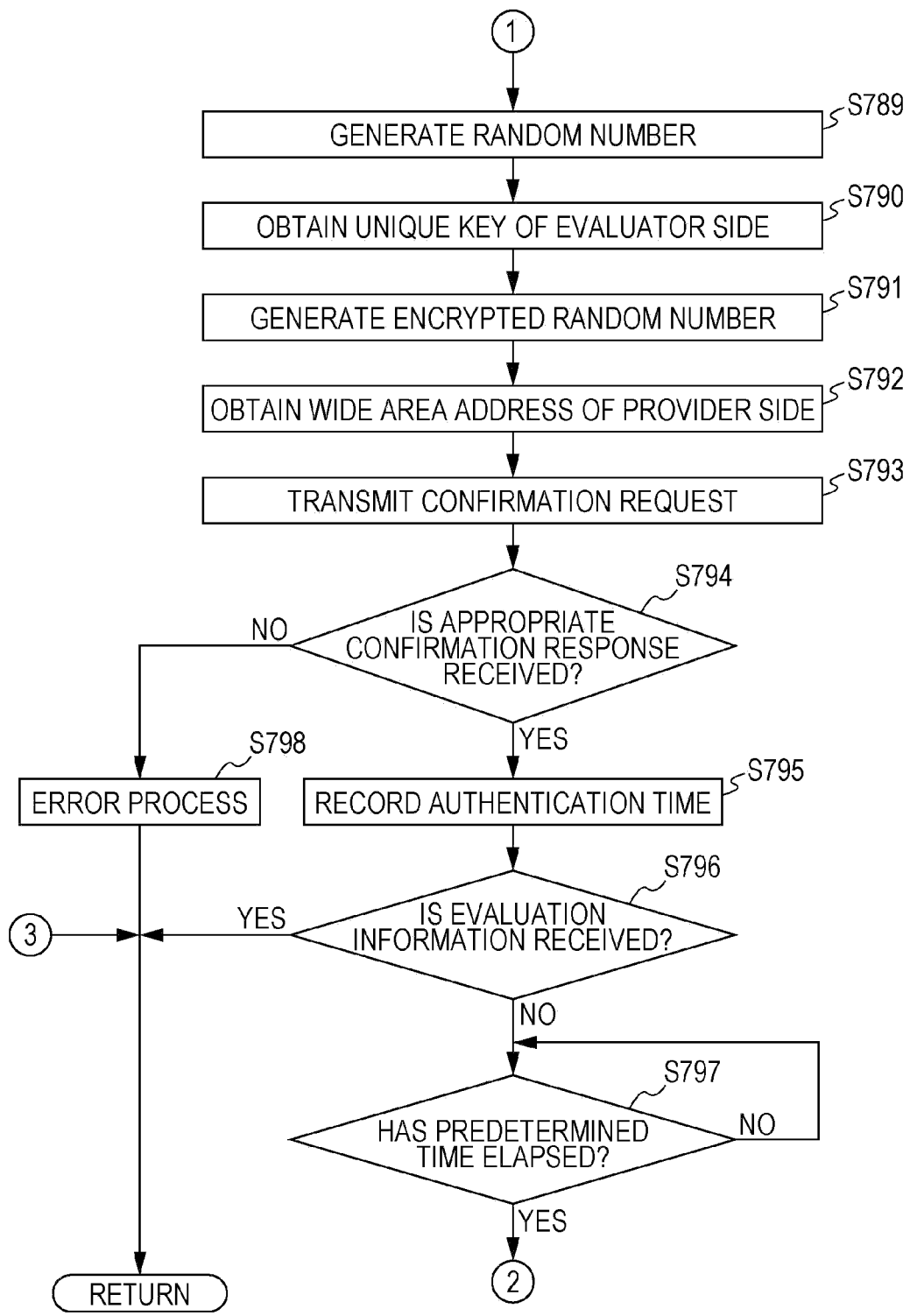
FIG. 20 is a flowchart illustrating an example of the Case 3 process.

FIGS. 19 and 20 are flowcharts illustrating an example of the Case 3 process performed as the process in step S705 in a case where the link authentication method is specified as Case 3 in step S704.

The processes in steps S781 to 788 are the same as the processes in steps S721 to S727 and step S730 in FIG. 17, and thus detailed description thereof will be omitted.

In step S789, the CPU 201 generates a random number.

In step S790, the CPU 201 obtains a unique key of a provider side by searching the terminal device database 222 using an identification number of the provider side (for example, the portable terminal 47).

In step S791, the CPU 201 encrypts the random number generated in step S789 using the unique key obtained in step S790.

In step S792, the CPU 201 obtains a wide area communication address of an evaluator side by searching the terminal device database 222 using an identification number of the evaluator side (for example, the portable terminal 46).

In step S793, the CPU 201 transmits the encrypted random number generated in step S791 to the wide area communication address obtained in step S792 as a confirmation request.

In step S794, the CPU 201 determines whether or not to receive an appropriate confirmation response which is a response to the confirmation request transmitted in step S793. At this time, it is determined whether or not the random number generated in step S789 is included in the confirmation response, and if the random number is included, it is determined that an appropriate confirmation response is received.

In step S794, if it is determined that the appropriate confirmation response is received, the flow goes to step S795. On the other hand, if it is determined that the appropriate confirmation response is not received, the flow goes to step S798 where an error process is performed.

In step S795, the CPU 201 records a time point when the appropriate confirmation response is received as an authentication time point of the link authentication.

In step S796, the CPU 201 determines whether or not evaluation information is transmitted from the provider side, and if it is determined that the evaluation information is not transmitted, the flow goes to step S797.

In step S797, the CPU 201 determines whether or not a predetermined amount of time has elapsed after the authentication time point is recorded in step S795, and stands by until it is determined that the predetermined amount of time has elapsed. If it is determined that the predetermined amount of time has elapsed in step S795, the flow returns to step S781. In this way, the identity of the evaluator and the identity of the provider are periodically confirmed.

On the other hand, if it is determined that evaluation information is transmitted from the provider side in step S796, the Case 3 process finishes.

In this way, the method-dependent link authentication process for Case 3 is performed.

Figure 21:
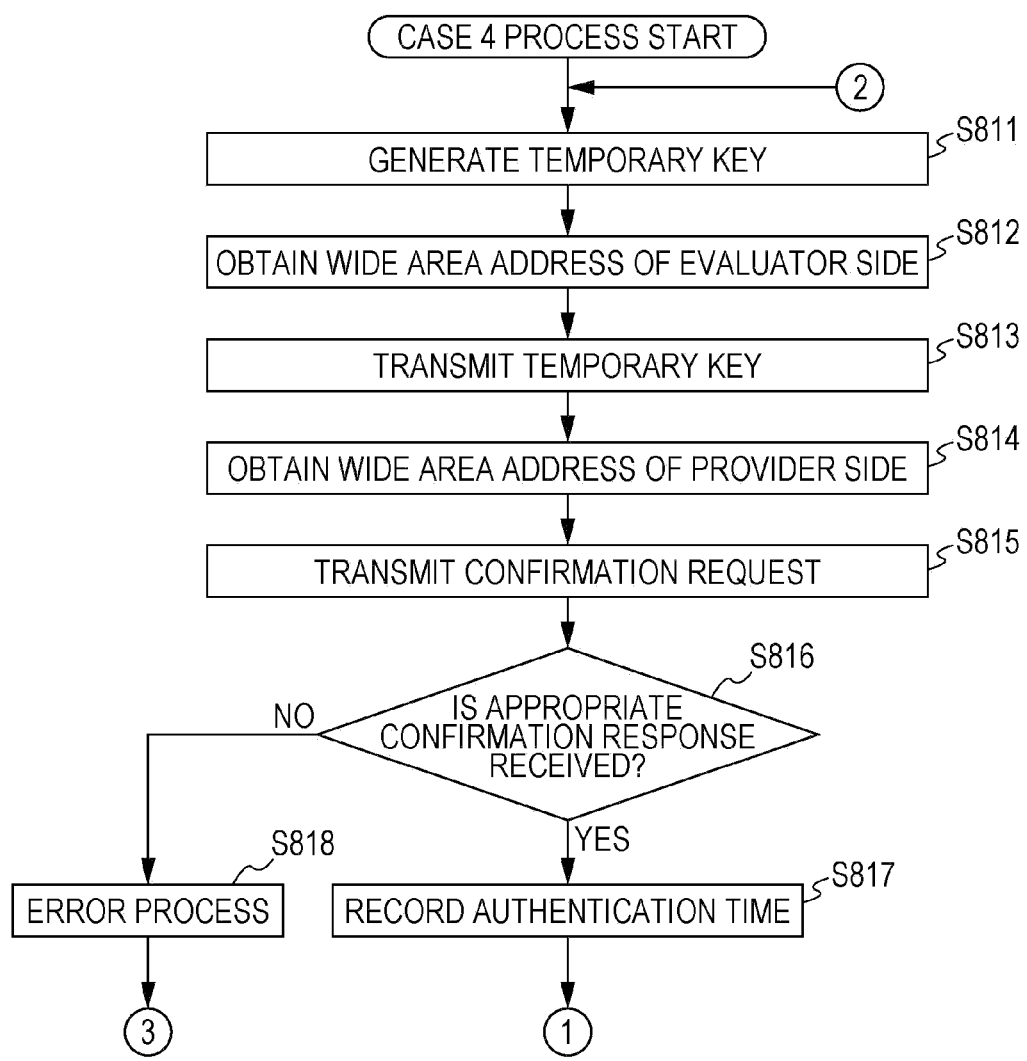
FIG. 21 is a flowchart illustrating an example of a Case 4 process.
Figure 22:
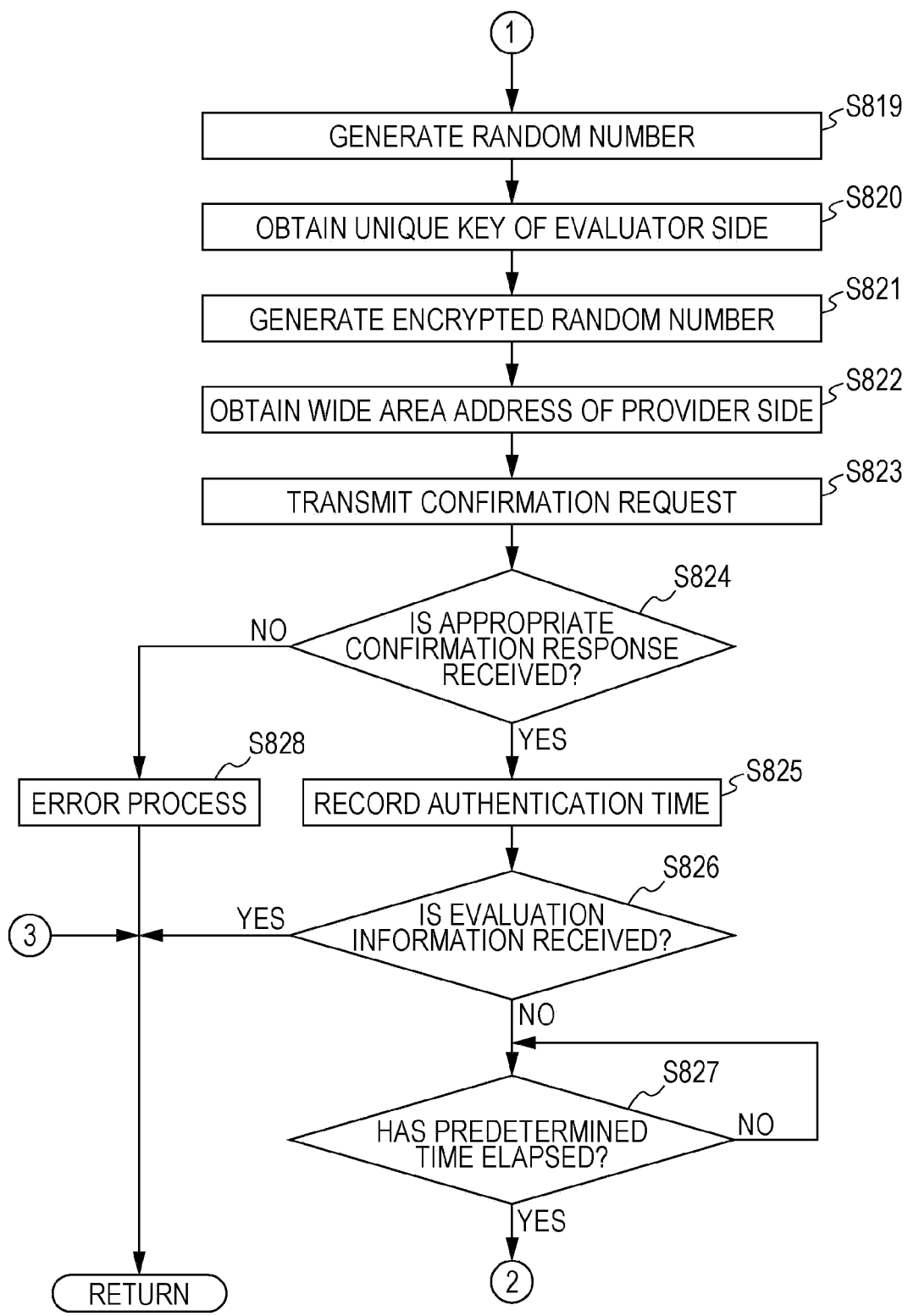
FIG. 22 is a flowchart illustrating an example of the Case 4 process.

FIGS. 21 and 22 are flowcharts illustrating an example of the Case 4 process performed as the process in step S705 in a case where the link authentication method is specified as Case 4 in step S704.

The processes in steps S811 to S818 are the same as the processes in steps S751 to S757 and step S760 in FIG. 18, and thus detailed description thereof will be omitted.

The processes in steps S819 to 828 are the same as the processes in steps S789 to S798 in FIG. 20, and thus detailed description thereof will be omitted.

In this way, the method-dependent link authentication process for Case 4 is performed.

Figure 23:
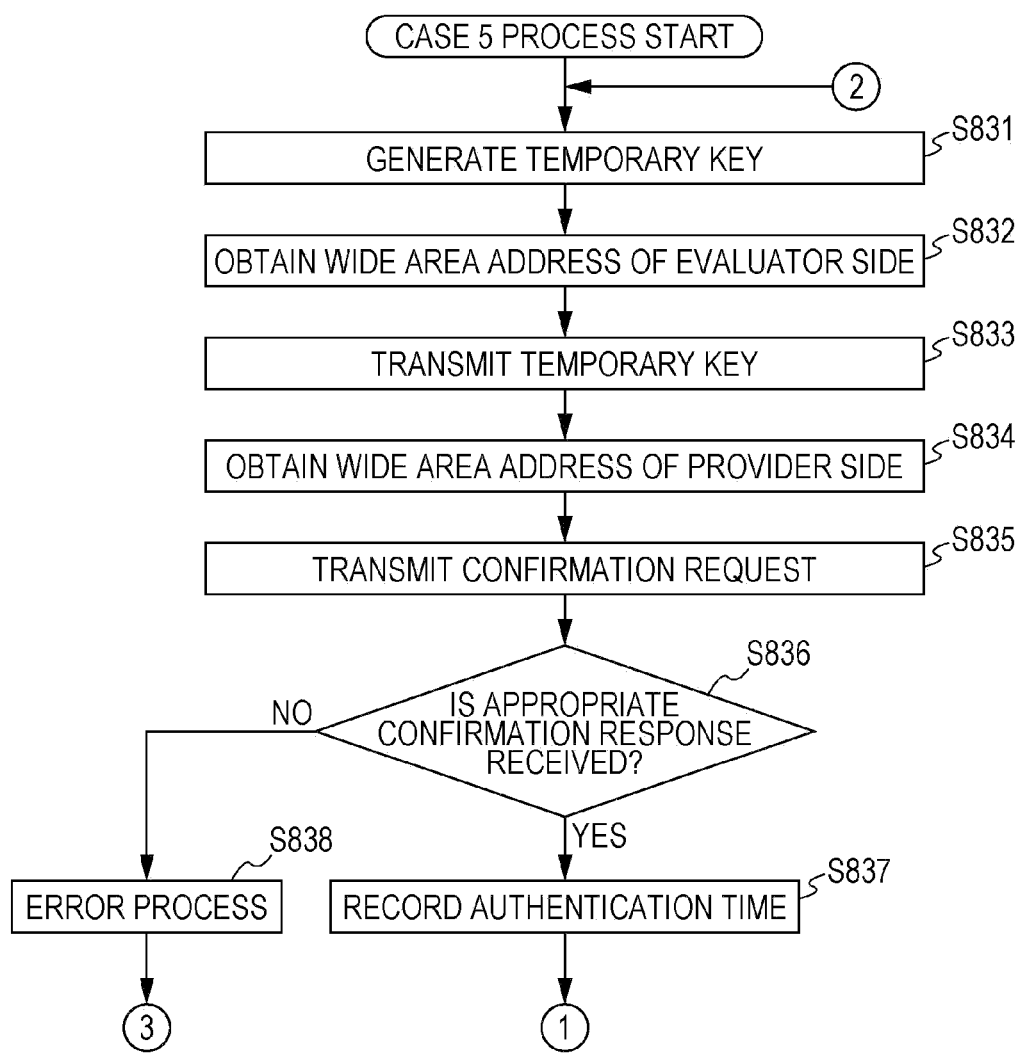
FIG. 23 is a flowchart illustrating an example of a Case 5 process.
Figure 24:
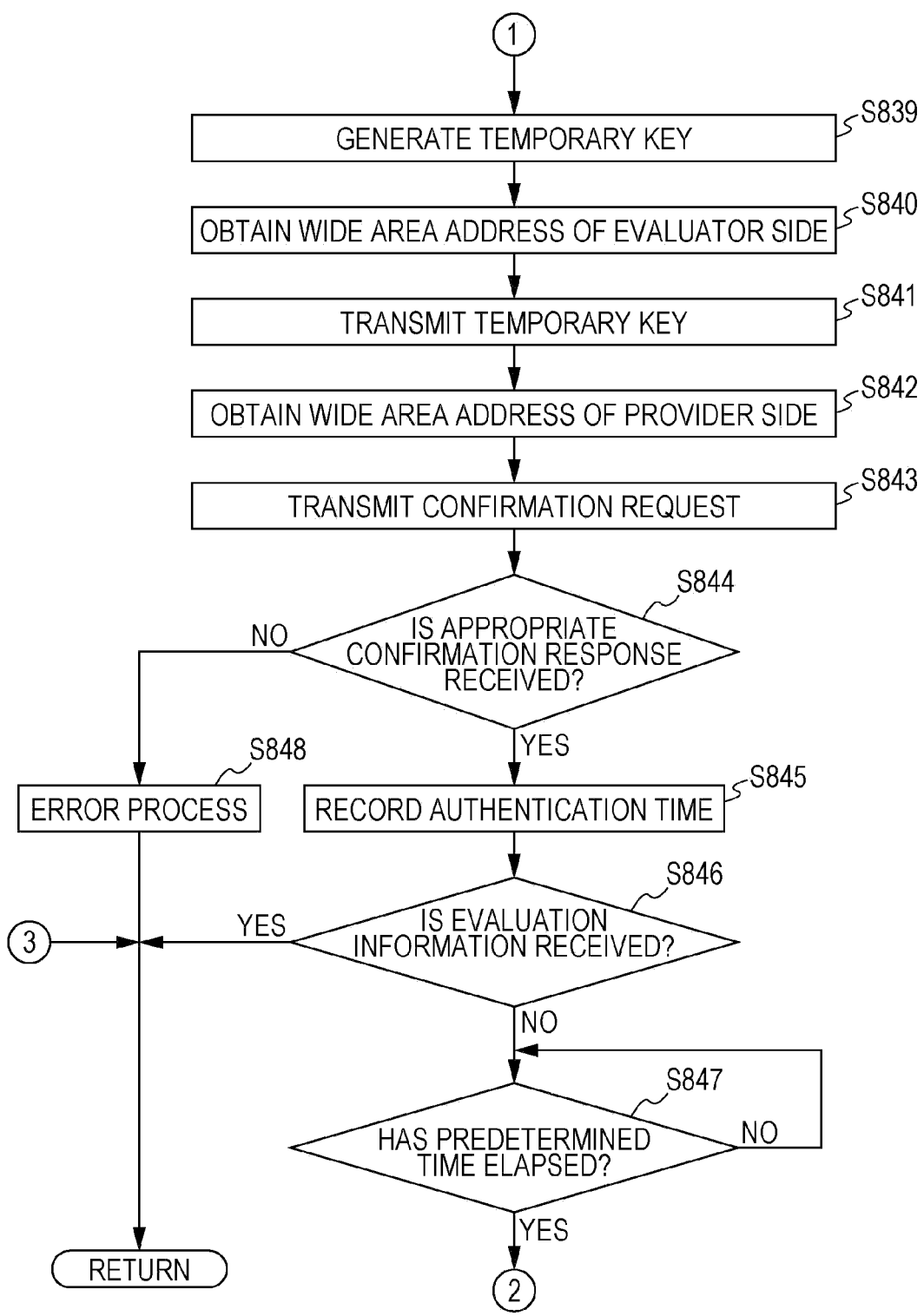
FIG. 24 is a flowchart illustrating an example of the Case 5 process.

FIGS. 23 and 24 are flowcharts illustrating an example of the Case 5 process performed as the process in step S705 in a case where the link authentication method is specified as Case 5 in step S704.

The processes in steps S831 to 838 are the same as the processes in steps S811 to S818 in FIG. 21, and thus detailed description thereof will be omitted.

In step S839, the CPU 201 generates a temporary key.

In step S840, the CPU 201 obtains a wide area communication address of a provider side by searching the terminal device database 222 using an identification number of the provider side (for example, the portable terminal 47).

In step S841, the CPU 201 transmits the temporary key generated in step S839 to the wide area communication address obtained in step S840.

In step S842, the CPU 201 obtains a wide area communication address of an evaluator side by searching the terminal device database 222 using an identification number of the evaluator side (for example, the portable terminal 46).

In step S843, the CPU 201 transmits a confirmation request to the wide area communication address obtained in step S842.

In step S844, the CPU 201 determines whether or not to receive an appropriate confirmation response which is a response to the confirmation request transmitted in step S843. At this time, it is determined whether or not the temporary key generated in step S839 is included in the confirmation response, and if the temporary key is included, it is determined that an appropriate confirmation response is received.

In step S844, if it is determined that the appropriate confirmation response is received, the flow goes to step S845. On the other hand, if it is determined that the appropriate confirmation response is not received, the flow goes to step S848 where an error process is performed.

In step S845, the CPU 201 records a time point when the appropriate confirmation response is received as an authentication time point of the link authentication.

In step S846, the CPU 201 determines whether or not evaluation information is transmitted from the provider side, and if it is determined that the evaluation information is not transmitted, the flow goes to step S847.

In step S847, the CPU 201 determines whether or not a predetermined amount of time has elapsed after the authentication time point is recorded in step S845, and stands by until it is determined that the predetermined amount of time has elapsed. If it is determined that the predetermined amount of time has elapsed in step S847, the flow returns to step S831. In this way, the identity of the evaluator and the identity of the provider are periodically confirmed.

On the other hand, if it is determined that evaluation information is transmitted from the provider side in step S846, the Case 5 process finishes.

In this way, the method-dependent link authentication process for Case 5 is performed.

The evaluation information collecting process including the method-dependent link authentication processes is performed.

Figure 25:
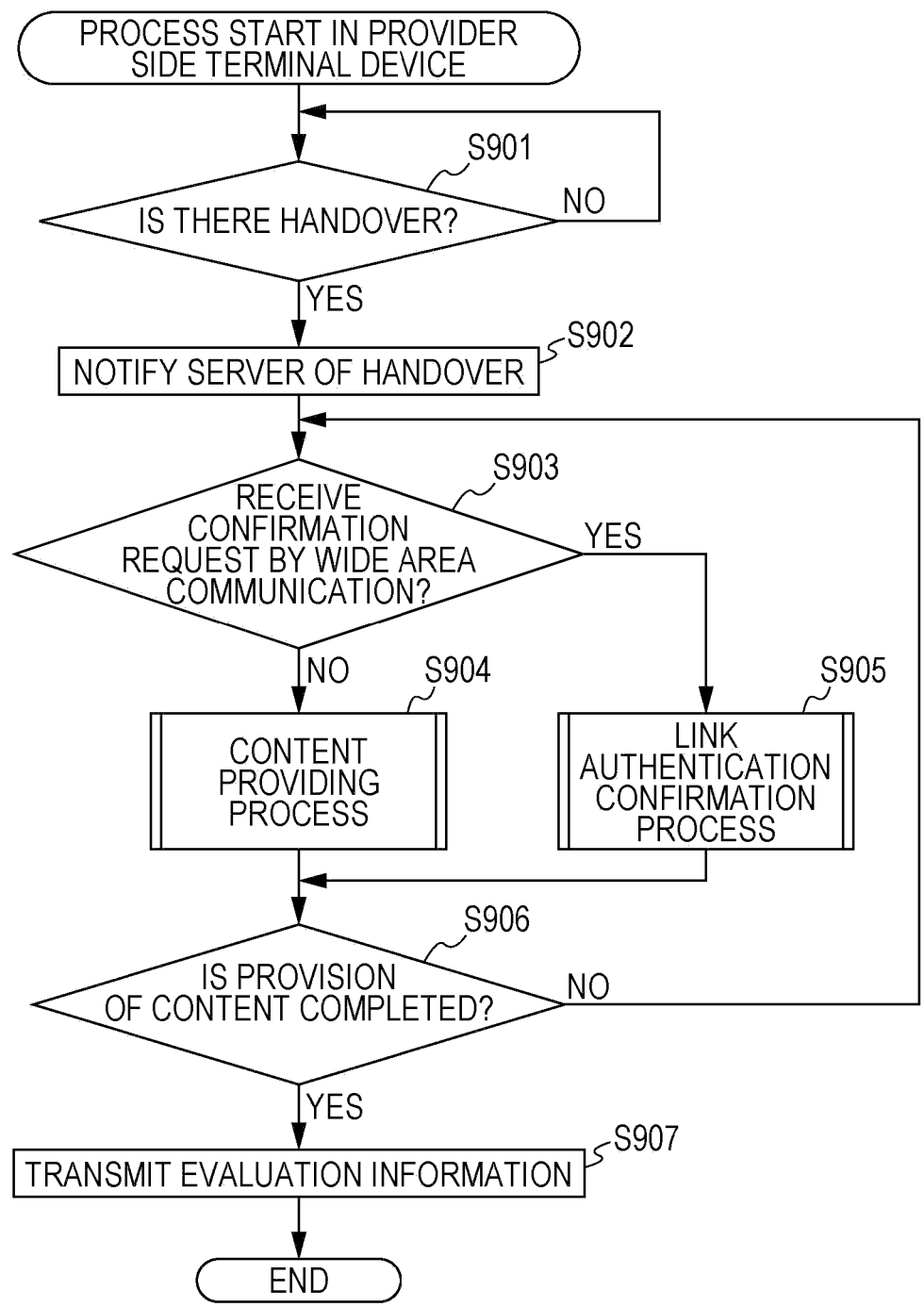
FIG. 25 is a flowchart illustrating an example of a process in the provider side terminal device.

Next, an example of a process performed by a terminal device (for example, the information collecting terminal 31 or the portable terminal 47) of a provider side will be described with reference to the flowchart in FIG. 25. In addition, this process is a process performed by the terminal device of the provider side holding a unique key, and in this example, the provider side terminal device is assumed to provide content such as music.

In step S901, the CPU 111 of the information collecting terminal or the portable terminal determines whether or not there is a handover, and stands by until it is determined that the handover has taken place.

In step S902, the CPU 111 notifies the server 21 of the handover using the wide area communication. At this time, a notification of the handover is sent, and other device information is also transmitted.

In step S903, the CPU 111 determines whether or not a confirmation request using the wide area communication is received. If it is determined that the confirmation request is received in step S903, the flow goes to step S905, and if it is determined that the confirmation request is not received, the flow goes to step S904.

Figure 26:
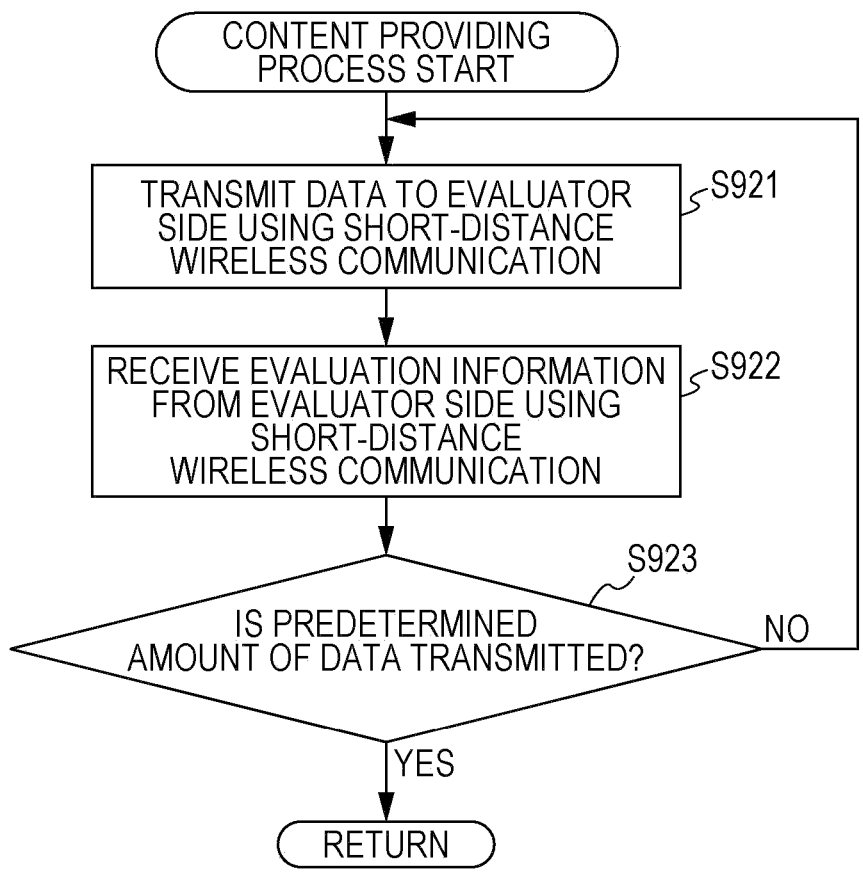
FIG. 26 is a flowchart illustrating an example of a content providing process.

Here, an example of a content providing process in step S904 in FIG. 25 will be described with reference to the flowchart in FIG. 26.

In step S921, the CPU 111 transmits data for content to the evaluator side using the short-distance wireless communication.

In step S922, the CPU 111 receives evaluation information from the evaluator side using the short-distance wireless communication.

In step S923, the CPU 111 determines whether or not a predetermined amount of data is transmitted by the process in step S921, and if it is determined that a predetermined amount data is not transmitted, the flow returns to step S921. On the other hand, if it is determined that a predetermined amount of data is transmitted, the flow goes to step S906 in FIG. 26.

Figure 27:
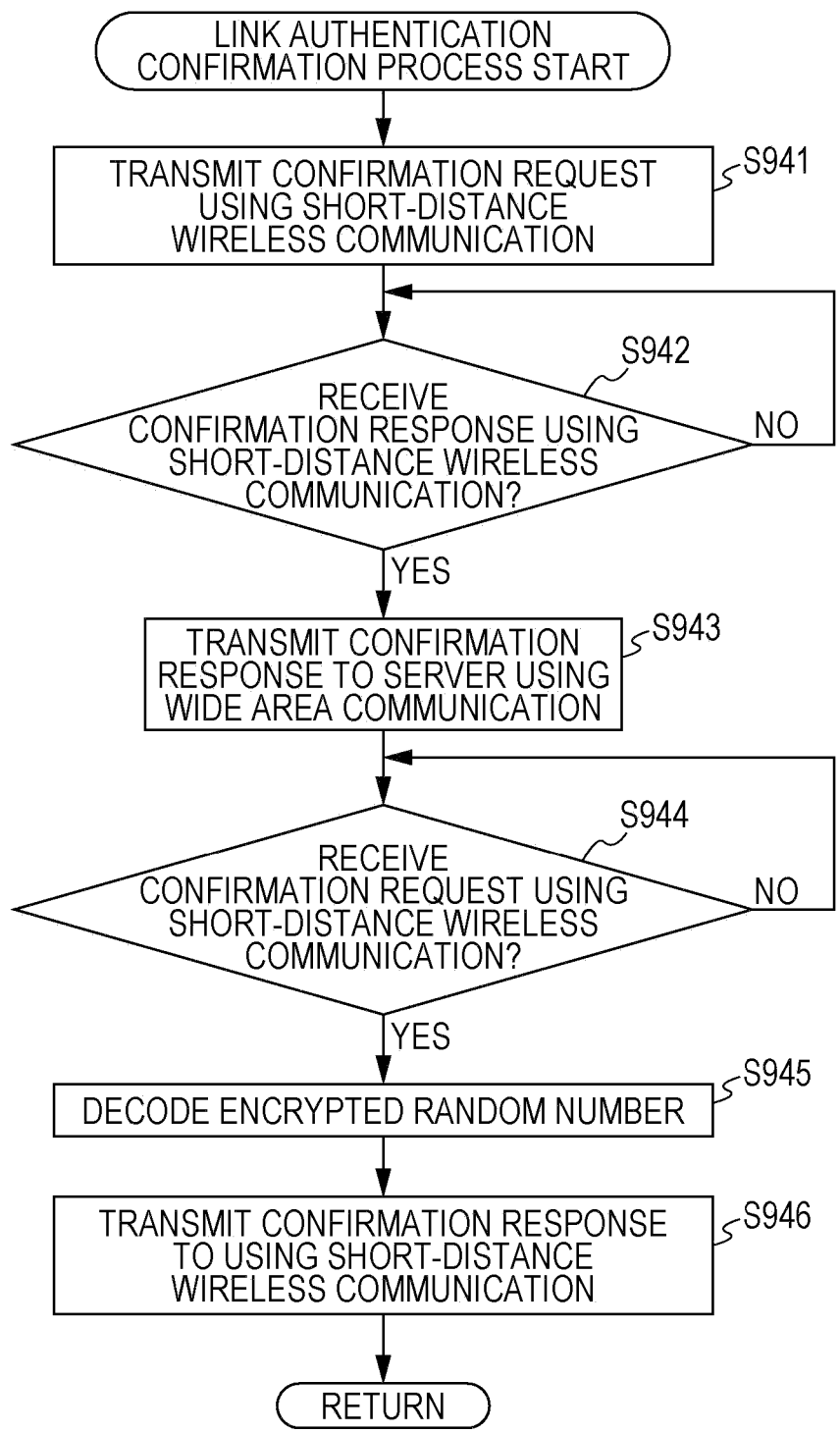
FIG. 27 is a flowchart illustrating an example of a link authentication process.

Here, an example of a link authentication confirmation process in step S905 in FIG. 25 will be described with reference to the flowchart in FIG. 27.

In step S941, the CPU 111 transmits the confirmation request which is determined as being received in step S903 to the evaluator side using the short-distance wireless communication.

In step S942, the CPU 111 determines whether or not a confirmation response to the confirmation request transmitted in step S941 is received using the short-distance wireless communication, and stands by until it is determined that the confirmation response is received. If it is determined that the confirmation response is received in step S942, the flow goes to step S943.

In step S943, the CPU 111 transmits the confirmation response which is determined as being received in step S942 to the server 21 using the wide area communication.

In step S944, the CPU 111 determines whether or not the confirmation request is received using the short-distance wireless communication, and stands by until it is determined that the confirmation request is received. If it is determined that the confirmation request is received in step S944, the flow goes to step S945.

In step S945, the CPU 111 decodes an encrypted random number included in the confirmation request which is determined as being received in step S944, using a unique key of the CPU 111.

In step S946, the CPU 111 transmits the random number decoded in step S945 to the evaluator side as the confirmation response using the short-distance wireless communication.

In this way, the link authentication confirmation process is performed.

Referring to FIG. 25 again, after the process in step S904 or S905 is performed, the flow goes to step S906, where the CPU 111 determines whether or not provision of the content finishes. For example, in a case where the evaluator instructs to stop reproduction of the content, it is determined that the provision of the content finishes in step S906. If it is determined that the provision of the content does not finish in step S906, the flow returns to step S903.

If it is determined that the provision of the content finishes in step S906, the flow goes to the step S907.

In step S907, the CPU 111 transmits the evaluation information received by the process in step S904 to the server 21 using the wide area communication.

In this way, the processes are performed by the provider side terminal device.

Next, another example of a process performed by a terminal device of a provider side will be described with reference to the flowchart in FIG. 28. In addition, this process is a process performed by the terminal device of the provider side which does not hold a unique key, and in this example, the provider side terminal device is assumed to provide content such as music.

In step S961, the CPU 111 of the information collecting terminal or the portable terminal determines whether or not there is a handover, and stands by until it is determined that the handover has taken place.

In step S962, the CPU 111 notifies the server 21 of the handover using the wide area communication. At this time, a notification of the handover is sent, and other device information is also transmitted.

In step S963, the CPU 111 determines whether or not a confirmation request or a temporary key using the wide area communication is received. If it is determined that the confirmation request or the temporary key is received in step S963, the flow goes to step S965, and if it is determined that the confirmation request is not received, the flow goes to step S964.

Here, an example of a link authentication confirmation process in step S965 in FIG. 28 will be described with reference to the flowchart in FIG. 29.

In step S981, the CPU 111 determines whether or not what is determined as being received in step S963 is the confirmation request. If it is determined that the confirmation request is received, the flow goes to step S982.

In step S982, the CPU 111 transmits the confirmation request which is determined as being received in step S963 to the evaluator side using the short-distance wireless communication.

In step S983, the CPU 111 determines whether or not a confirmation response to the confirmation request transmitted in step S982 is received using the short-distance wireless communication, and stands by until it is determined that the confirmation response is received. If it is determined that the confirmation response is received in step S983, the flow goes to step S984.

In step S984, the CPU 111 transmits the confirmation response which is determined as being received in step S983 to the server 21 using the wide area communication.

On the other hand, if it is determined that what is determined as being received in step S963 is not the confirmation request in step S981, the flow goes to step S988. In this case, the temporary key is received.

In step S988, the CPU 111 stores the temporary key which is determined as being received in step S963.

After the process in step S984 or S988, the flow goes to step S985.

In step S985, the CPU 111 determines whether or not the confirmation request is received using the short-distance wireless communication, and stands by until it is determined that the confirmation request is received. If it is determined that the confirmation request is received in step S985, the flow goes to step S986.

In step S986, the CPU 111 reads the temporary key stored in step S988.

In step S987, the CPU 111 transmits the temporary key read in step S986 to the evaluator side as the confirmation response using the short-distance wireless communication.

In this way, the link authentication confirmation process is performed.

Figure 28:
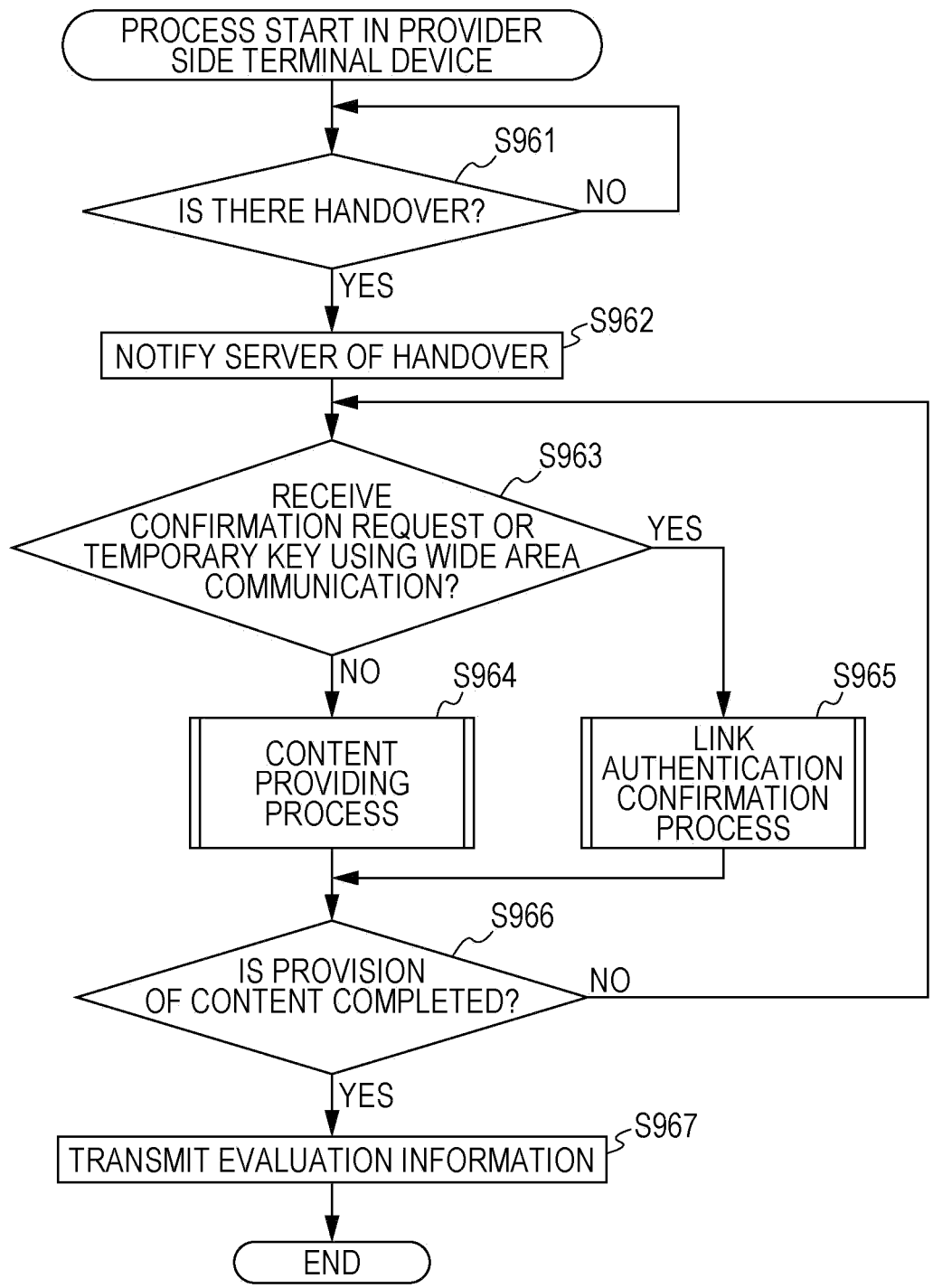
FIG. 28 is a flowchart illustrating another example of a process in the provider side terminal device.
Figure 29:
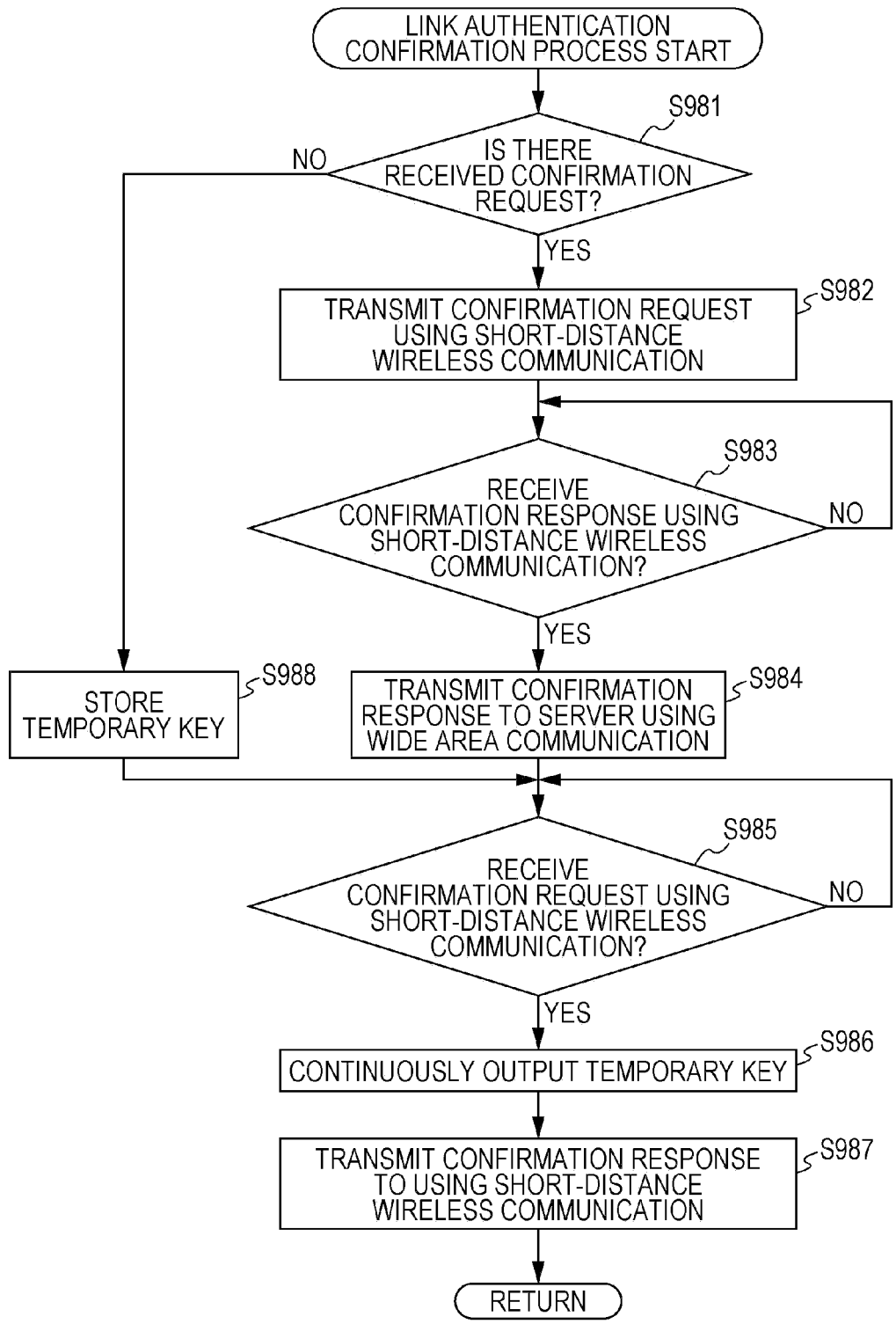
FIG. 29 is a flowchart illustrating an example of a link authentication process.

In addition, the content providing process in step S964 in FIG. 28 is the same as the process described with reference to FIG. 26, and thus detailed description thereof will be omitted. Further, the processes in steps S966 and S967 in step S28 are respectively the same as the processes in steps S906 and S907 in FIG. 25, and thus detailed description thereof will be omitted.

In this way, the processes are performed by the provider side terminal device.

Figure 30:
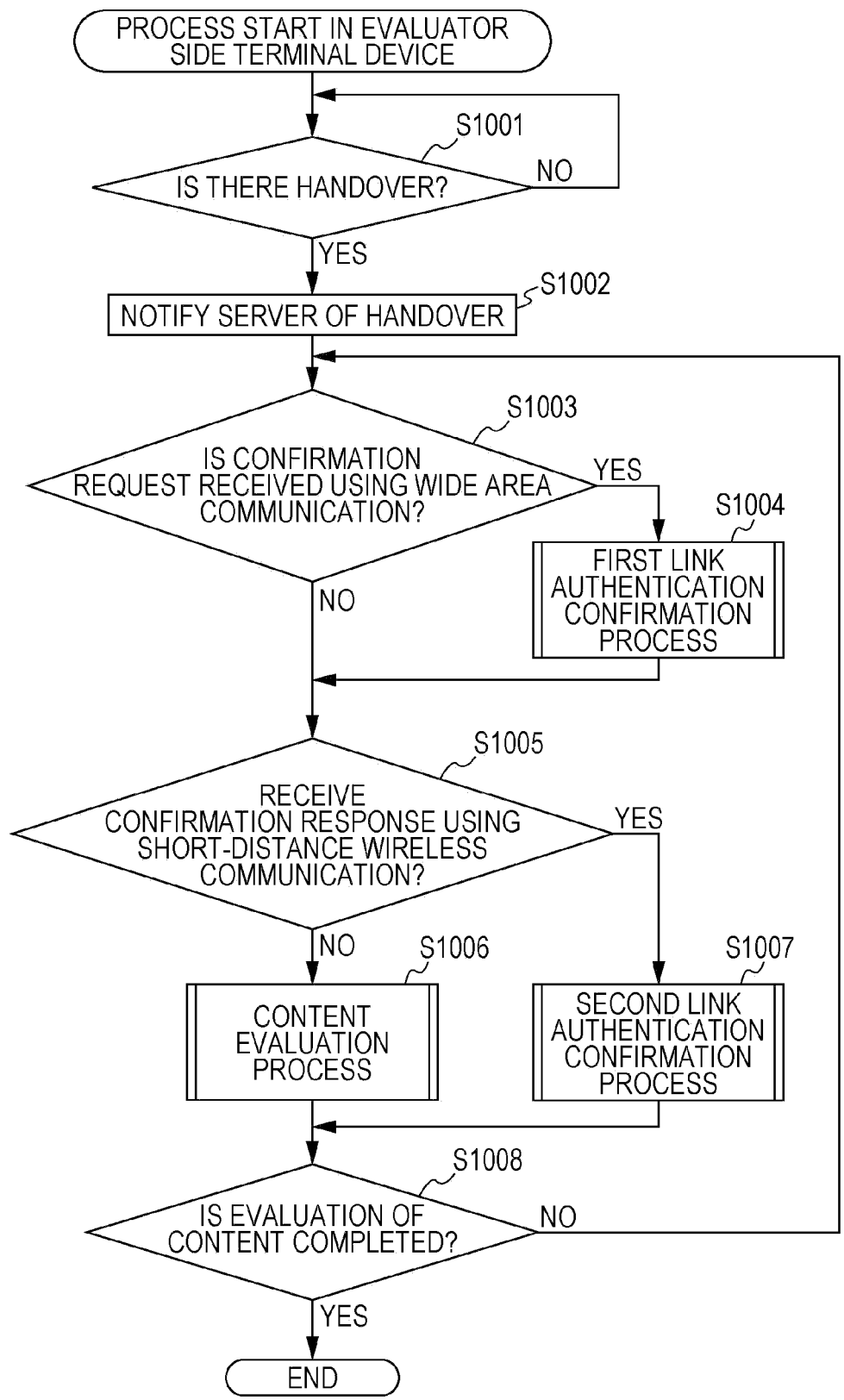
FIG. 30 is a flowchart illustrating an example of a process in the evaluator side terminal device.

Next, an example of a process performed by a terminal device (for example, the portable terminal 41 or the portable terminal 46) of an evaluator side will be described with reference to the flowchart in FIG. 30. In addition, this process is a process performed by the terminal device of the evaluator side holding a unique key, and in this example, it is assumed that the evaluator side terminal device receives content such as music from the provider side terminal device and evaluates the content.

In step S1001, the CPU 111 of the portable terminal determines whether or not there is a handover, and stands by until it is determined that the handover has taken place.

In step S1002, the CPU 111 notifies the server 21 of the handover using the wide area communication. At this time, a notification of the handover is sent, and other device information is also transmitted. The process in step S1002 may be omitted.

In step S1003, the CPU 111 determines whether or not a confirmation request using the wide area communication is received. If it is determined that the confirmation request is received in step S1003, the flow goes to step S1004.

Figure 31:
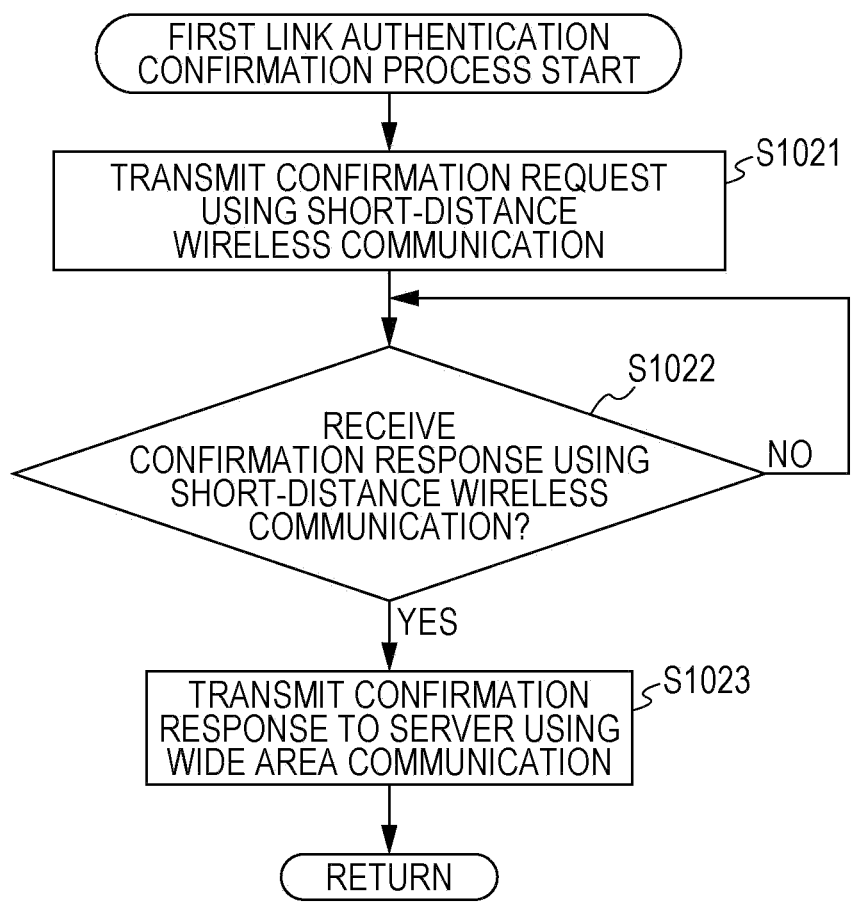
FIG. 31 is a flowchart illustrating an example of a first link authentication process.

Here, an example of a first link authentication confirmation process in step S1004 in FIG. 30 will be described with reference to the flowchart in FIG. 31.

In step S1021, the CPU 111 transmits the confirmation request which is determined as being received in step S1003 to the provider side using the short-distance wireless communication.

In step S1022, the CPU 111 determines whether or not a confirmation response to the confirmation request transmitted in step S1021 is received using the short-distance wireless communication, and stands by until it is determined that the confirmation response is received. If it is determined that the confirmation response is received in step S1022, the flow goes to step S1023.

In step S1023, the CPU 111 transmits the confirmation response which is determined as being received in step S1022 to the server 21 using the wide area communication.

In this way, the first link authentication process is performed.

Referring to FIG. 30 again, after the process in step S1004 or if it is determined that the confirmation request is not received in step S1003, the flow goes to step S1005.

In step S1005, the CPU 111 determines whether or not the confirmation request is received using the short-distance wireless communication. If it is determined that the confirmation request is received in step S1005, the flow goes to step S1007.

Figure 32:
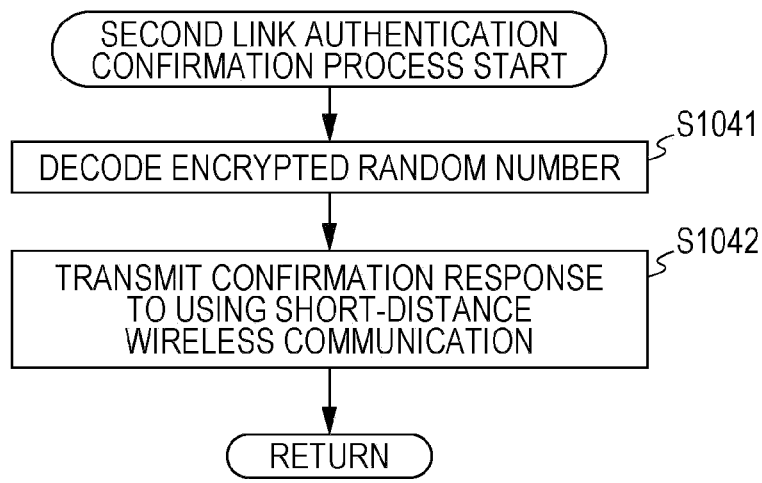
FIG. 32 is a flowchart illustrating an example of a second link authentication process.

Here, an example of a second link authentication process in step S1007 in FIG. 30 will be described with reference to the flowchart in FIG. 32.

In step S1041, the CPU 111 decodes an encrypted random number included in the confirmation request which is determined as being received in step S1005, using a unique key of the CPU 111.

In step S1042, the CPU 111 transmits the random number decoded in step S1041 to the provider side as the confirmation response using the short-distance wireless communication.

In this way, the second link authentication confirmation process is performed.

Referring to FIG. 30 again, if it is determined that the confirmation request is not received in step S1005, the flow goes to step S1006.

Figure 33:
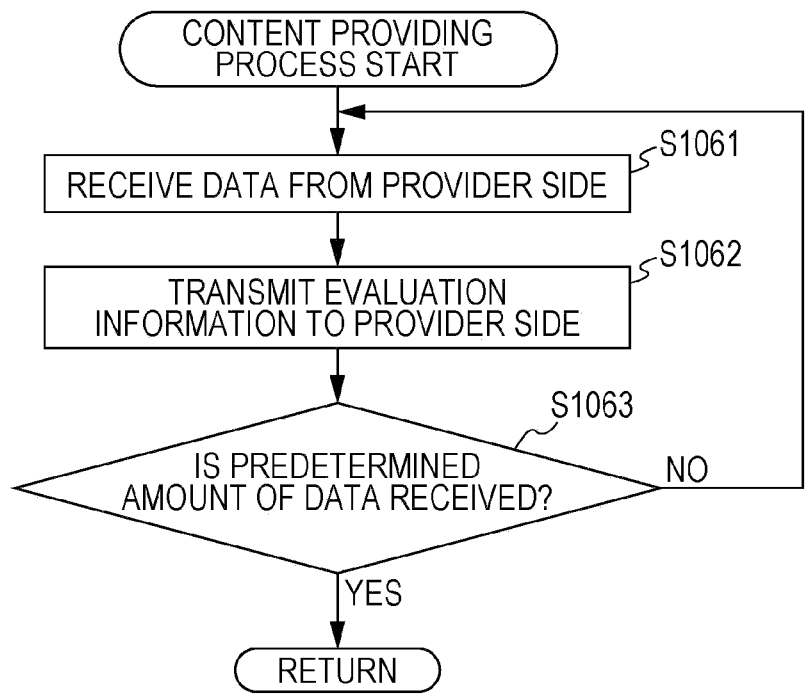
FIG. 33 is a flowchart illustrating an example of a content evaluation process.

Here, a content evaluation process in step S1006 in FIG. 30 will be described with reference to the flowchart in FIG. 33.

In step S1061, the CPU 111 receives data from the provider side using the short-distance wireless communication.

In step S1062, the CPU 111 transmits evaluation information to the provider side using the short-distance wireless communication.

In step S1063, the CPU 111 determines whether or not a predetermined amount of data is transmitted by the process in step S1061, and if it is determined that a predetermined amount data is not transmitted, the flow returns to step S1061. On the other hand, if it is determined that a predetermined amount of data is transmitted, the flow goes to step S1008 in FIG. 30.

In this way, the content evaluation process is performed.

Referring to FIG. 30 again, after the process in step S1006 or S1007, the flow goes to step S1008.

In step S1008, the CPU 111 determines whether or not the evaluation of the content provided from the provider side has finished, and if it is determined that the evaluation has not finished, the flow returns to step S1003.

On the other hand, if it is determined that the evaluation has finished in step S1008, the process finishes.

In this way, the processes are performed by the evaluator side terminal device.

Figure 34:
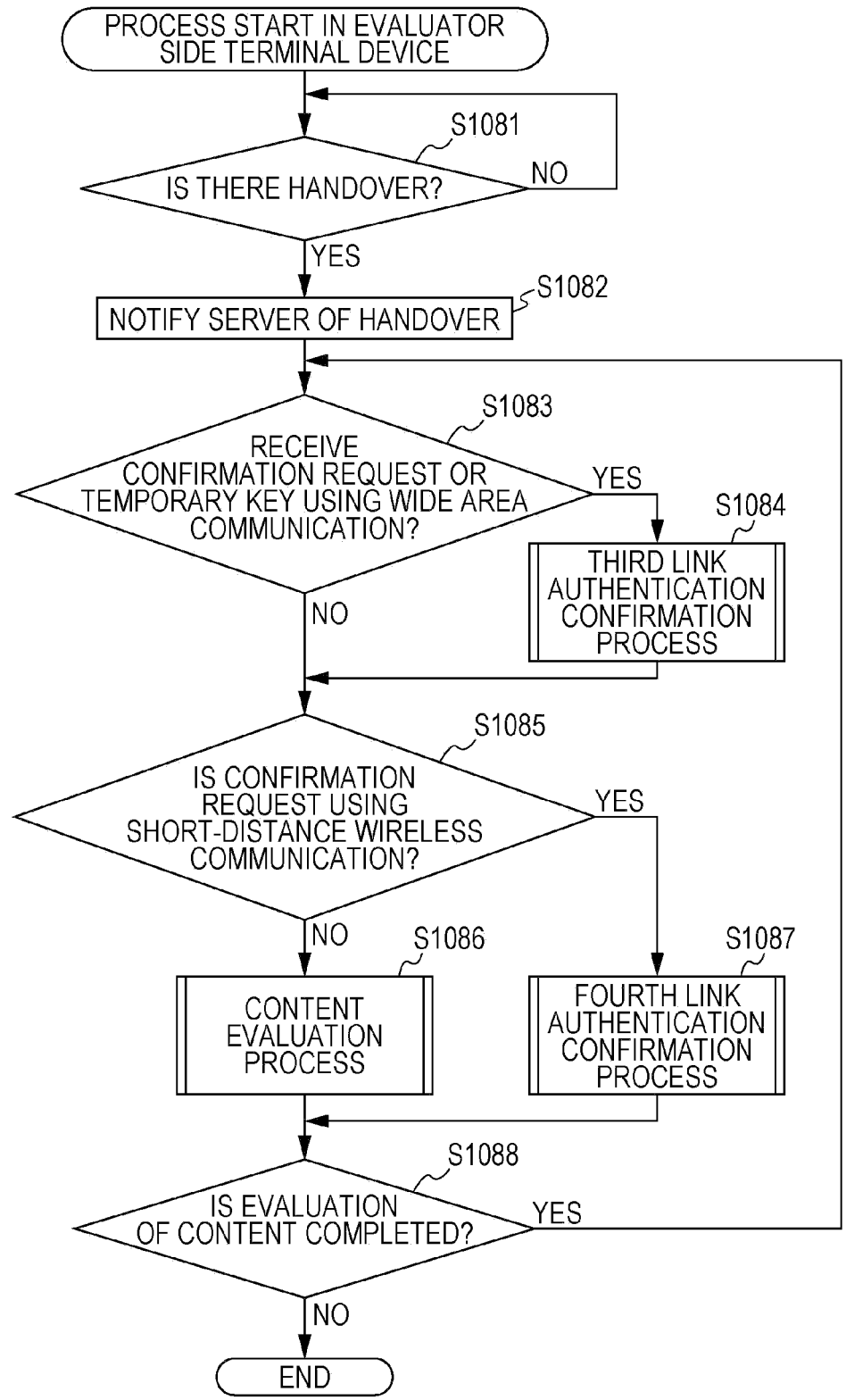
FIG. 34 is a flowchart illustrating another example of a process in the evaluator side terminal device.

Next, an example of a process performed by a terminal device of an evaluator side will be described with reference to the flowchart in FIG. 34. In addition, this process is a process performed by the terminal device of the evaluator side which does not hold a unique key, and in this example, it is assumed that the evaluator side terminal device receives content such as music from the provider side terminal device and evaluates the content.

In step S1081, the CPU 111 of the portable terminal determines whether or not there is a handover, and stands by until it is determined that the handover has taken place.

In step S1082, the CPU 111 notifies the server 21 of the handover using the wide area communication. At this time, a notification of the handover is sent, and other device information is also transmitted. The process in step S1082 may be omitted.

In step S1083, the CPU 111 determines whether or not a confirmation request using the wide area communication is received. If it is determined that the confirmation request is received in step S1083, the flow goes to step S1084.

Figure 35:
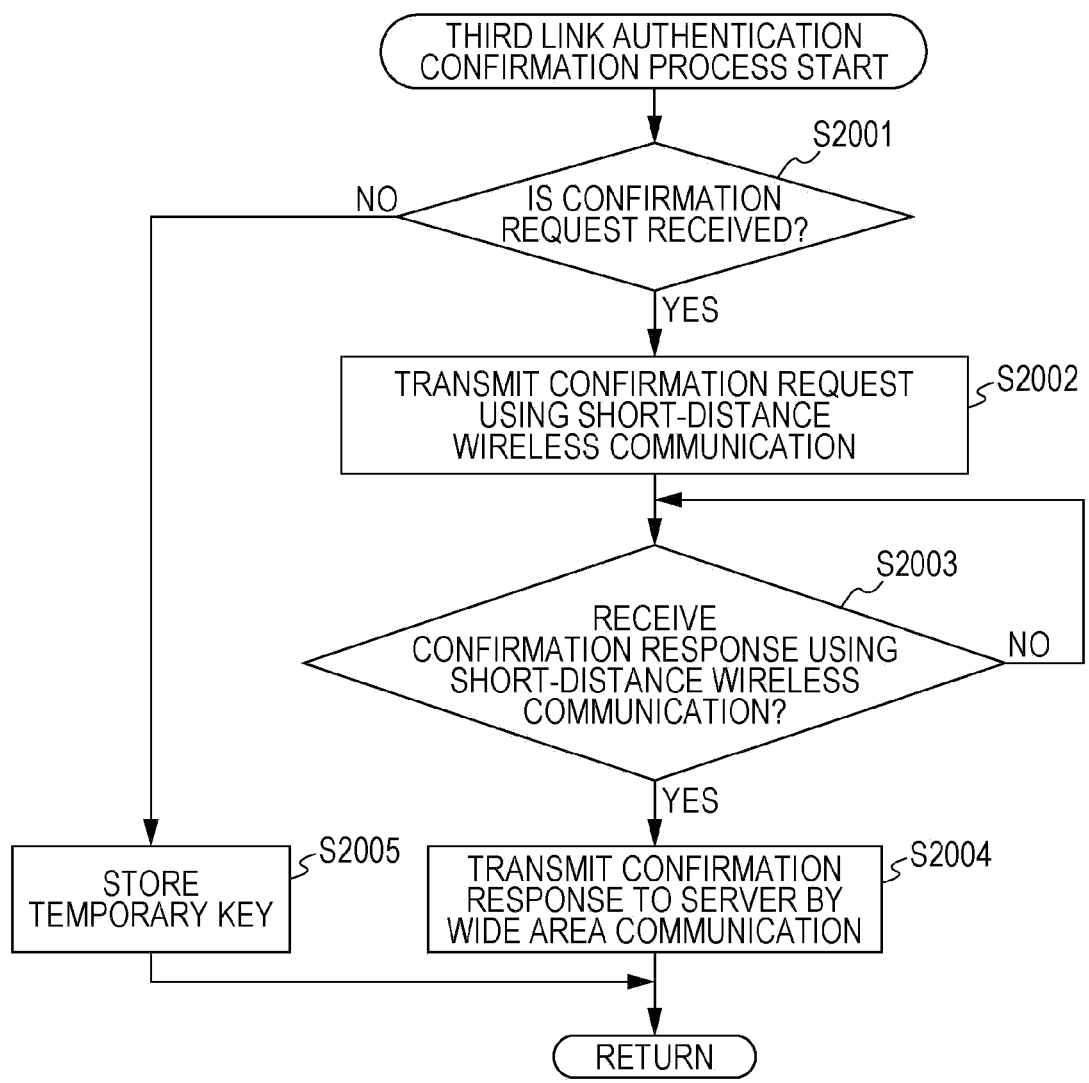
FIG. 35 is a flowchart illustrating an example of a third link authentication process.

Here, an example of a third link authentication confirmation process in step S1084 in FIG. 34 will be described with reference to the flowchart in FIG. 35.

In step S2001, the CPU 111 determines whether or not what is determined as being received in step S1083 is the confirmation request. If it is determined that the confirmation request is received, the flow goes to step S2002.

In step S2002, the CPU 111 transmits the confirmation request which is determined as being received in step S1083 to the provider side using the short-distance wireless communication.

In step S2003, the CPU 111 determines whether or not a confirmation response to the confirmation request transmitted in step S2002 is received using the short-distance wireless communication, and stands by until it is determined that the confirmation response is received. If it is determined that the confirmation response is received in step S2003, the flow goes to step S2004.

In step S2004, the CPU 111 transmits the confirmation response which is determined as being received in step S2003 to the server 21 using the wide area communication.

On the other hand, if it is determined that what is determined as being received in step S1083 is not the confirmation request in step S2001, the flow goes to step S2005. In this case, the temporary key is received.

In step S2005, the CPU 111 stores the temporary key which is determined as being received in step S1083.

In this way, the third link authentication process is performed.

Referring to FIG. 34 again, after the process in step S1084 or if it is determined that the confirmation request using the wide area communication is not received in step S1083, the flow goes to step S1085.

In step S1085, the CPU 111 determines whether or not the confirmation request is received using the short-distance wireless communication. If it is determined that the confirmation request is received in step S1085, the flow goes to step S1087.

Figure 36:
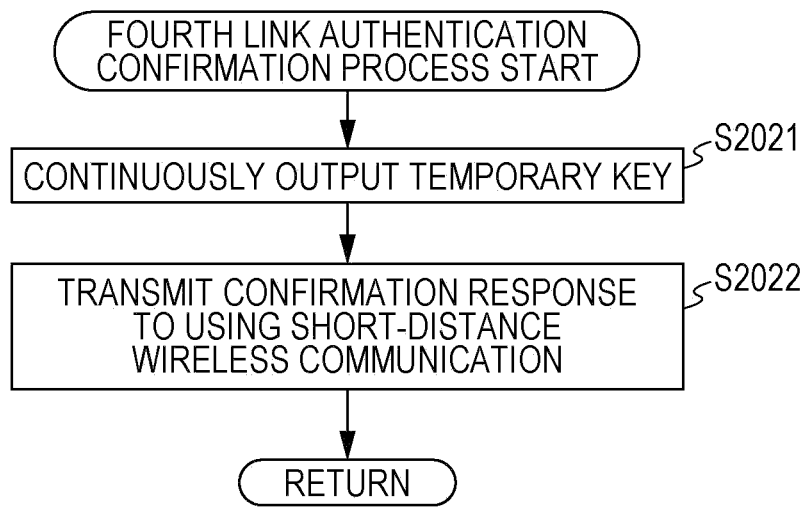
FIG. 36 is a flowchart illustrating an example of a fourth link authentication process.

Here, an example of a second link authentication confirmation process in step S1087 in FIG. 34 will be described with reference to the flowchart in FIG. 36.

In step S2021, the CPU 111 reads the temporary key stored in step S2005.

In step S2022, the CPU 111 transmits the temporary key read in step S2021 to the evaluator side as the confirmation response using the short-distance wireless communication.

In this way, the fourth link authentication confirmation process is performed.

Referring to FIG. 34 again, on the other hand, if it is determined that the confirmation request is not received in step S1085, the flow proceeds to step S1086. The content evaluation process in step S1086 is the same as the process described with reference to the flowchart in FIG. 33, and thus detailed description thereof will be omitted.

After the process in step S1086 or S1087, the flow proceeds to step S1088.

In step S1088, the CPU 111 determines whether or not the evaluation of the content provided from the provider side finishes, and if it is determined that the evaluation does not finish, the flow returns to step S1083.

On the other hand, if it is determined that the evaluation finishes in step S1088, the process finishes.

In this way, the processes are performed by the evaluator side terminal device.

In the above description, although the case where the short-distance wireless communication after the noncontact communication is performed at the time of the handover has been described, an embodiment of the present disclosure is not limited thereto. For example, contact type communication performed by making ports come into contact with each other may be used instead of the noncontact communication such as NFC, and, a typical wired LAN may be used instead of the short-distance wireless communication.

In addition, in the above description, although the case where the wide area communication performed between the server and the portable terminal uses the mobile communication network wireless communication has been described, an embodiment of the present disclosure is not limited thereto. For example, fixed communication network communication, or communication using an independent network may be employed.

Meanwhile, the above-described series of processes may be performed by hardware or software. When a series of processes is performed by the software, programs constituting the software are installed from a network or a recording medium to a computer which is built in dedicated hardware. The programs are installed from a network or a recording medium to a general personal computer which can execute various kinds of functions by installing various kinds of programs.

When the above-described series of processes is performed by software, programs constituting the software are installed from a network such as the Internet, or a recording medium including a removable medium or the like.

Further, in this specification, the above-described series of processes includes not only processes performed in a time series according to the described order, but also processes performed in parallel or separately even if not necessarily performed in the time series.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
one or more processors operable to:
receive information from a first terminal device, wherein the first terminal device receives the information from a second terminal device using a first communication, wherein the first terminal device is related to a provider of a product or a service and the second terminal device is related to an evaluator of the product or the service;
determine a result comprising information indicating a reliability of the provider based on identification information for the first terminal device and security sorting of the second terminal device based on identification information for the second terminal device, wherein the identification information for the first terminal device and identification information for the second terminal device are included in the information received using the first communication;
confirm a state of a second communication performed between the first terminal device and the second terminal device based on the determined result, and perform a link authentication of the second communication; and
receive evaluation information from the first terminal device, wherein the evaluation information corresponds to the product or the service and is transmitted using the second communication having undergone the link authentication.

2. The information processing apparatus according to claim 1, further comprising a terminal device information database, wherein the terminal device information database comprises identification numbers of the first terminal device and the second terminal device correlated with security sorting of the first terminal device and the security sorting of the second terminal device, wherein the one or more processors are operable to specify the security sorting by searching the terminal device information database.

3. The information processing apparatus according to claim 1, wherein the one or more processors are operable to specify the link authentication for confirming that the second communication performed between the first terminal device and the second terminal device is continuously performed based on the determined result, and perform the link authentication, and
wherein the one or more processors are operable to receive evaluation information from the first terminal device using a third communication, wherein the evaluation information is transmitted from the second terminal device to the first terminal device using the second communication, wherein the evaluation information corresponds to the product or the service transmitted from the first terminal to the evaluator related to the second terminal device using the second communication.

4. The information processing apparatus according to claim 3, wherein the one or more processors are operable to:
periodically perform, according to the determined result, an evaluator identity confirmation process for confirming an identity of the second terminal device by receiving, from the first terminal device using the third communication, information indicating whether or not information transmitted to the second terminal device using the third communication is transmitted to the first terminal device using the second communication; and
periodically perform a provider identity confirmation process for confirming an identity of the first terminal device, by receiving, from the second terminal device using the third communication, information indicating whether or not information transmitted to the first terminal device using the third communication is transmitted to the second terminal device using the second communication.

5. The information processing apparatus according to claim 4, wherein the one or more processors are operable to specify the link authentication by determining whether or not the provider identity confirmation process is performed based on the reliability of the provider.

6. The information processing apparatus according to claim 4, wherein the one or more processors are operable to specify the link authentication by determining whether to use a unique key which the first terminal device or the second terminal device stores in advance, or a temporary key which the first terminal device or the second terminal device does not store in advance, based on the security sorting, in the evaluator identity confirmation process or the provider identity confirmation process.

7. A non-transitory computer-readable storage medium having stored thereon, a set of computer-executable instructions for causing the computer to perform steps comprising:
receiving information transmitted and received using a first communication from a first terminal device when the first communication is performed between the first terminal device related to a provider of a product or a service and a second terminal device related to an evaluator of the product or the service;
determining a result comprising information indicating a reliability of the provider based on identification information for the first terminal device and security sorting of the second terminal device based on identification information for the second terminal device, wherein the identification information for the first terminal device and identification information for the second terminal device are included in the information received using the first communication;
confirming a state of a second communication performed between the first terminal device and the second terminal device based on the determined result, and performing a link authentication; and
receiving evaluation information regarding the product or the service which is transmitted and received using the link authenticated second communication, from the first terminal device.

8. An information processing apparatus comprising:
one or more processors operable to:
receive, using a first communication with a terminal device related to an evaluator of a product or a service provided by a provider related to the information processing apparatus, information including identification information for the terminal device and an address of a second communication;
transmit, to a server, information indicating a reliability of the provider, security sorting of the terminal device, and security sorting of the information processing apparatus, based on identification information for the information processing apparatus and the identification information for the terminal device received using the first communication, using a third communication;

transmit a first confirmation request to the terminal device using a second communication when the first confirmation request which is set in advance as an encrypted random number is received from the server using the third communication, wherein the first confirmation request is received from the server based on the information indicating a reliability of the provider;

transmit a first confirmation response to a server using the third communication, which is a confirmation response received using the second communication and is decoded for the encrypted random number and transmitted by the terminal device as a response to the first confirmation request; and transmit evaluation information, which is received from the terminal device using the second communication and which indicates an evaluation of the product or the service, to the server using the third communication.

9. The information processing apparatus according to claim 8, wherein the one or more processors are operable to transmit a second confirmation response to the terminal device, wherein the second confirmation response is received using the second communication and is set in advance by a preset process when a second confirmation request which is set in advance is received using the second communication.

10. The information processing apparatus according to claim 9, wherein the second confirmation response comprises information obtained by decoding encrypted information included in the second confirmation request using a unique key which is stored in advance.

11. The information processing apparatus according to claim 9, wherein the one or more processors are operable to receive a temporary key from the server using the third communication and store the temporary key, wherein the second confirmation response includes the temporary key.

12. A non-transitory computer-readable storage medium having stored thereon, a set of computer-executable instructions for causing the computer to perform steps comprising:

receiving, using a first communication with a terminal device related to an evaluator of a product or a service provided by a provider related to an information processing apparatus, information including identification information for the terminal device and an address of a second communication;

transmitting, to a server, information indicating a reliability of the provider, security sorting of the terminal device, and security sorting of the information processing apparatus, based on identification information for the information processing apparatus and the identification information for the terminal device received using the first communication, using a third communication;

transmitting a first confirmation request to the terminal device using the second communication when the first confirmation request which is set in advance is received from the server using the third communication, wherein the first confirmation request is received from the server based on the information indicating a reliability of the provider;

transmitting a first confirmation response, which is a confirmation response received using the second communication and is transmitted by the terminal device as a response to the first confirmation request, to the server using the third communication; and transmitting evaluation information, which is received from the terminal device using the second communication and which indicates an evaluation of the product or the service, to the server using the third communication.

13. An information processing apparatus comprising:
one or more processors operable to:

transmit, using a first communication with a terminal device related to a provider of a product or a service, information indicating a reliability of the provider, security sorting of the terminal device, and security sorting of the information processing apparatus, based on identification information for the information processing apparatus and an address of a second communication;

transmit a first confirmation request to the terminal device using the second communication when the first confirmation request which is set in advance is received from a server using a third communication;

transmit a first confirmation response, which is a confirmation response received using the second communication and is transmitted by the terminal device as a response to the first confirmation request, to the server using the third communication; and transmit evaluation information related to the product or the service which is received from the terminal device using the second communication.

14. The information processing apparatus according to claim 13, wherein the one or more processors are operable to transmit a second confirmation response which is information generated by a preset process to the terminal device when a second confirmation request which is set in advance is received using the second communication.

15. The information processing apparatus according to claim 14, wherein the second confirmation response comprises information obtained by decoding encrypted information included in the second confirmation request using a unique key which is stored in advance.

16. The information processing apparatus according to claim 14, wherein the one or more processors are operable to receive a temporary key from the server using the third communication and store the temporary key, wherein the second confirmation response includes the temporary key.

17. A non-transitory computer-readable storage medium having stored thereon, a set of computer-executable instructions for causing the computer to perform steps comprising:

in an information processing apparatus:

transmitting, using a first communication with a terminal device related to a provider of a product or a service, information indicating a reliability of the provider, security sorting of the terminal device, and security sorting of the information processing apparatus, based on identification information for the information processing apparatus and an address of a second communication;

transmitting a first confirmation request to the terminal device using the second communication when the first confirmation request which is set in advance is received from a server using a third communication;

transmitting a first confirmation response, which is a confirmation response received using the second communication and is transmitted by the terminal device as a response to the first confirmation request, to the server using the third communication; and transmitting evaluation information related to the product or the service which is received from the terminal device using the second communication.

18. The information processing apparatus according to claim 1, wherein the first communication is initiated based on a handover function, wherein the handover function is based on a non-contact communication between the first terminal device and the second terminal device.

19. The non-transitory computer-readable storage medium according to claim 12, wherein the first confirmation request comprises an encrypted random number generated by the server.

20. The information processing apparatus according to claim 1, wherein the one or more processors are operable to determine a server approval sorting based on the first communication between the first terminal device and the second terminal device to confirm the state of the second communication performed between the first terminal device and the second terminal device based on the determined result.

* * * * *